United States Patent
Schulman et al.

(10) Patent No.: US 10,902,734 B2
(45) Date of Patent: Jan. 26, 2021

(54) SYSTEMS AND METHODS FOR MANAGING FLIGHT-RESTRICTION REGIONS

(71) Applicant: SZ DJI TECHNOLOGY CO., LTD., Shenzhen (CN)

(72) Inventors: Brendan Schulman, Shenzhen (CN); Bingzhen Yang, Shenzhen (CN); Xinan Xu, Shenzhen (CN); Shunnian Li, Shenzhen (CN); Weiping Huang, Shenzhen (CN); Jian Zhao, Shenzhen (CN); Pingfa Ai, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 166 days.

(21) Appl. No.: 16/083,205

(22) PCT Filed: Nov. 17, 2015

(86) PCT No.: PCT/CN2015/094839
§ 371 (c)(1),
(2) Date: Sep. 7, 2018

(87) PCT Pub. No.: WO2017/084031
PCT Pub. Date: May 26, 2017

(65) Prior Publication Data
US 2019/0114925 A1    Apr. 18, 2019

(51) Int. Cl.
| | |
|---|---|
| G08G 5/00 | (2006.01) |
| G06Q 30/00 | (2012.01) |
| G06F 21/31 | (2013.01) |
| G05D 1/10 | (2006.01) |
| G06Q 40/00 | (2012.01) |

(52) U.S. Cl.
CPC ............ *G08G 5/006* (2013.01); *G05D 1/106* (2019.05); *G06F 21/31* (2013.01); *G06Q 30/018* (2013.01); *G06Q 40/12* (2013.12); *G08G 5/003* (2013.01); *G08G 5/0069* (2013.01); *G08G 5/0082* (2013.01)

(58) Field of Classification Search
CPC ................................. G08G 5/00; G06Q 30/00
See application file for complete search history.

(56) References Cited

U.S. PATENT DOCUMENTS

| 9,412,278 B1 | 8/2016 | Gong et al. |
| 10,586,463 B2 | 3/2020 | Xu et al. |

(Continued)

FOREIGN PATENT DOCUMENTS

| CN | 103748527 A | 4/2014 |
| CN | 103809600 A | 5/2014 |

(Continued)

OTHER PUBLICATIONS

The World Intellectual Property Organization (WIPO) International Search Report and Written Opinion for PCT/CN2015/094839 dated Aug. 18, 2016 9 Pages.

*Primary Examiner* — Kira Nguyen
(74) *Attorney, Agent, or Firm* — Anova Law Group, PLLC

(57) ABSTRACT

Systems, devices, and methods are provided for managing flight restriction regions. The flight restriction regions of the present disclosure may comprise a plurality of distinct levels and may comprise releasable flight restriction regions. The releasable flight restriction regions may be released based on authentication of an operator of a UAV.

20 Claims, 23 Drawing Sheets

(56) References Cited

U.S. PATENT DOCUMENTS

| | | | |
|---|---|---|---|
| 2012/0116610 A1 | 5/2012 | Righi et al. | |
| 2015/0294514 A1 | 10/2015 | Mccollum et al. | |
| 2016/0225264 A1* | 8/2016 | Taveira | |
| 2016/0244187 A1* | 8/2016 | Byers | A47G 29/14 |
| 2016/0253907 A1 | 9/2016 | Taveira | |
| 2016/0240087 A1* | 12/2016 | Kube et al. | |
| 2017/0050748 A1* | 2/2017 | Byers | H04W 4/021 |
| 2017/0061802 A1* | 3/2017 | Barraci | B64C 39/02 |
| 2019/0031341 A1* | 1/2019 | Gomez Gutierrez | B64C 39/024 |

FOREIGN PATENT DOCUMENTS

| | | |
|---|---|---|
| CN | 104216414 A | 12/2014 |
| CN | 104332072 A | 2/2015 |
| CN | 104809918 A | 7/2015 |
| CN | 104834307 A | 8/2015 |
| CN | 104981748 A | 10/2015 |
| CN | 105005316 A | 10/2015 |
| CN | 105025014 A | 11/2015 |
| CN | 107407938 A | 11/2017 |

\* cited by examiner

[Fig. 1]
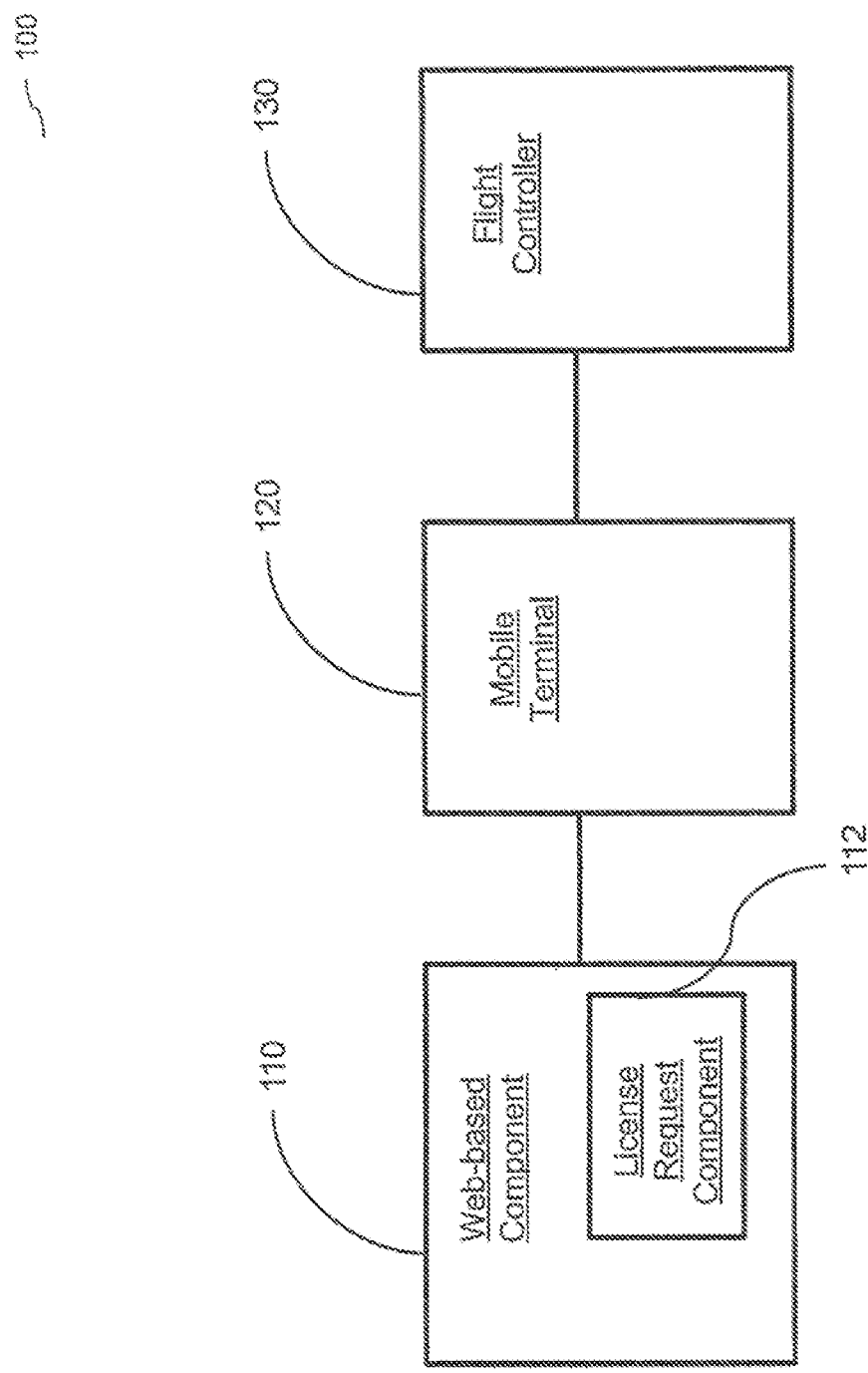

[Fig. 2]
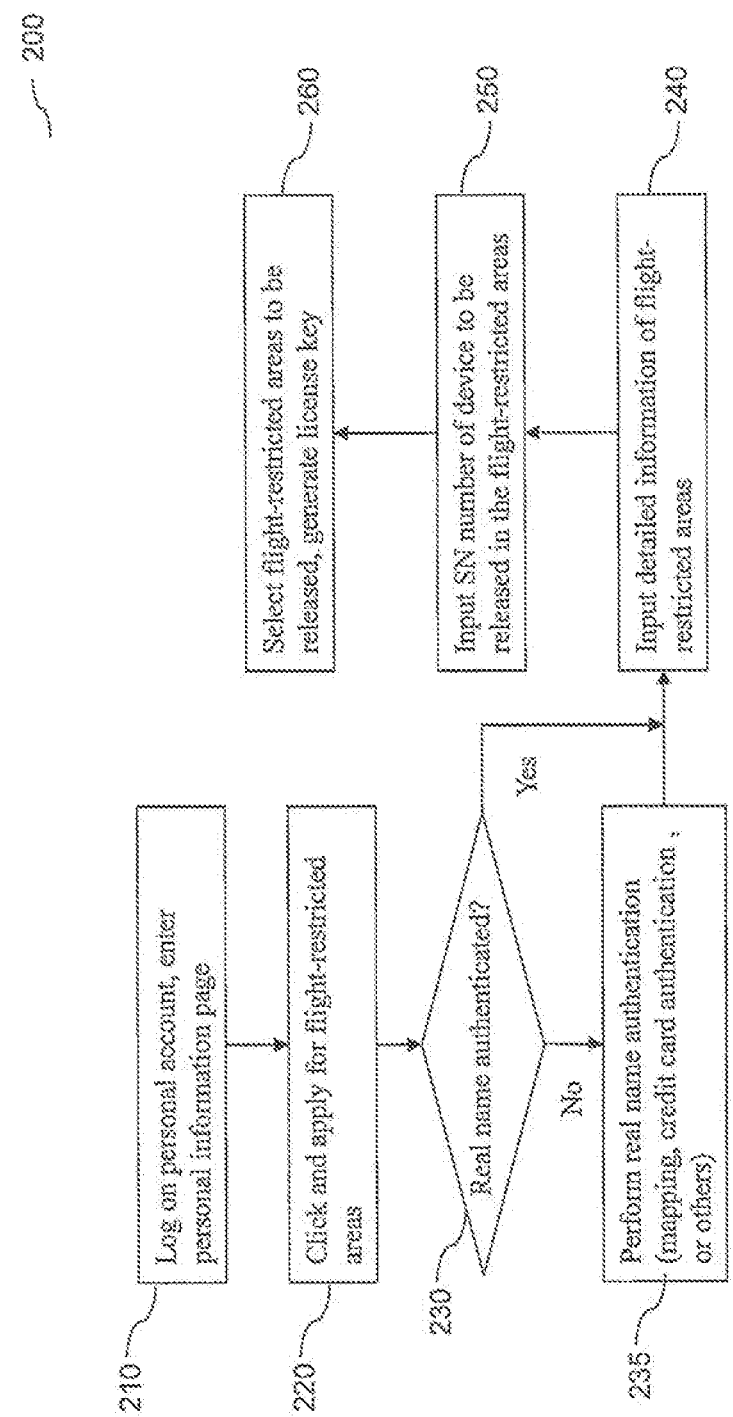

[Fig. 3]
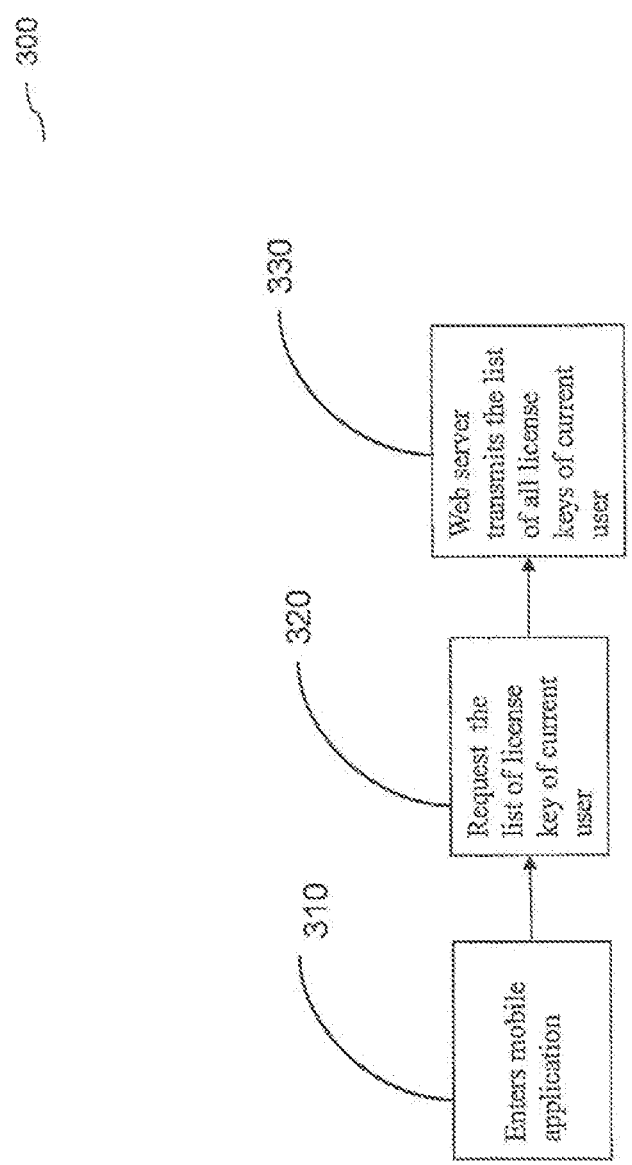

[Fig. 4]
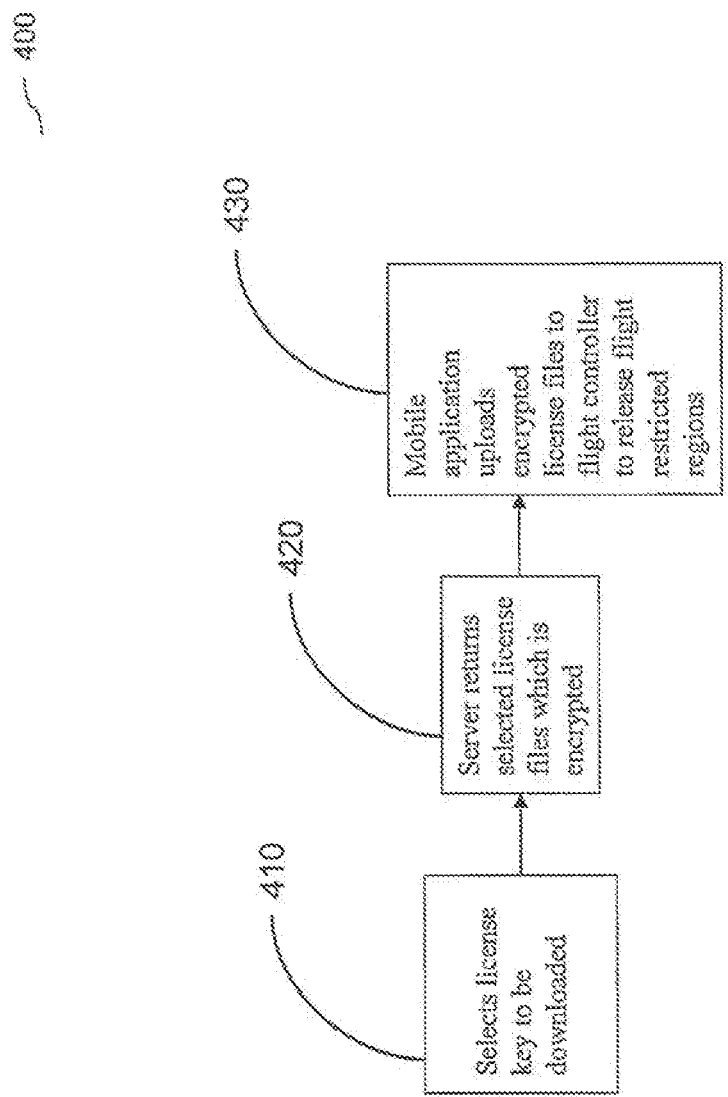

[Fig. 5]
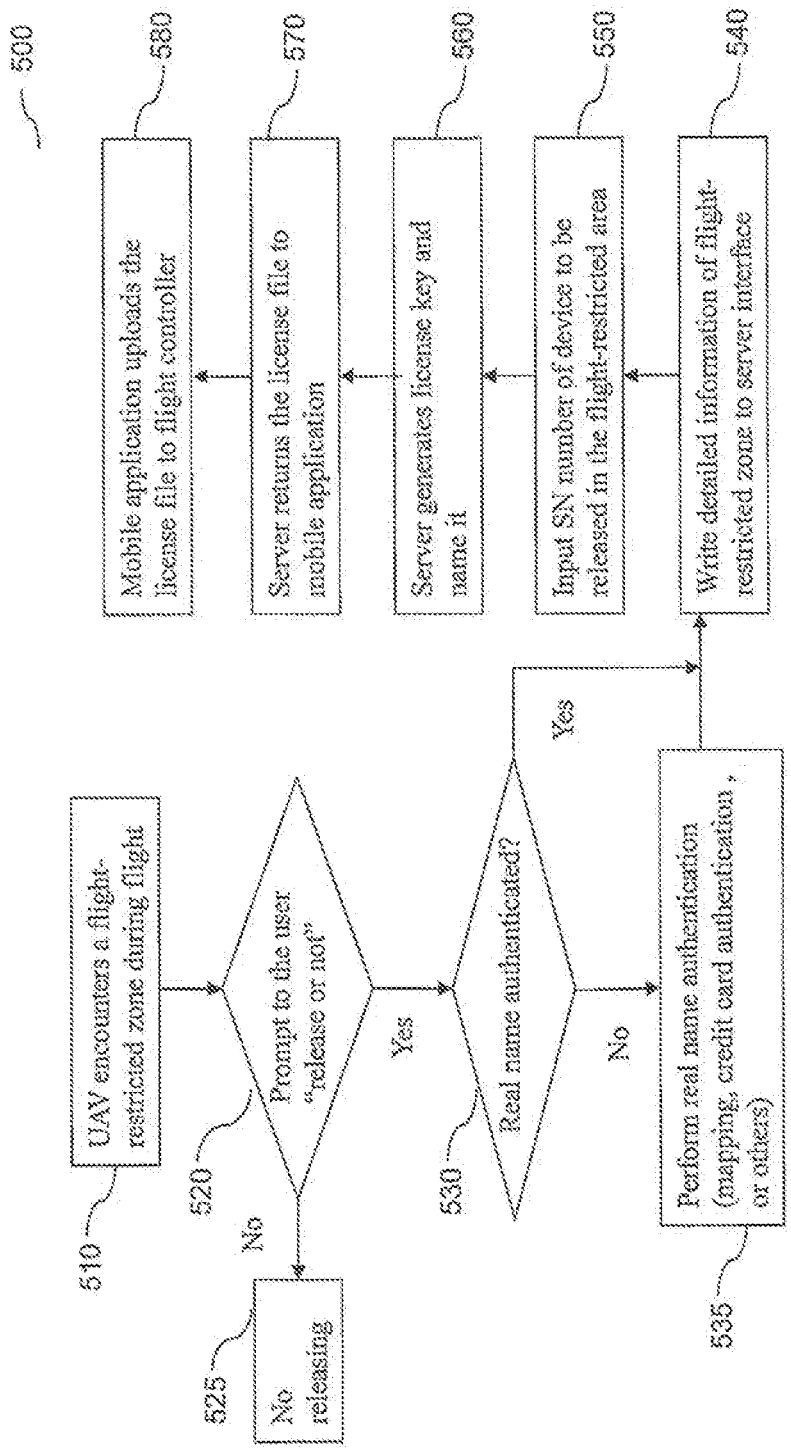

[Fig. 6]
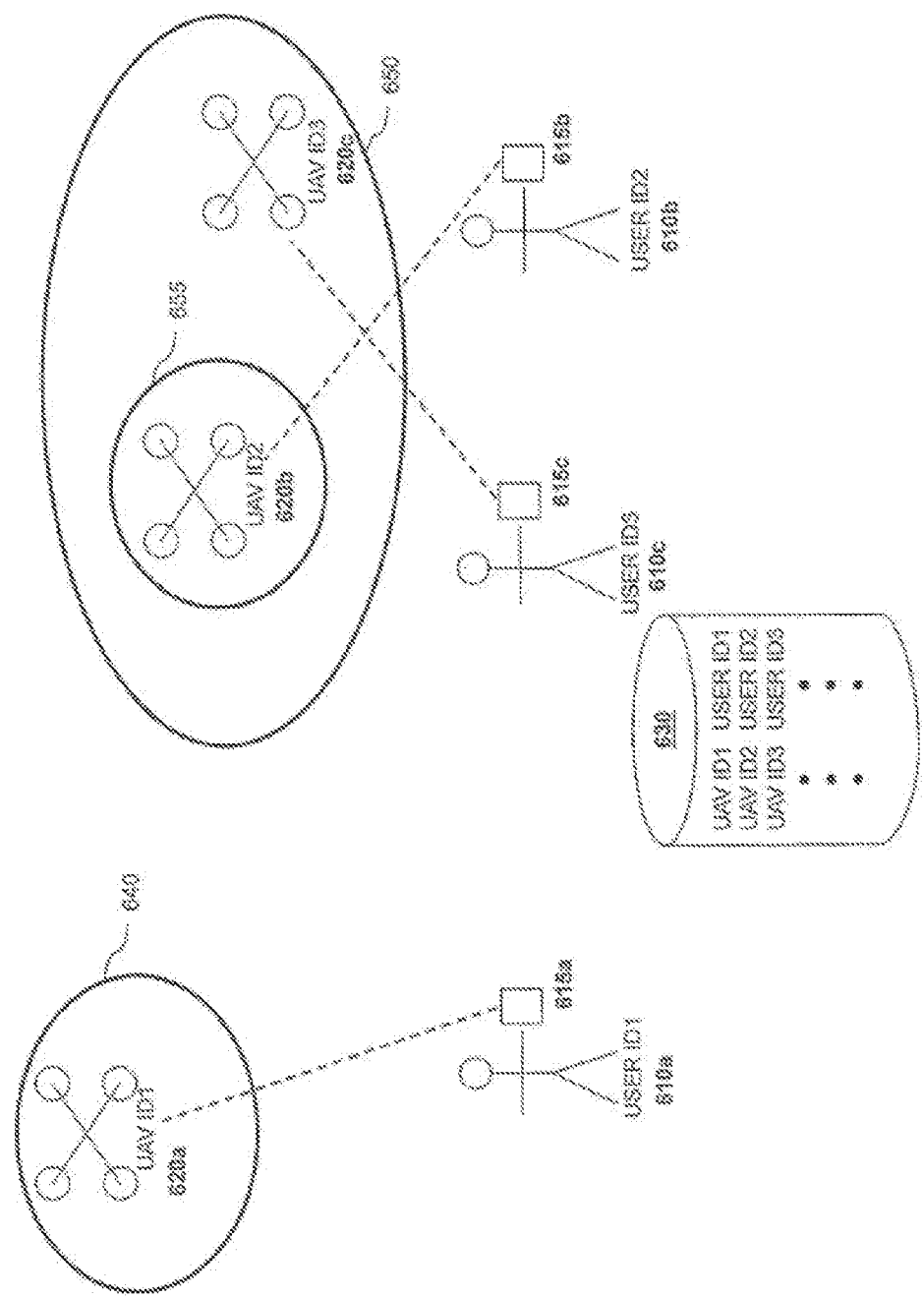

[Fig. 7]
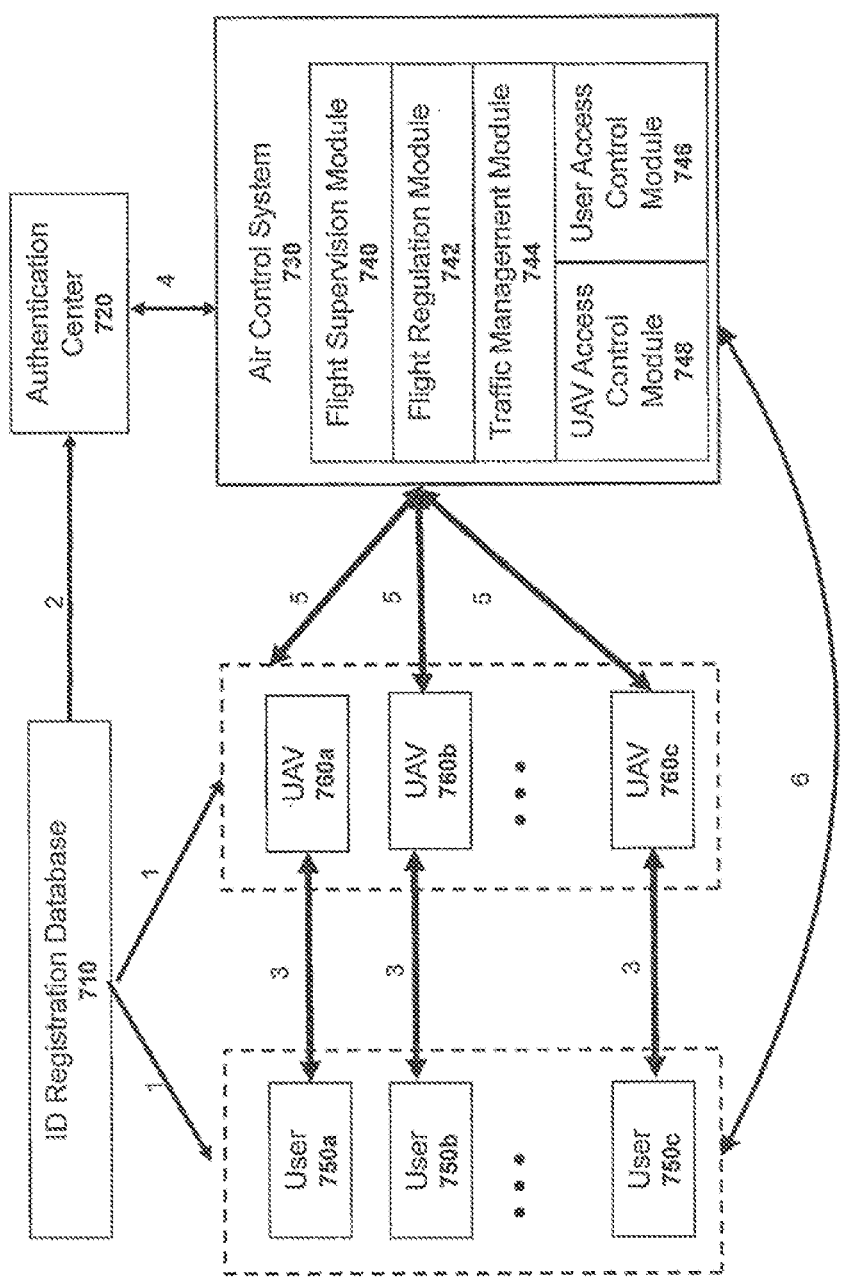

[Fig. 8]
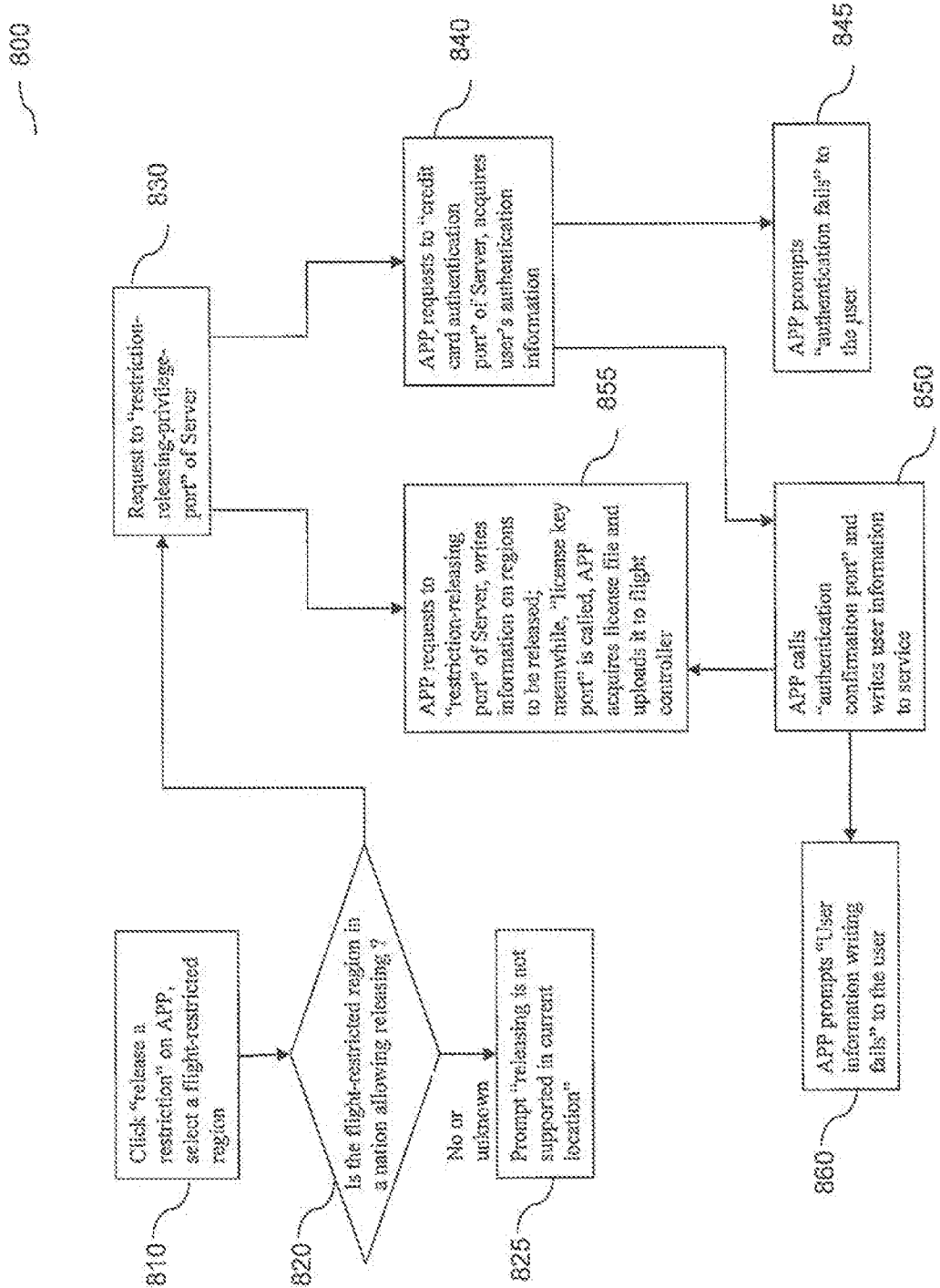

[Fig. 9]
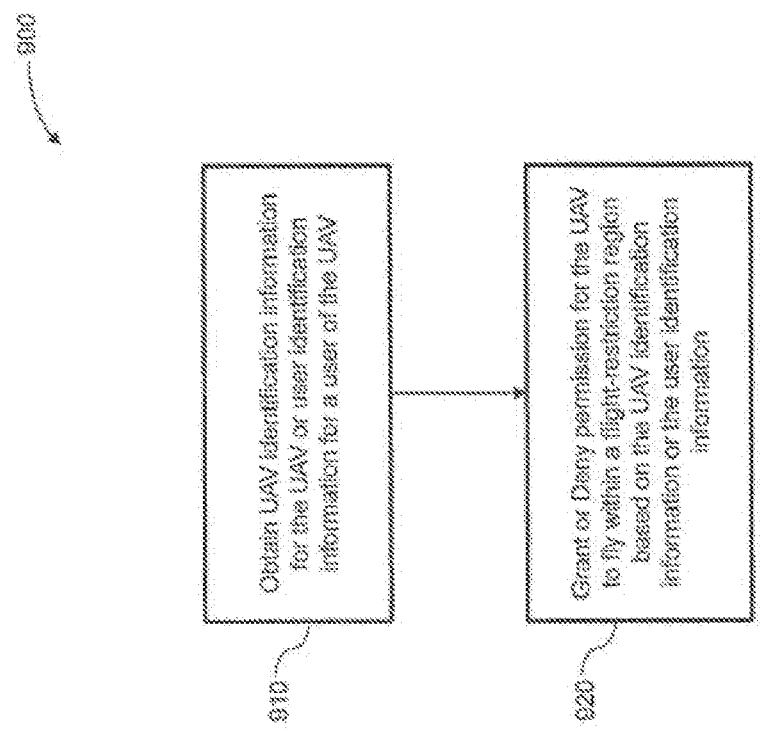

[Fig. 10]
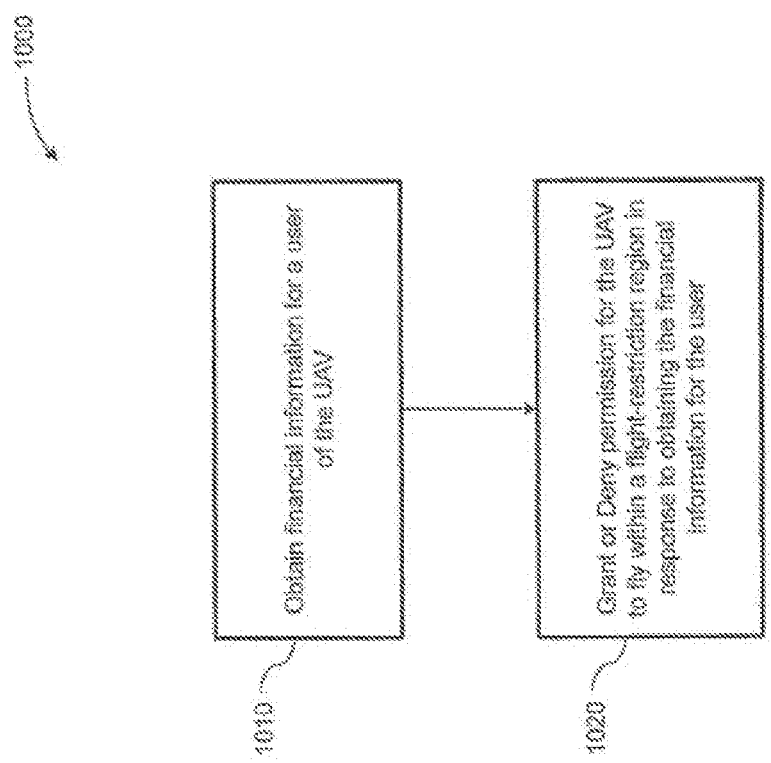

[Fig. 11]
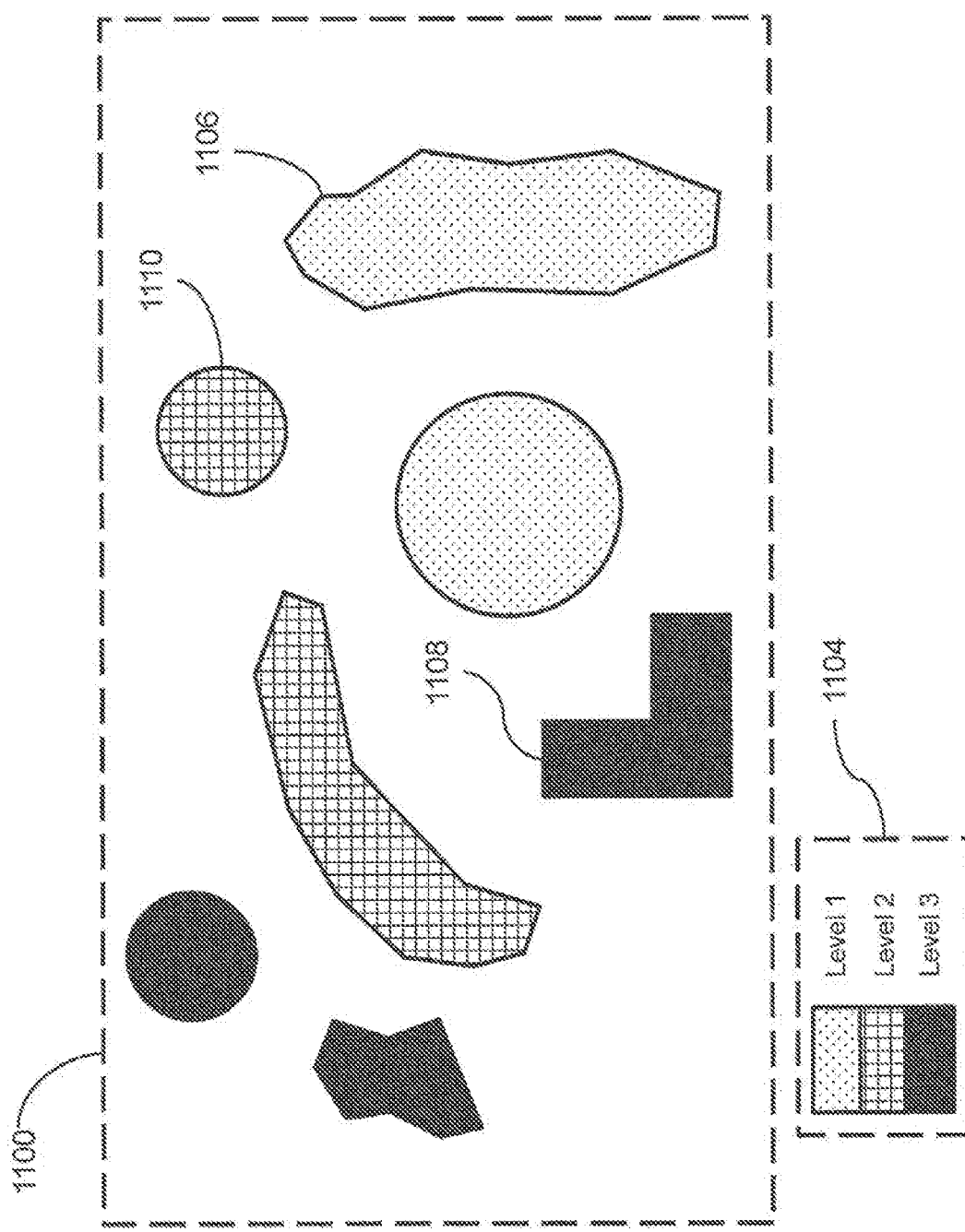

[Fig. 12]

| Operation | Entering the flight-restricted region | Taking off within flight-restricted region | Already within flight-restricted region (temporary flight-restricted region effective) |
|---|---|---|---|
| White region | Warning | Warning | Warning |
| Yellow region | Flight permitted if credit card authenticated | Taking off permitted if credit card authenticated | Flight continued if credit card authenticated, otherwise return |
| Red region | No entrance permitted | No taking off permitted | Forcibly return, irreversible |

1202
1204
1206

[Fig. 13]
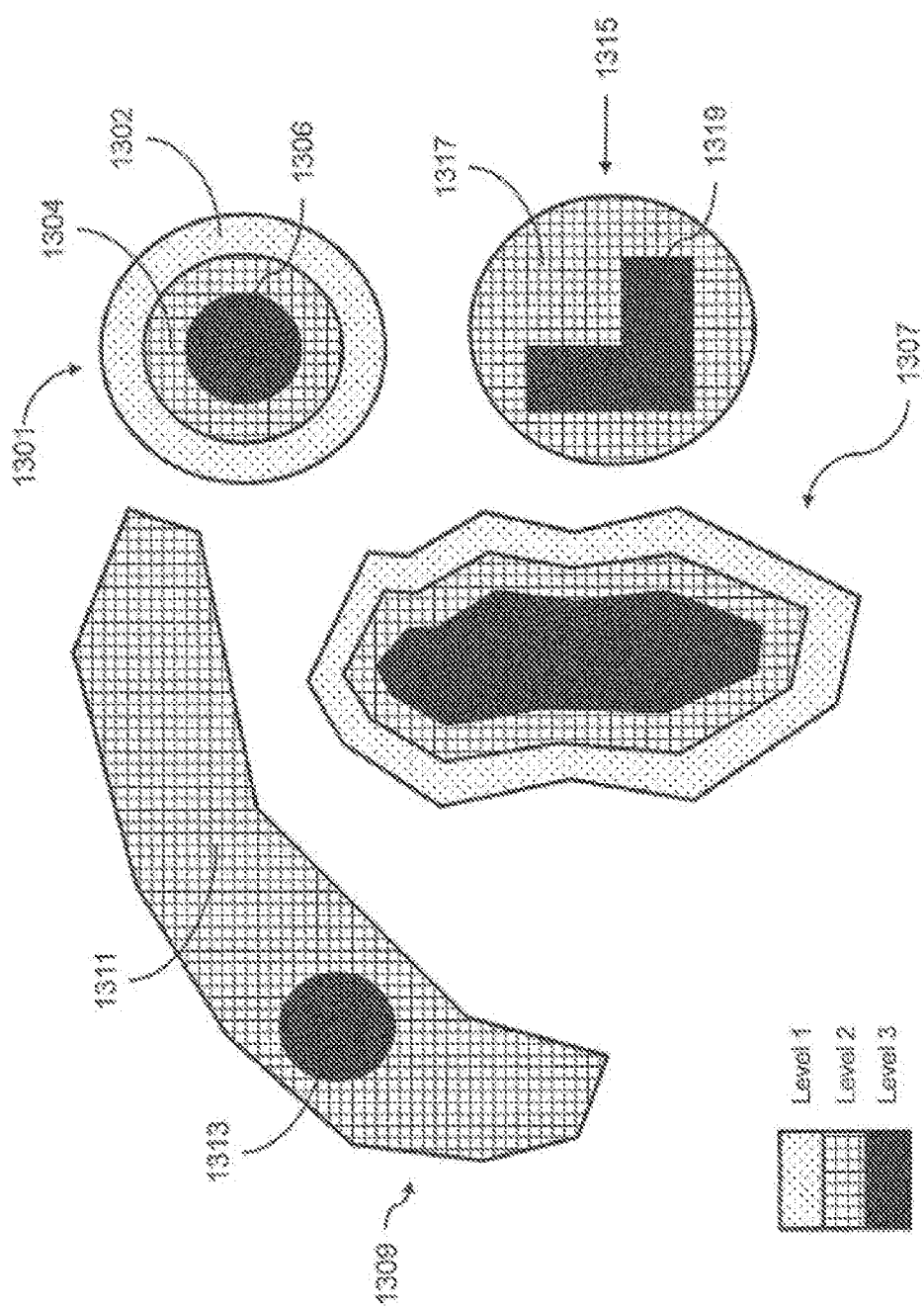

[Fig. 14]
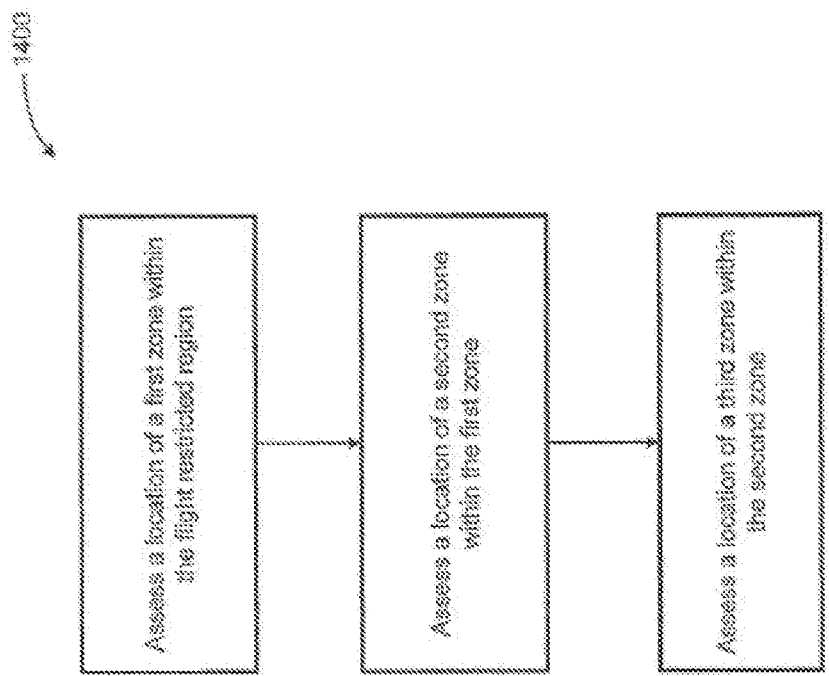

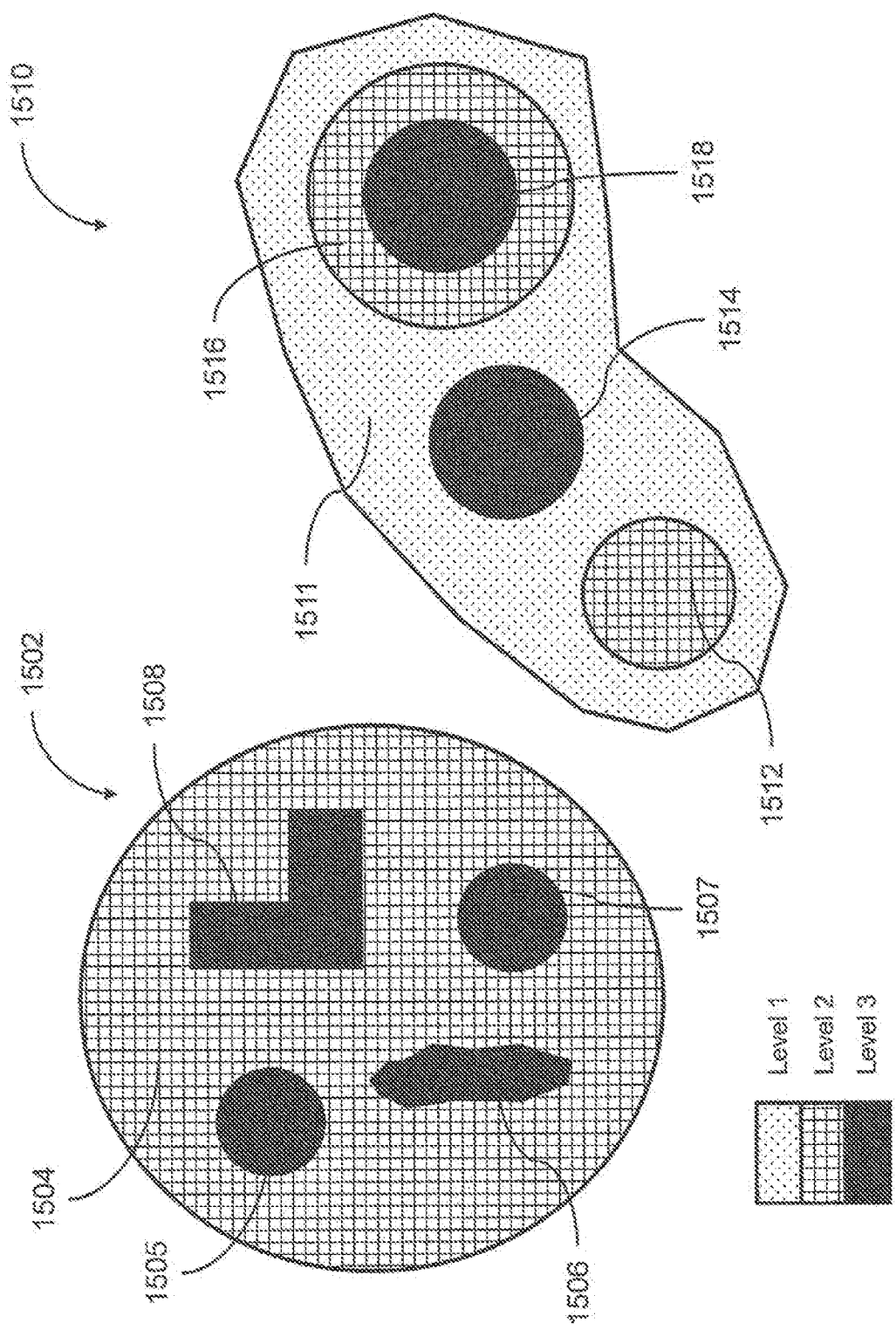
[Fig. 15]

[Fig. 16]
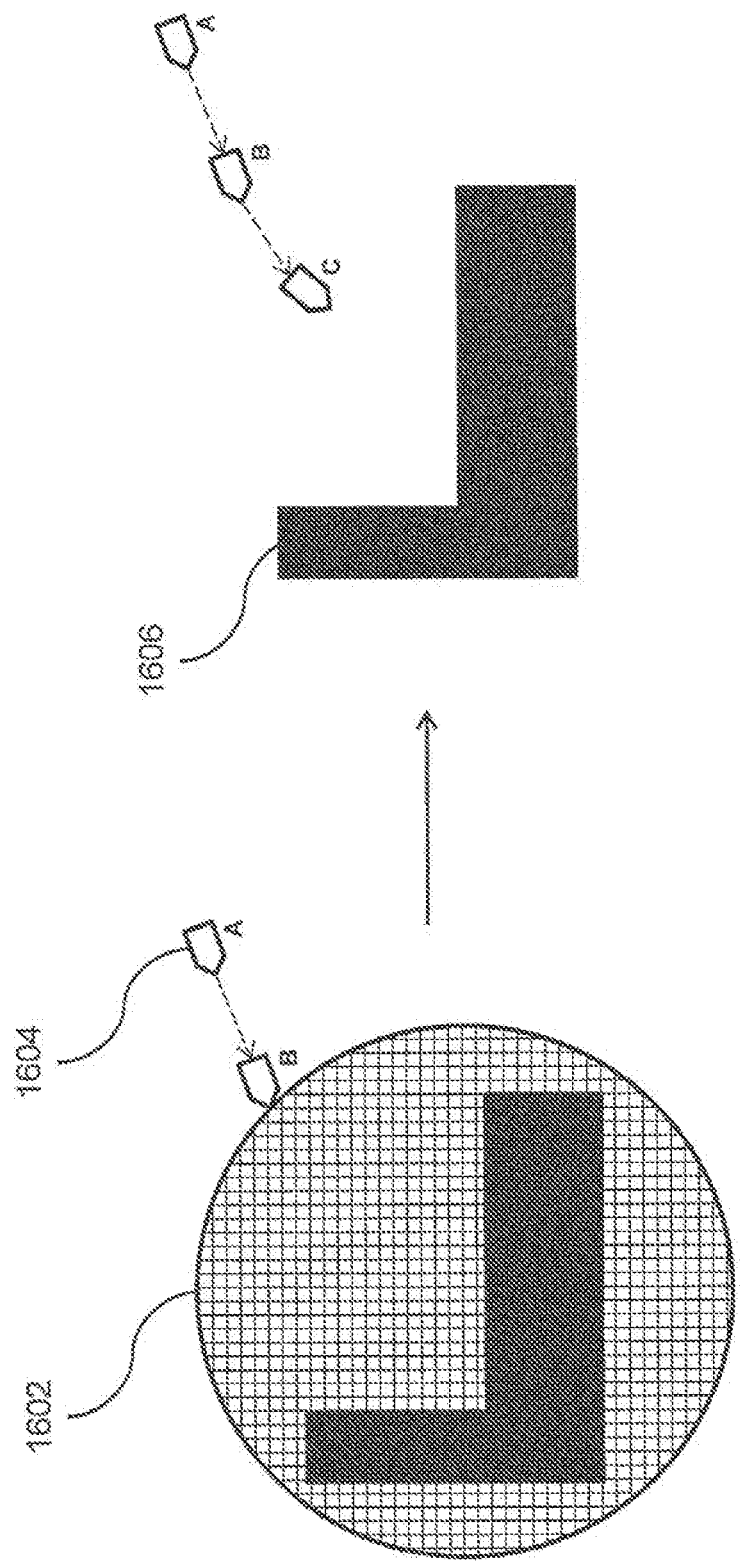

[Fig. 17]
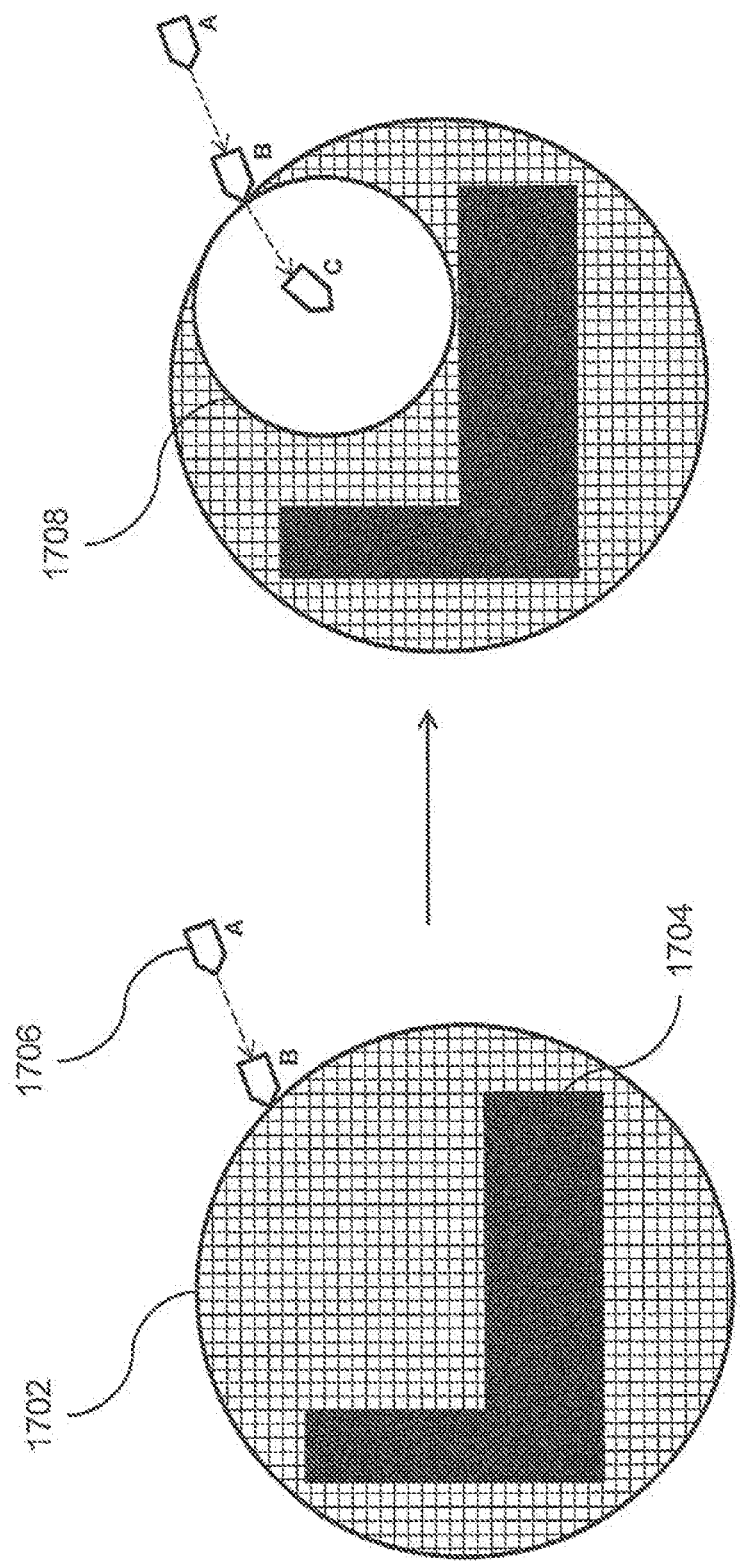

[Fig. 18]
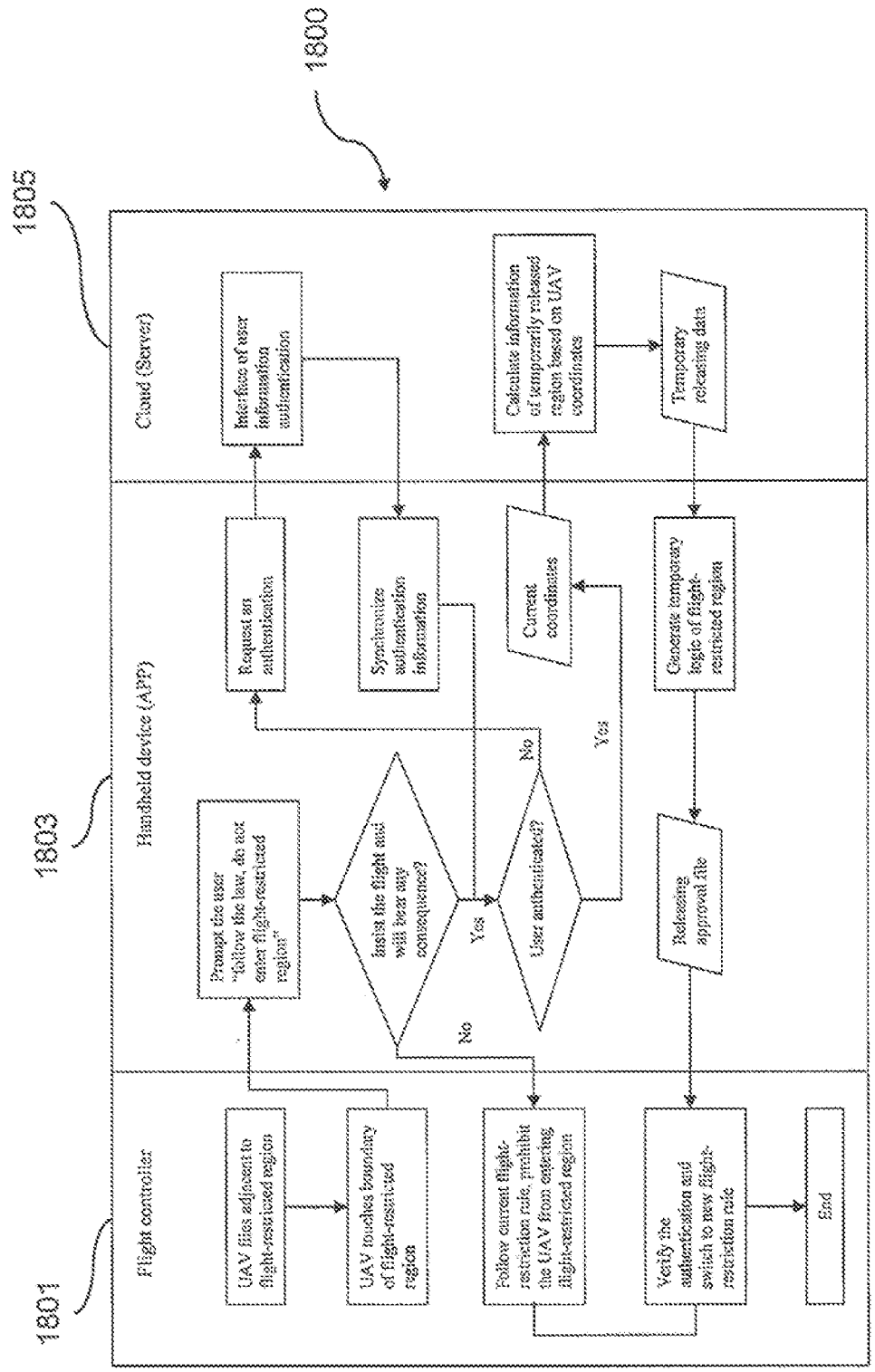

[Fig. 19]
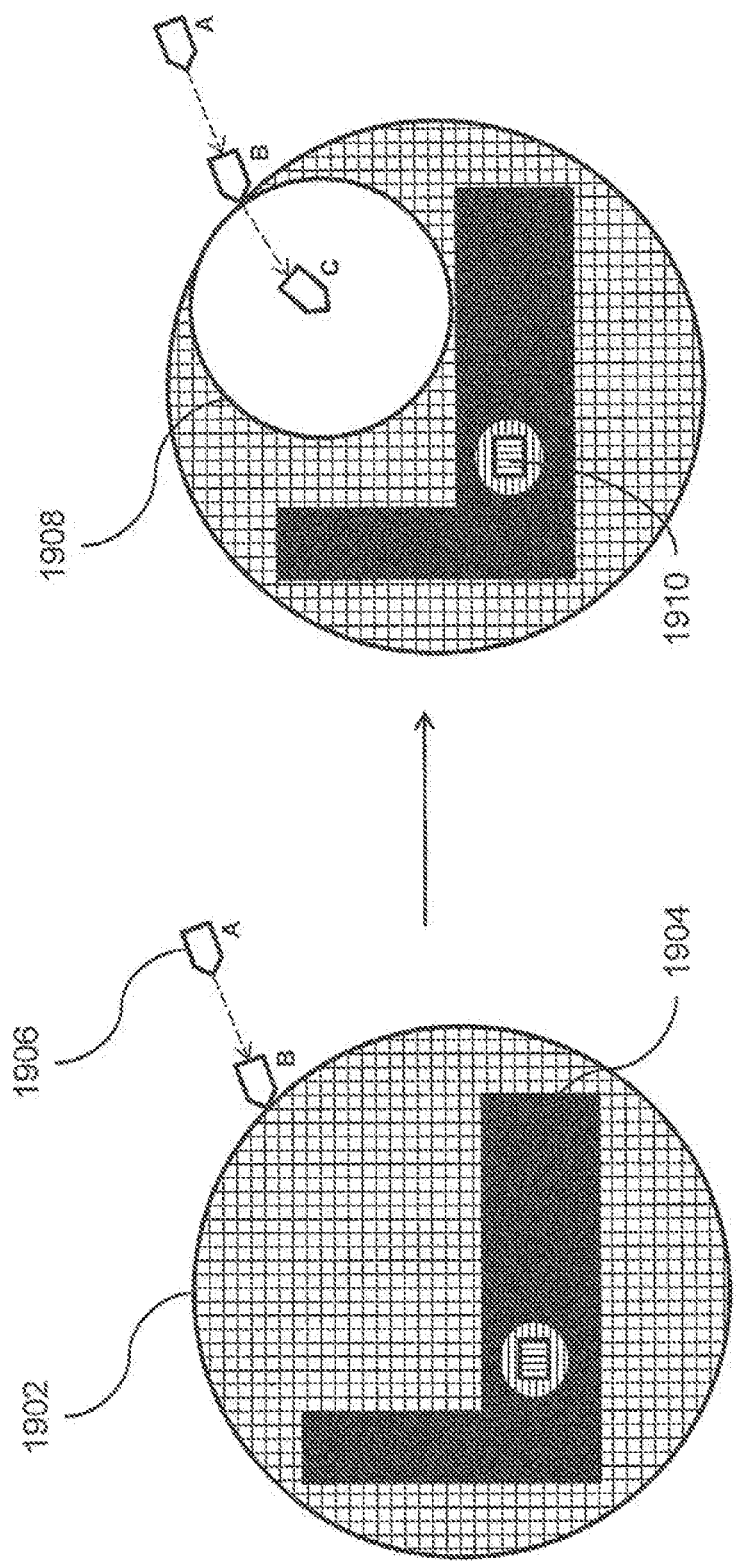

[Fig. 20]
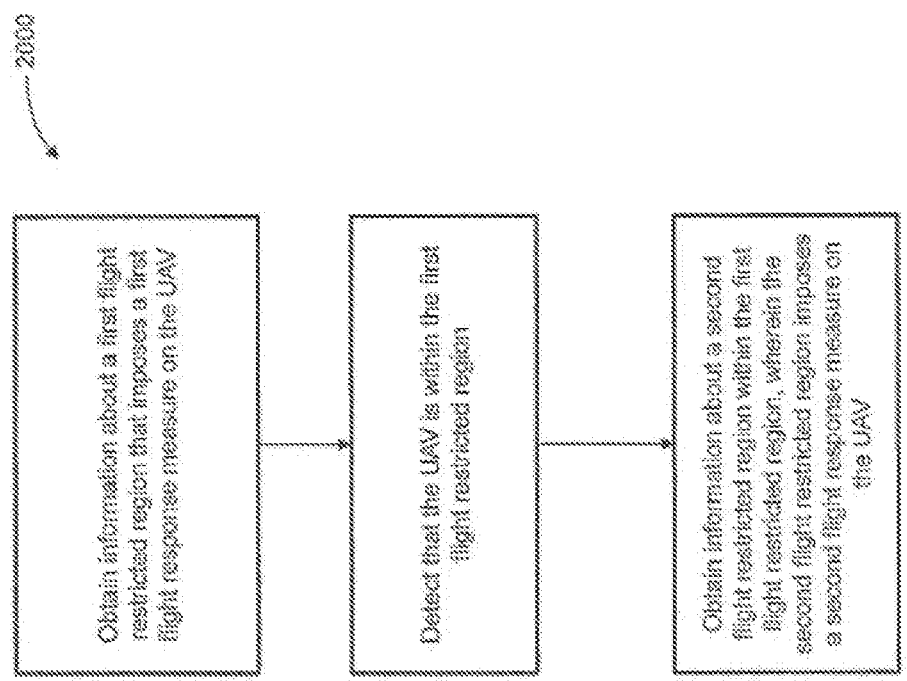

[Fig. 21]
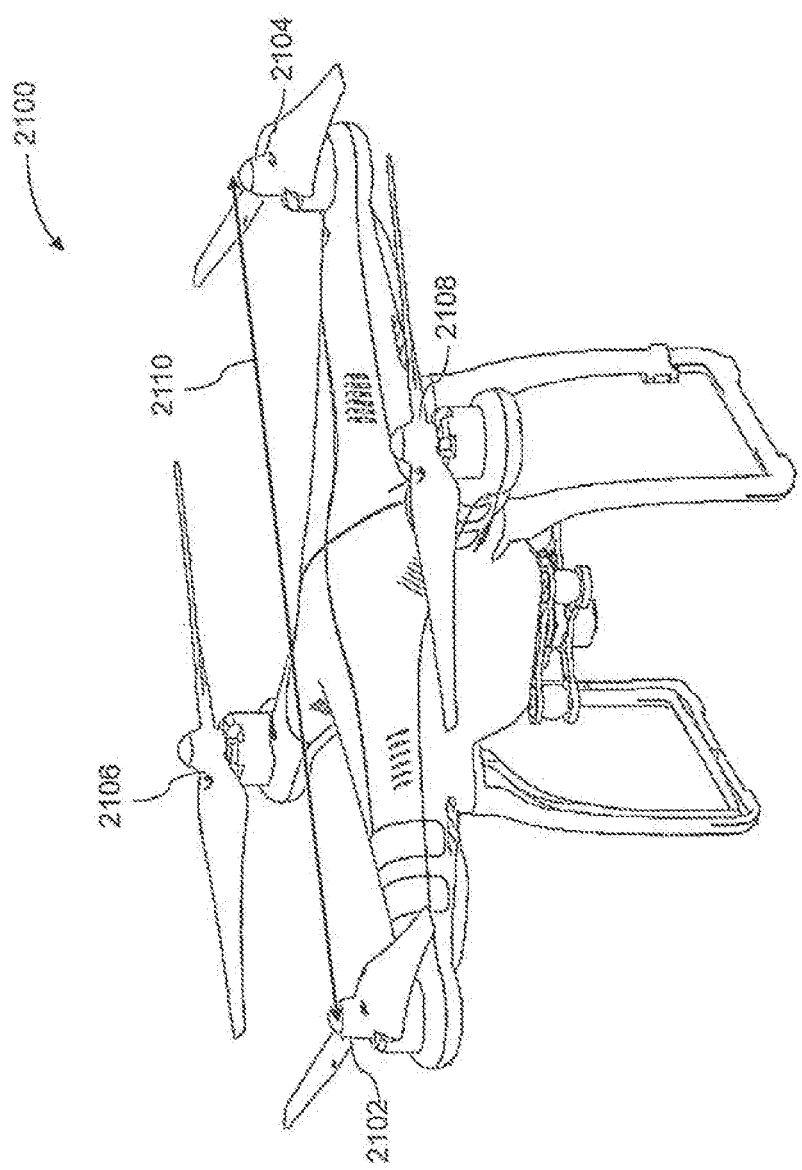

[Fig. 22]
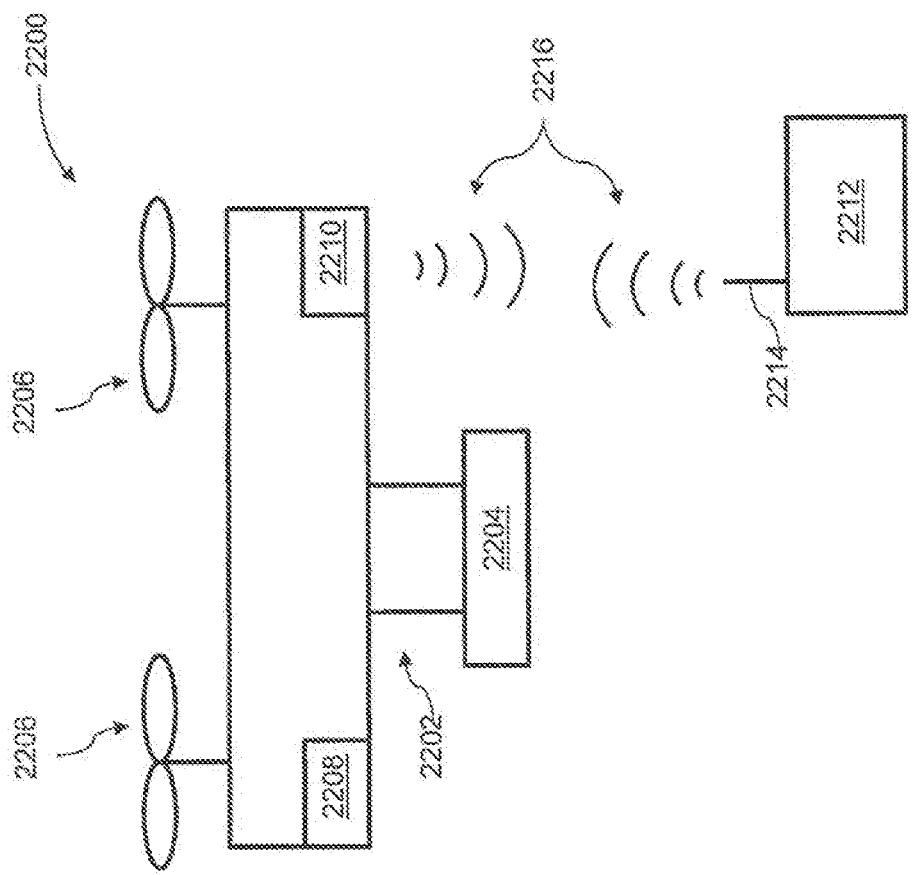

[Fig. 23]
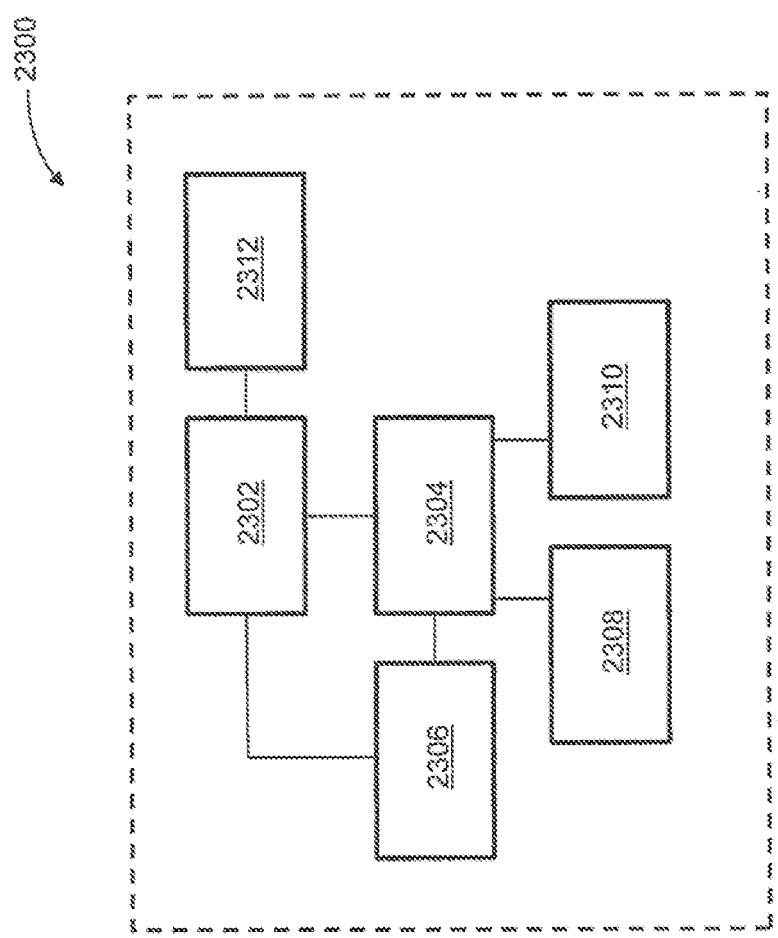

SYSTEMS AND METHODS FOR MANAGING FLIGHT-RESTRICTION REGIONS

CROSS-REFERENCE TO RELATED APPLICATION

This application is a national stage entry under 35 U.S.C. § 371 of International Application No. PCT/CN2015/094839, filed on Nov. 17, 2015, the entire contents of which are incorporated herein by reference.

BACKGROUND OF THE INVENTION

Aerial vehicles such as unmanned aerial vehicles (UAVs) can be used for performing surveillance, reconnaissance, and exploration tasks for military and civilian applications. Such vehicles may carry a payload configured to perform a specific function.

The air traffic control of every country (e.g. the FAA in the US) has various regulations for airspace near airports or other regions. In addition, even if not explicitly regulated, various public and private parties may desire restrictions on the operation of such aerial vehicles with respect to certain regions.

Having strict compulsory flight restriction regions for the various regions may be over or under inclusive and unnecessarily limit autonomy of an operator of the UAV.

SUMMARY OF THE INVENTION

It may be desirable to provide systems, devices, and methods for managing flight restriction regions for aerial vehicles. The flight restriction regions may comprise temporary flight restriction (TFR) regions. The systems, devices, and methods may be utilized to assist UAV operators in making smart decisions about where and when to fly the UAVs. The assistance may be provided in real time, or in advance to UAV take off using up to date airspace information that may be provided on a centralized server. In some instances, the various flight restriction regions may be divided into a plurality of distinct levels. Various flight restriction regions may be provided for the differing regions. The distinct levels may comprise at least a temporary flight restriction (TFR) region which may be released, upon certain conditions. For instance, the TFR may be released depending on authentication of the operator, UAV, or relevant information pertaining to the operator or UAV. The TFR may be released in response to a request by a UAV or operator of a UAV to release the TFR for the UAV. The implementation of distinct levels of flight restriction regions including TFR regions, releasable with authentication, may provide a path to both autonomy and accountability for operators of UAVs.

Thus, in one aspect, a method for regulating flight of an unmanned aerial vehicle (UAV) is provided. The method comprises: obtaining UAV identification information for the UAV or user identification information for a user of the UAV; and granting or denying permission for the UAV to fly within a flight-restriction region, automatically with aid of one or more processors, based on the UAV identification information or the user identification information.

In another aspect, a method for regulating flight of an unmanned aerial vehicle (UAV) is provided that comprises obtaining UAV identification information for the UAV or user identification information for a user of the UAV; and granting or denying permission for the UAV to fly within a flight-restriction region, automatically, based on the UAV identification information or the user identification information.

In another aspect, a system for regulating flight of an unmanned aerial vehicle (UAV) is provided. The system comprises one or more processors, individually or collectively configured to: obtain UAV identification information for the UAV or user identification information for a user of the UAV; and automatically grant or deny permission for the UAV to fly within a flight-restriction region based on the UAV identification information or the user identification information.

In another aspect, a non-transitory computer readable medium for regulating flight of an unmanned aerial vehicle (UAV) is provided. The non-transitory computer readable medium comprises code, logic, or instructions to: obtain UAV identification information for the UAV or user identification information for a user of the UAV; and automatically grant or deny permission for the UAV to fly within a flight-restriction region based on the UAV identification information or the user identification information.

In another aspect, an unmanned aerial vehicle (UAV) is provided. The UAV comprises: one or more propulsion units configured to effect flight of the UAV; and one or more processors that generate signals for the flight of the UAV, wherein said signals are generated based on whether the UAV is automatically granted or denied permission to fly within a flight-restriction region based on UAV identification information for the UAV or user identification information for a user of the UAV.

In practicing any of the methods, systems, non-transitory computer readable mediums, or UAVs, the following exemplary embodiments may be applicable. The user identification information may comprise a user identifier that uniquely identifies the user from other users. For example, the UAV identification information comprises information about a model, manufacturer, or performance characteristics of the UAV. Where desired, the UAV identification information comprises a serial number of the UAV. The user of the UAV can be an operator or owner of the UAV. Where desired, the user information comprises information about a user's name, address, phone number, information about a level of training for UAV flight of the user, certifications or licenses for UAV flight held by the user; or financial information for the user. The financial information for the user comprises a payment card for the user, where the payment card can include without limitation a credit card, debit card, gift card of the user, or corresponding record thereof. The financial information for the user can comprise bank account information of the user; and/or a pre-paid flight pass of the user. Any user information can be provided by or registered with a governmental agency. Alternatively, the user information is not provided by or registered with a governmental agency.

The practice of a method disclosed herein may further comprise assessing whether a location of the UAV falls within the flight-restriction region, optionally by one or more processors configured to assess whether a location of the UAV falls within the flight-restriction region. Where desired, the step of assessing whether the location of the UAV falls within the flight-restriction region depends on the UAV identification information or the user identification information. Where desired, the method further comprises obtaining a request for the UAV to fly within the flight-restriction region prior to granting or denying permission for the UAV to fly within the flight-restriction region. Such step is performed optionally with the aid of one or more processors being configured to obtain the request for the UAV to fly within the flight-restriction region prior to granting or denying permission for the UAV to fly within such flight-restriction region. In some embodiments, the request originates from the UAV, from a remote controller of the UAV, or from a server remote to the UAV. In some embodiments, the request is provided through a web-based application or a mobile application. The request can be made in real-time while the UAV is in flight toward the flight-restriction region, or the request is made in advance prior to the UAV flying toward the flight-restriction region. Where desired, the request comprises an indication of a proposed flight path of the UAV, the request comprises an indication of a proposed flight area of the UAV for unlocking, the request comprises an indication of a proposed timing of the UAV flight, or the request comprises current UAV location. In some embodiments, the request comprises an indication of a proposed flight path of the UAV. In some embodiments, the request comprises an indication of a proposed flight area of the UAV for unlocking. In some embodiments, the request comprises an indication of a proposed timing of the UAV flight. In some embodiments, the request comprises current UAV location.

In practice of a method disclosed herein, the step of granting or denying permission for the UAV to fly within the flight-restriction region occurs subsequent to authenticating an identity of the UAV or the user. Where desired, authenticating the an identity of the UAV comprises verification of the UAV identity, verification of the user identity, verification whether the UAV having the verified UAV identity does not have any record that the UAV should not be permitted to fly within the flight-restriction region, or verification whether the user having the verified user identity does not have any record that the user should not be permitted to operate the UAV within the flight-restriction region. In some embodiments, the UAV is granted permission to fly within the flight-restriction region when the UAV identity or the user identity is authenticated. In some other embodiments, the UAV is denied permission to fly within the flight-restriction region when the UAV identity or the user identity is not authenticated. Where desired, the method further comprises generating a license key corresponding to the flight-restriction region for the UAV or the user upon authenticating the identity of the UAV or the user, optionally with the aid of one or more processors being configured to generate the license key corresponding to the flight-restriction region for the UAV or the user, upon authenticating the identity of the UAV or the user. The step of granting or denying permission for the UAV to fly within the flight-restriction region may also depend on air traffic within the flight-restriction region. The air traffic within the flight-restriction comprises a number of other UAVs already within the flight-restriction region. In some embodiments, the UAV is prevented from flying within the flight-restriction region without granted permission to fly within the flight-restriction region. In other embodiments, the UAV is able to fly within the flight restriction region when granted permission to fly within the flight-restriction region. In some embodiments, the method further comprises permitting the user to configure one or more flight parameters within the flight-restriction region, when the user is granted permission to fly within the flight-restriction region. Such step can be effectuated with the aid of one or more processors being configured to permit the user to configure one or more flight parameters within the flight-restriction region, when the user is granted permission to fly within the flight-restriction region. Where desired, the flight parameter can comprise a maximum or minimum height of UAV flight, and/or maximum speed of the UAV flight. Where desired, the method further comprises monitoring activity of the UAV within the flight-restriction region when the UAV is granted permission to fly within the flight-restriction region. Such step can be effectuated with the aid of one or more processors being configured to monitor activity of the UAV within the flight-restriction region when the UAV is granted permission to fly within the flight-restriction region. In some embodiments, the activity of the UAV is monitored with aid of a server at a location remote to the UAV, with aid of a data recording device on-board the UAV or on-board a remote controller of the UAV, with aid of data transmitted from the UAV, a remote controller of the UAV, or a flight-restriction monitoring device. In some embodiments, the method further comprises detecting, with aid of the UAV, that the flight-restriction region is designated in error. This can be effectuated with aid of one or more processors being configured to detect such error. Where desired, the method further comprises reporting an update, by the UAV, that the flight-restriction region is designated in error. Such step also can be performed with aid of one or more processors being configured to report the update.

The practice of the aforementioned method may utilize one or more subject UAVs, one or more subject systems, and/or subject non-transitory computer readable medium. All of the features referenced in practicing the aforementioned method are applicable for construction and usage of the subject UAV, system, and/or non-transitory computer readable medium. For example, the subject non-transitory computer readable medium comprises codes, logics, or instructions to assess whether a location of the UAV falls within the flight-restriction region. The subject non-transitory computer readable medium may obtain a request for UAV to fly within the flight-restriction region prior to granting or denying permission for the UAV to fly within the flight-restriction region. In some embodiments subject non-transitory computer readable medium comprises codes, logics or instructions to generate a license key corresponding to the flight-restriction region for the UAV or the user upon authenticating the identity of the UAV or the user. In some embodiments subject non-transitory computer readable medium comprises codes, logics or instructions to permit the user to configure one or more flight parameters within the flight-restriction region, when the user is granted permission to fly within the flight-restriction region. In some embodiments, the non-transitory computer readable medium further comprises code, logic, or instructions to monitor activity of the UAV within the flight-restriction region when the UAV is granted permission to fly within the flight-restriction region. In some embodiments, the non-transitory computer readable medium further comprises code, logic, or instructions to detect, with aid of the UAV, that the flight-restriction region is designated in error. In yet some other embodiments, the non-transitory computer readable medium further comprises code, logic, or instructions to report an update, by the UAV, that the flight-restriction region is designated in error.

In some embodiments, the subject UAV and/or system may comprise one or more processors that assess whether a location of the UAV falls within the flight-restriction region. With the aid of one or more processors, the subject UAV and/or system may obtain a request for UAV to fly within the flight-restriction region prior to granting or denying permission for the UAV to fly within the flight-restriction region. In some embodiments, the subject UAV and/or system are configured, with aid of one or more processors, to generate a license key corresponding to the flight-restriction region for the UAV or the user upon authenticating the identity of the UAV or the user. In some embodiments, the subject UAV and/or system are configured, with aid of one or more processors, to permit the user to configure one or more flight parameters within the flight-restriction region, when the user is granted permission to fly within the flight-restriction region. In some embodiments, the subject UAV and/or system are configured to monitor activity of the UAV within the flight-restriction region when the UAV is granted permission to fly within the flight-restriction region, with aid of one or more processors. In some embodiments, the subject UAV and/or system are configured to detect, with aid of the UAV, that the flight-restriction region is designated in error. In yet some other embodiments, the subject UAV and/or system are configured to report with an aid of one or more processors, an update by the UAV, that the flight-restriction region is designated in error.

In another separate but related aspect, a method for regulating flight of an unmanned aerial vehicle (UAV) is provided. The method comprises: obtaining financial information for a user of the UAV; and granting or denying permission for the UAV to fly within a flight-restriction region in response to obtaining the financial information for the user.

In another aspect, a system for regulating flight of an unmanned aerial vehicle (UAV) is provided. The system comprises one or more processors, individually or collectively configured to: obtain financial information for a user of the UAV; and grant or deny permission for the UAV to fly within a flight-restriction region in response to obtaining the financial information for the user.

In another aspect, a non-transitory computer readable medium for regulating flight of an unmanned aerial vehicle (UAV) is provided. The non-transitory computer readable medium comprises code, logic, or instructions to: obtain financial information for a user of the UAV; and grant or deny permission for the UAV to fly within a flight-restriction region in response to obtaining the financial information for the user.

In another aspect, an unmanned aerial vehicle (UAV) is provided. The UAV comprises: one or more propulsion units configured to effect flight of the UAV; and one or more processors that generate signals for the flight of the UAV, wherein said signals are generated based on whether the UAV is automatically granted or denied permission to fly within a flight-restriction region based on financial information of a user of the UAV.

In practicing any of the methods, systems, non-transitory computer readable mediums, or UAVs, the following exemplary embodiments may be applicable. The financial information for the user may comprise a payment card for the user. Where desired, the payment card is a credit card, debit card, or gift card of the user. In some embodiments, the financial information for the user comprises without limitation bank account information of the user, a pre-paid flight pass of the user, and/or insurance information of the user. In some embodiments, the user of the UAV, or the user may refer to an operator or an owner of the UAV.

The practice of a method disclosed herein may further comprise assessing whether a location of the UAV falls within the flight-restriction region. Wherein desired, the assessing of the location of the UAV occurs in real-time. Alternatively, the assessing of the location of the UAV occurs prior to granting or denying permission for the UAV to fly within the flight-restriction zone.

In some embodiments, the practice of a method disclosed herein may further comprise obtaining a request for the UAV to fly within the flight-restriction region prior to granting or denying permission for the UAV to fly within the flight-restriction region. In some embodiments, the request originates from the UAV, from a remote controller of the UAV, or from a server remote to the UAV. In some embodiments, the request is provided through a web-based application or a mobile application. Where desired, the request may comprise an indication of a proposed flight path of the UAV, an indication of a proposed flight area of the UAV, or an indication of a proposed timing of the UAV flight. In some embodiments, the request is made in real-time while the UAV is in flight toward the flight-restriction region. Alternatively, the request is made in advance prior to the UAV flying toward the flight-restriction region.

In practice of a method described herein, the step of granting or denying permission for the UAV to fly within the flight-restriction region may occur with aid of one or more processors. Where desired, the granting or denying of permission for the UAV to fly within the flight-restriction region may occur without human intervention. In some embodiments, the granting or denying of permission for the UAV to fly within the flight-restriction region occurs based on rule-based assessment by the one or more processors.

The granting or denying permission for the UAV to fly within the flight-restriction region may occur subsequent to verifying the financial information for the user. Optionally, verifying the financial information for the user comprises verifying a minimum availability of accessible funds for the user, verifying accuracy of the financial information for the user, and/or undergoing an automated clearing house (ACH) process. The UAV may be granted permission to fly within the flight-restriction region when the financial information is verified. Where desired, the UAV may be denied permission to fly within the flight-restriction region when the financial information is not verified.

In some embodiments, the granting or denying permission for the UAV to fly within the flight-restriction region is based on an identity of the user or an identity of the UAV. Without granted permission to fly within the flight restricted region, the UAV may be automatically prevented from flying within the flight-restriction region. Where desired, the UAV is able to fly within the fight-restriction region when granted permission to fly within the flight-restriction region.

In some embodiments, the practice of a method described herein further comprises permitting the user to configure one or more flight parameters within the flight-restriction region, when the user is granted permission to fly within the flight-restriction region. In some embodiments, a flight parameter of the one or more flight parameters is a maximum or minimum height of UAV flight and/or a maximum speed of the UAV flight.

In some embodiments, the practice of a method described herein further comprise monitoring activity of the UAV within the flight-restriction region when the UAV is granted permission to fly within the flight-restriction region. Where desired, the activity of the UAV is monitored with aid of a server at a location remote to the UAV and/or with aid of a data recording device on-board the UAV or on-board a remote controller of the UAV. In some embodiments, the practice of a method described herein may further comprise detecting whether an activity of the UAV results in financial liability, automatically imparting financial liability to the user based on the user's credit card or debit card when monitoring the activity results in a detection of financial liability, and/or charging a toll or fee for the activity of the UAV within the flight-restriction region. In some embodiments, the financial liability comprises damage to property within the flight-restriction region, injury to an individual or animal within the flight-restriction region, nuisance or inconvenience to individuals within the flight-restriction region, and/or violation of a law, rule, or regulation within the flight-restriction region. Where desired, the practice of a method described herein may further comprise charging the user of the UAV an amount of money based on the financial liability and/or charging an insurance of the user of the UAV an amount of money based on the financial liability. In some embodiments, the practice of a method described herein may further comprise automatically deducting the amount of money using the financial information for the user of the UAV. Where desired, the method may further comprise sharing the toll or the fee with an owner of a property that is affected by the activity of the UAV. In some embodiments, the owner of the property may be affected by the activity of the UAV when damage is caused by the UAV to the property and/or by the activity of the UAV if the UAV flies over the property.

In some embodiments, the financial information is stored during the duration of the flight of the UAV within the flight-restriction region. Where desired, the financial information is stored subsequent to the flight of the UAV within the flight-restriction region. Optionally, the financial information is stored for a predetermined period following the flight of the UAV within the flight-restriction region or is stored until a request by the user to delete the financial information. Alternatively, in some embodiments, the financial information is automatically deleted after the flight of the UAV within the flight-restriction region.

In some embodiments, the practice of the method described herein further comprises detecting, with aid of the UAV, that the flight-restriction region is designated in error. In some embodiments, the method may further comprise reporting an update, by the UAV, that the flight-restriction region is designated in error.

The practice of the aforementioned method may utilize one or more subject UAVs, one or more subject systems, and/or subject non-transitory computer readable medium. All of the features referenced in practicing the aforementioned method are applicable for construction and usage of the subject UAV, system, and/or non-transitory computer readable medium. For example, the non-transitory computer readable medium may comprise code, logic, or instructions to assess whether a location of the UAV falls within the flight-restriction region. In some embodiments, the non-transitory computer readable medium may comprises code, logic, or instructions to permit the user to configure one or more flight parameters within the flight-restriction region, when the user is granted permission to fly within the flight-restriction region. In some embodiments, the non-transitory computer readable medium may comprise code, logic, or instructions to monitor activity of the UAV within the flight-restriction region when the UAV is granted permission to fly within the flight-restriction region. In some embodiments, the non-transitory computer readable medium may comprise code, logic, or instructions to detect whether an activity of the UAV results in financial liability. In some embodiments, the non-transitory computer readable medium may comprise code, logic, or instructions to charge the user of the UAV an amount of money based on the financial liability. In some embodiments, the non-transitory computer readable medium may comprise code, logic, or instructions to automatically deduct the amount of money using the financial information for the user of the UAV. In some embodiments, the non-transitory computer readable medium may comprise code, logic, or instructions to charge an insurance of the user of the UAV an amount of money based on the financial liability. In some embodiments, the non-transitory computer readable medium may comprise code, logic, or instructions to automatically impart financial liability to the user based on the user's credit card or debit card when monitoring the activity results in a detection of financial liability. In some embodiments, the non-transitory computer readable medium may comprise code, logic, or instructions to charge a toll or fee for the activity of the UAV within the flight-restriction region. In some embodiments, the non-transitory computer readable medium may comprise code, logic, or instructions to share the toll or the fee with an owner of a property that is affected by the activity of the UAV. In some embodiments, the non-transitory computer readable medium further comprises code, logic, or instructions to detect, with aid of the UAV, that the flight-restriction region is designated in error. In some embodiments, the non-transitory computer readable medium may comprise code, logic, or instructions to report an update, by the UAV, that the flight-restriction region is designated in error.

In some embodiments, the subject UAV and/or system may to assess, with aid of one or more processors, whether a location of the UAV falls within the flight-restriction region. In some embodiments, the subject UAV and/or system may comprise one or more processors configured to permit the user to configure one or more flight parameters within the flight-restriction region, when the user is granted permission to fly within the flight-restriction region. In some embodiments, the subject UAV and/or system may comprise one or more processors configured to monitor activity of the UAV within the flight-restriction region when the UAV is granted permission to fly within the flight-restriction region. In some embodiments, the subject UAV and/or system may comprise one or more processors configured to detect whether an activity of the UAV results in financial liability. In some embodiments, the subject UAV and/or system may comprise one or more processors configured to charge the user of the UAV an amount of money based on the financial liability. In some embodiments, the subject UAV and/or system may comprise one or more processors configured to automatically deduct the amount of money using the financial information for the user of the UAV. In some embodiments, the subject UAV and/or system may comprise one or more processors configured charge an insurance of the user of the UAV an amount of money based on the financial liability. In some embodiments, the subject UAV and/or system may comprise one or more processors configured to automatically impart financial liability to the user based on the user's credit card or debit card when monitoring the activity results in a detection of financial liability. In some embodiments, the subject UAV and/or system may comprise one or more processors configured to charge a toll or fee for the activity of the UAV within the flight-restriction region. In some embodiments, the subject UAV and/or system may comprise one or more processors configured to share the toll or the fee with an owner of a property that is affected by the activity of the UAV. In some embodiments, the subject UAV and/or system may comprise one or more processors configured to detect, with aid of the UAV, that the flight-restriction region is designated in error. In some embodiments, t the subject UAV and/or system may comprise one or more processors configured to report an update, by the UAV, that the flight-restriction region is designated in error.

In yet another aspect, a method for regulating flight of an unmanned aerial vehicle (UAV) is provided. The method comprises: obtaining information about a first flight-restriction region that imposes a first flight response measure on the UAV when the UAV is within the first flight-restriction region; detecting that the UAV is within the first flight-restriction region; and obtaining, subsequent to detecting that the UAV is within the first flight-restriction region, information about a second flight-restriction region within the first flight-restriction region, wherein the second flight-restriction region imposes a second flight response measure on the UAV when the UAV is within the second flight-restriction region, wherein the second flight response measure is different from the first flight response measure.

In another aspect, a system for regulating flight of an unmanned aerial vehicle (UAV) is provided. The system comprises one or more processors, individually or collectively configured to: obtain information about a first flight-restriction region that imposes a first flight response measure on the UAV when the UAV is within the first flight-restriction region; obtain information that the UAV is within the first flight-restriction region: and obtain, subsequent to obtaining information that the UAV is within the first flight-restriction region, information about a second flight-restriction region within the first flight-restriction region, wherein the second flight-restriction region imposes a second flight response measure on the UAV when the UAV is within the second flight-restriction region, wherein the second flight response measure is different from the first flight response measure.

In another aspect, a non-transitory computer readable medium for regulating flight of an unmanned aerial vehicle (UAV) is provided. The non-transitory computer readable medium comprises code, logic, or instructions to: obtain information about a first flight-restriction region that imposes a first flight response measure on the UAV when the UAV is within the first flight-restriction region; obtain information that the UAV is within the first flight-restriction region; and obtain, subsequent to obtaining information that the UAV is within the first flight-restriction region, information about a second flight-restriction region within the first flight-restriction region, wherein the second flight-restriction region imposes a second flight response measure on the UAV when the UAV is within the second flight-restriction region, wherein the second flight response measure is different from the first flight response measure.

In another aspect, an unmanned aerial vehicle (UAV) is provided. The UAV comprises: one or more propulsion units configured to effect flight of the UAV; and one or more processors that are, individually or collectively, configured to: obtain information about a first flight-restriction region that imposes a first flight response measure on the UAV when the UAV is within the first flight-restriction region; obtain information that the UAV is within the first flight-restriction region; and obtain, subsequent to obtaining information that the UAV is within the first flight-restriction region, information about a second flight-restriction region within the first flight-restriction region, wherein the second flight-restriction region imposes a second flight response measure on the UAV when the UAV is within the second flight-restriction region, wherein the second flight response measure is different from the first flight response measure.

In practicing any of the methods, systems, non-transitory computer readable mediums, or UAVs, the following exemplary embodiments may be applicable. In some embodiments, the information about the first flight-restriction region is obtained at a local memory on-board the UAV. Where desired, the information about the second flight-restriction region may be obtained at a local memory on-board the UAV subsequent to detecting that the UAV is within the first flight-restriction region. In some embodiments, the information about the second flight-restriction region is not present at the local memory on-board the UAV prior to detecting that the UAV is within the first flight-restriction region. In some embodiments, the user of the UAV, or the user, may refer to an operator or owner of the UAV.

In some embodiments, the first flight-restriction region has a more regular shape than the second flight-restriction region. Where desired, the first flight-restriction region has a circular shape or a regular polygon shape. In some embodiments, the second flight-restriction region has a shape with a plurality of sides or an irregular polygon shape.

In some embodiments, the information about the first flight-restriction region takes up less memory space than the information about the second flight-restriction region. In some embodiments, the information about the first flight-restriction region is a location of the first flight-restriction region or is information about the first flight response measure. In some embodiments, the information about the second flight-restriction region is a location of the second flight-restriction region or is information about the second flight response measure. Where desired, the first flight response measure is a warning that is provided to the UAV or a user of the UAV.

In some embodiments, the second flight response measure is permitting the UAV to enter the second flight-restriction region only when granted permission to enter. Where desired, permission is granted or denied in response to a request for the UAV to fly within the second flight-restriction region. Optionally, permission is granted or denied subsequent to authenticating an identity of the UAV or the user. In some embodiments, the second flight response measure is not permitting the UAV to enter the second flight-restriction region.

In some embodiments, the first flight response measure is permitting the UAV to enter the first flight-restriction region only when granted permission to enter. Where desired, permission is granted or denied in response to a request for the UAV to fly within the first flight-restriction region. Optionally, permission is granted or denied subsequent to authenticating an identity of the UAV or the user. Where desired, the method further comprises permitting the user to configure one or more flight parameters within the flight-restriction region, when the user is granted permission to fly within the first flight-restriction region. Optionally, a flight parameter of the one or more flight parameters is a maximum or minimum height of UAV flight or a maximum speed of the UAV flight.

In some embodiments, the method further comprises detecting, with aid of the UAV, that the flight-restriction region is designated in error. Optionally, the method may further comprise reporting an update, by the UAV, that the flight-restriction region is designated in error.

The practice of the aforementioned method may utilize one or more subject UAVs, one or more subject systems, and/or subject non-transitory computer readable medium. All of the features referenced in practicing the aforementioned method are applicable for construction and usage of the subject UAV, system, and/or non-transitory computer readable medium. For example, the non-transitory computer readable medium may comprise code, logic, or instructions to permit the user to configure one or more flight parameters within the flight-restriction region, when the user is granted permission to fly within the first flight-restriction region. In some embodiments, the non-transitory computer readable medium may comprise code, logic, or instructions to detect, with aid of the UAV, that the flight-restriction region is designated in error. In some embodiments, the non-transitory computer readable medium may comprise code, logic, or instructions to report an update, by the UAV, that the flight-restriction region is designated in error.

In some embodiments, the subject UAV and/or system may permit, with aid of one or more processors, the user to configure one or more flight parameters within the flight-restriction region, when the user is granted permission to fly within the first flight-restriction region. In some embodiments, the subject UAV and/or system may comprise one or more processors configured to detect, with aid of the UAV, that the flight-restriction region is designated in error. In some embodiments, the subject UAV and/or system may comprise one or more processors configured to report an update, by the UAV, that the flight-restriction region is designated in error.

In still yet another aspect, a method for assessing a flight-restriction region applicable to an unmanned aerial vehicle (UAV) is provided. The method comprises: assessing a location of a first zone within the flight-restriction region; assessing a location of a second zone within the first zone; and assessing a location of a third zone within the second zone, wherein the a warning is received by the UAV or a user of the UAV when the UAV is within the first zone and outside the second zone, wherein the UAV is permitted to fly within the second zone and outside the third zone only when the UAV or the user of the UAV is granted permission to fly within the second zone outside the third zone, and wherein the UAV is prohibited from flying within the third zone.

In another aspect, a system for assessing a flight-restriction region applicable to an unmanned aerial vehicle (UAV) is provided. The system comprising one or more processors, individually or collectively configured to: assess a location of a first zone within the flight-restriction region; assess a location of a second zone within the first zone; and assess a location of a third zone within the second zone, wherein the a warning is received by the UAV or a user of the UAV when the UAV is within the first zone and outside the second zone, wherein the UAV is permitted to fly within the second zone and outside the third zone only when the UAV or the user of the UAV is granted permission to fly within the second zone outside the third zone, and wherein the UAV is prohibited from flying within the third zone.

In another aspect, a non-transitory computer readable medium for assessing a flight-restriction region applicable to an unmanned aerial vehicle (UAV) is provided. The non-transitory computer readable medium comprises code, logic, or instructions to: assess a location of a first zone within the flight-restriction region; assess a location of a second zone within the first zone; and assess a location of a third zone within the second zone, wherein the a warning is received by the UAV or a user of the UAV when the UAV is within the first zone and outside the second zone, wherein the UAV is permitted to fly within the second zone and outside the third zone only when the UAV or the user of the UAV is granted permission to fly within the second zone outside the third zone, and wherein the UAV is prohibited from flying within the third zone.

In another aspect, an unmanned aerial vehicle (UAV) is provided. The UAV comprises: one or more propulsion units configured to effect flight of the UAV; and one or more processors that are, individually or collectively, configured to: receive a location of a first zone within the flight-restriction region; receive a location of a second zone within the first zone; and receive a location of a third zone within the second zone, wherein the a warning is received by the UAV or a user of the UAV when the UAV is within the first zone and outside the second zone, wherein the UAV is permitted to fly within the second zone and outside the third zone only when the UAV or the user of the UAV is granted permission to fly within the second zone outside the third zone, and wherein the UAV is prohibited from flying within the third zone.

In practicing any of the methods, systems, non-transitory computer readable mediums, or UAVs, the following exemplary embodiments may be applicable. In some embodiments, the assessment occurs on-board the UAV. Alternatively, the assessment occurs at a remote controller of the UAV or at one or more servers external to the UAV.

In some embodiments, the warning is received by the user of the UAV. Optionally, the warning may be an alert on a remote controller of the UAV. Where desired, the user, or the user of the UAV, may refer to an operator or owner of the UAV.

In some embodiments, the user is granted or denied permission for the UAV to fly within the second zone, based on UAV identification information or user identification information. In some embodiments, the granting or denying permission for the UAV to fly within the flight-restriction region occurs subsequent to authenticating an identity of the UAV or the user. In some embodiments, the UAV identification information comprises a UAV identifier that uniquely identifies the UAV from other UAVs, a user identifier that uniquely identifies the user from other users, information about a model, manufacturer, or performance characteristics of the UAV a serial number of the UAV, information about a user's name, address, phone number, information about a level of training for UAV flight of the user, or certifications or licenses for UAV flight held by the user, or financial information for the user. Where desired, the financial information for the user comprises a payment card for the user, bank account information of the user, or a pre-paid flight pass of the user. In some embodiments, the payment card is a credit card, debit card, or gift card of the user.

In some embodiments, the user is granted or denied permission to fly within the second zone in response to a request for the UAV to fly within the flight-restriction region. In some embodiments, the request originates from the UAV, a remote controller of the UAV, or a server remote to the UAV. Where desired, the request is provided through a web-based application or a mobile application. Optionally, the request comprises an indication of a proposed flight path of the UAV, an indication of a proposed flight area of the UAV, or an indication of a proposed timing of the UAV flight. In some embodiments, the request is made in real-time while the UAV is in flight toward the flight-restriction region. Alternatively, the request is made in advance prior to the UAV flying toward the flight-restriction region.

In some embodiments, the practice of the method described herein further comprises permitting the user to configure one or more flight parameters within the second zone, when the user is granted permission to fly within the second zone. Where desired, a flight parameter of the one or more flight parameters is a maximum or minimum height of UAV flight or a maximum speed of the UAV flight.

In some embodiments, at least two of the first zone, second zone, or third zone have the same shape. Optionally, each of the first zone, second zone, and third zone may have different shapes. In some embodiments, at least two of the centers of the first zone, second zone, and third zone coincide with one another. In some embodiments, the third zone is entirely encompassed by the second zone. In some embodiments, the second zone is entirely encompassed by the first zone. In some embodiments, at least two of the first zone, second zone, or third zone are concentrically arranged.

In some embodiments, the practice of a method described herein further comprises detecting, with aid of the UAV, that the flight-restriction region is designated in error. Where desired, the practice of the method further comprises reporting an update, by the UAV, that the flight-restriction region is designated in error.

The practice of the aforementioned method may utilize one or more subject UAVs, one or more subject systems, and/or subject non-transitory computer readable medium. All of the features referenced in practicing the aforementioned method are applicable for construction and usage of the subject UAV, system, and/or non-transitory computer readable medium. For example, the subject non-transitory computer readable medium comprises codes, logics, or instructions to permit the user to configure one or more flight parameters within the second zone, when the user is granted permission to fly within the second zone. In some embodiments, the non-transitory computer readable medium may comprise code, logic, or instructions to permit the user to configure one or more flight parameters within the second zone, when the user is granted permission to fly within the second zone. In some embodiments, the non-transitory computer readable medium may comprise code, logic, or instructions to detect, with aid of the UAV, that the flight-restriction region is designated in error. In some embodiments, the non-transitory computer readable medium may comprise code, logic, or instructions to report an update, by the UAV, that the flight-restriction region is designated in error.

In some embodiments, the subject UAV and/or system may configure, with aid of one or more processors, one or more flight parameters within the second zone, when the user is granted permission to fly within the second zone. In some embodiments, the subject UAV and/or system comprise one or more processors configured to permit the user to configure one or more flight parameters within the second zone, when the user is granted permission to fly within the second zone. In some embodiments, he subject UAV and/or system comprises one or more processors configured to detect, with aid of the UAV, that the flight-restriction region is designated in error. In some embodiments, he subject UAV and/or system comprises one or more processors configured to report an update, by the UAV, that the flight-restriction region is designated in error.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWING

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 provides a flight restriction region release system, in accordance with embodiments.

FIG. 2 provides a process for an advanced application of releasing a license key, in accordance with embodiments.

FIG. 3 provides a process for a mobile terminal to request a list of license keys, in accordance with embodiments.

FIG. 4 provides a process for providing selected licensing keys to a flight controller, in accordance with embodiments.

FIG. 5 provides a process for requesting a real-time release of a flight restriction region during flight, in accordance with embodiments.

FIG. 6 shows an example of interactions between one or more users and one or more UAVs, in accordance with embodiments.

FIG. 7 shows an example of an authentication system in accordance with embodiments.

FIG. 8 provides a web-based process of requesting release of a flight restriction region, in accordance with embodiments.

FIG. 9 provides a method for regulating flight of an unmanned aerial vehicle (UAV), in accordance with embodiments.

FIG. 10 provides another method for regulating flight of an unmanned aerial vehicle (UAV), in accordance with embodiments.

FIG. 11 illustrates an area comprising a plurality of different flight-restriction regions of three different flight restriction levels, in accordance with embodiments.

FIG. 12 illustrates three different flight restriction levels that may be associated with a given flight restricted region, in accordance with embodiments.

FIG. 13 illustrates various flight-restriction regions associated with two or more zones, in accordance with embodiments.

FIG. 14 provides a method for assessing a flight-restriction region applicable to an unmanned aerial vehicle (UAV), in accordance with embodiments.

FIG. 15 illustrates flight-restriction regions comprising two or more distinct zones that are not encompassed or surrounded by another, in accordance with embodiments.

FIG. 16 illustrates a releasable flight restriction region that is released, in accordance with embodiments.

FIG. 17 illustrates an actual flight restriction region associated with a desired flight restriction region, in accordance with embodiments.

FIG. 18 illustrates the process of releasing a flight-restriction region, in accordance with embodiments, in accordance with embodiments.

FIG. 19 illustrates generating temporary released regions with aid of a control tower, in accordance with embodiments.

FIG. 20 illustrates a method for regulating flight of an unmanned aerial vehicle (UAV), in accordance with embodiments.

FIG. 21 illustrates an unmanned aerial vehicle (UAV), in accordance with embodiments of the present invention.

FIG. 22 illustrates a movable object including a carrier and a payload, in accordance with embodiments.

FIG. 23 is a schematic illustration by way of block diagram of a system for controlling a movable object, in accordance with embodiments.

DETAILED DESCRIPTION

The systems, devices, and methods of the present invention provide for efficient management of flight restriction regions. Flight-restriction regions as used herein may refer to any region within which it may be desirable to limit or affect operation of an aerial vehicle. Flight-restriction regions may also be referred to herein as flight-restriction zones, flight restricted regions and/or flight restricted zones.

The aerial vehicle may be an unmanned aerial vehicle (UAV), or any other type of movable object. It may be desirable to limit the operation of UAVs in certain regions. For example, some jurisdictions may have one or more no-fly zones in which UAVs are not permitted to fly. In the U.S., UAVs may not fly within certain proximities of airports. Additionally, it may be prudent to restrict flight of aerial vehicles in certain regions. For example, it may be prudent to restrict flight of aerial vehicles in large cities, across national borders, near governmental buildings, and the like. For example, it may be desirable to limit flight within regions where flight conditions are known to be hazardous (e.g., known for strong winds, near borders, too far out from the shoreline, near important governmental buildings, etc). For example, it may be desirable to limit flight within regions where a special (e.g., non-regular) event is taking place.

In some instances, it may be beneficial to provide different regions with different flight restriction rules, also referred to herein as flight response measures. For example, it may be advantageous to prohibit flight altogether in some flight-restriction regions. In some instances, it may sufficient to provide warnings to an operator of the UAV regarding a flight restriction region, but allow flight.

In some instances, the flight restricted regions may be associated with one or more flight response measures. Operation of a UAV may be governed or affected by flight response measures (e.g., within flight restricted regions). A set of flight response measures may include one or more flight response measures. In some embodiments, a flight response measure may include preventing a UAV from entering the flight restriction region altogether. A UAV that ended up in the flight restriction region may be forced to land or forced to fly away from the flight restriction region. In some embodiments, a flight response measure may include allowing the UAV to remain in the flight restriction region, but imposing certain restrictions on the operation of the UAV within the flight restriction region. The UAV may be forced to remain within the flight restriction region. Various types and examples of flight response measures are described herein.

Flight response measures may govern physical disposition of the UAV. For instance, the flight response measures may govern flight of the UAV, take-off of the UAV, and/or landing of the UAV. In some examples, the flight response measures may prevent the UAV from flying within a flight restriction region. In some examples, the flight response measures may permit only a certain range of orientations of the UAV, or may not permit certain range of orientations of the UAV. The range of orientations of the UAV may be with respect to one, two, or three axes. The axes may be orthogonal axes, such as yaw, pitch, or roll axes. The physical disposition of the UAV may be governed with respect to a flight restriction region.

The flight response measures may govern movement of the UAV. For instance, the flight response measures may govern translational speed of the UAV, translational acceleration of the UAV, angular speed of the UAV (e.g., about one, two, or three axes), or angular acceleration of the UAV (e.g., about one, two, or three axes). The flight response measures may set a maximum limit for the UAV translational speed, UAV translational acceleration, UAV angular speed, or UAV angular acceleration. Thus, the set of flight response measures may comprise limiting flight speed and/or flight acceleration of the UAV. The flight response measures may set a minimum threshold for UAV translational speed, UAV translational acceleration, UAV angular speed, or UAV angular acceleration. The flight response measures may require that the UAV move between the minimum threshold and the maximum limit. Alternatively, the flight response measures may prevent the UAV from moving within one or more translational speed ranges, translational acceleration ranges, angular speed ranges, or angular acceleration ranges. In one example, a UAV may not be permitted to hover within a designated airspace. The UAV may be required to fly above a minimum translational speed of 0 mph. In another example, a UAV may not be permitted to fly too quickly (e.g., fly beneath a maximum speed limit of 40 mph). The movement of the UAV may be governed with respect to a flight restriction region.

The flight response measures may govern take-off and/or landing procedures for the UAV. For instance, the UAV may be permitted to fly, but not land in a flight restriction region. In another example, a UAV may only be able to take-off in a certain manner or at a certain speed from a flight restriction region. In another example, manual take-off or landing may not be permitted, and an autonomous landing or takeoff process must be used within a flight restriction region. The flight response measures may govern whether take-off is allowed, whether landing is allowed, any rules that the take-off or landing must comply with (e.g., speed, acceleration, direction, orientation, flight modes). In some embodiments, only automated sequences for taking off and/or landing are permitted without permitting manual landing or take-off, or vice versa. The take-off and/or landing procedures of the UAV may be governed with respect to a flight restriction region.

In some instances, the flight response measures may govern operation of a payload of a UAV. The payload of the UAV may be a sensor, emitter, or any other object that may be carried by the UAV. The payload may be powered on or off. The payload may be rendered operational (e.g., powered on) or inoperational (e.g., powered off). Flight response measures may comprise conditions under which the UAV is not permitted to operate a payload. For example, in a flight restriction region, the flight response measures may require that the payload be powered off. The payload may emit a signal and the flight response measures may govern the nature of the signal, a magnitude of the signal, a range of the signal, a direction of signal, or any mode of operation. For example, if the payload is a light source, the flight response measures may require that the light not be brighter than a threshold intensity within a flight restriction region. In another example, if the payload is a speaker for projecting sound, the flight response measures may require that the speaker not transmit any noise outside a flight restriction region. The payload may be a sensor that collects information, and the flight response measures may govern a mode in which the information is collected, a mode about how information is pre-processed or processed, a resolution at which the information is collected, a frequency or sampling rate at which the information is collected, a range from which the information is collected, or a direction from which the information is collected. For example, the payload may be an image capturing device. The image capturing device may be capable of capturing static images (e.g., still images) or dynamic images (e.g., video). The flight response measures may govern a zoom of the image capturing device, a resolution of images captured by the image capturing device, a sampling rate of the image capturing device, a shutter speed of the image capturing device, an aperture of the image capturing device, whether a flash is used, a mode (e.g., lighting mode, color mode, still vs. video mode) of the image capturing device, or a focus of the image capturing device. In one example, a camera may not be permitted to capture images in over a flight restriction region. In another example, a camera may be permitted to capture images, but not capture sound over a flight restriction region. In another example, a camera may only be permitted to capture high-resolution photos within a flight restriction region and only be permitted to take low-resolution photos outside the flight restriction region. In another example, the payload may be an audio capturing device. The flight response measures may govern whether the audio capture device is permitted to be powered on, sensitivity of the audio capture device, decibel ranges the audio capture device is able to pick up, directionality of the audio capture device (e.g., for a parabolic microphone), or any other quality of the audio capture device. In one example, the audio capture device may or may not be permitted to capture sound within a flight restriction region. In another example, the audio capture device may only be permitted to capture sounds within a particular frequency range while within a flight restriction region. The operation of the payload may be governed with respect to a flight restriction region.

The flight response measures may govern whether a payload can transmit or store information. For instance, if the payload is an image capturing device, the flight response measures may govern whether images (still or dynamic) may be recorded. The flight response measures may govern whether the images can be recorded into an on-board memory of the image capture device or a memory on-board the UAV. For instance, an image capturing device may be permitted to be powered on and showing captured images on a local display, but may not be permitted to record any of the images. The flight response measures may govern whether images can be streamed off-board the image capture device or off-board the UAV. For instance, flight response measures may dictate that an image capture device on-board the UAV may be permitted to stream video down to a terminal off-board the UAV while the UAV is within a flight restriction region, and may not be able to stream video down when outside a flight restriction region. Similarly, if the payload is an audio capture device, the flight response measures may govern whether sounds may be recorded into an on-board memory of the audio capture device or a memory on-board the UAV. For instance, the audio capture device may be permitted to be powered on and play back captured sound on a local speaker, but may not be permitted to record any of the sounds. The flight response measures may govern whether the images can be streamed off-board the audio capture device, or any other payload. The storage and/or transmission of collected data may be governed with respect to a flight restriction region.

In some instances, the payload may be an item carried by the UAV, and the flight response measures may dictate the characteristics of the payload. Examples of characteristics of the payload may include dimensions of the payload (e.g., height, width, length, diameter, diagonal), weight of the payload, stability of the payload, materials of the payload, fragility of the payload, or type of payload. For instance, the flight response measures may dictate that the UAV may carry the package of no more than 3 lbs while flying over a flight restriction region. In another example, the flight response measures may permit the UAV to carry a package having a dimension greater than 1 foot only within a flight restriction region. Another flight response measures may permit a UAV to only fly for 5 minutes when carrying a package of 1 lb or greater within a flight restriction region, and may cause the UAV to automatically land if the UAV has not left the flight restriction region within the 5 minutes. Restrictions may be provided on the type of payloads themselves. For example, unstable or potentially explosive payloads may not be carried by the UAV. Flight restrictions may prevent the carrying of fragile objects by the UAV. The characteristics of the payload may be regulated with respect to a flight restriction region.

Flight response measures may also dictate activities that may be performed with respect to the item carried by the UAV. For instance, flight response measures may dictate whether an item may be dropped off within a flight restriction region. Similarly flight response measures may dictate whether an item may be picked up from a flight restriction region. A UAV may have a robotic arm or other mechanical structure that may aid in dropping off or picking up an item. The UAV may have a carrying compartment that may permit the UAV to carry the item. Activities relating to the payload may be regulated with respect to a flight restriction region.

Positioning of a payload relative to the UAV may be governed by flight response measures. The position of a payload relative to the UAV may be adjustable. Translational position of the payload relative to the UAV and/or orientation of the payload relative to the UAV may be adjustable. Translational position may be adjustable with respect to one, two, or three orthogonal axes. Orientation of the payload may be adjustable with respect to one, two, or three orthogonal axes (e.g., pitch axis, yaw axis, or roll axis). In some embodiments, the payload may be connected to the UAV with a carrier that may control positioning of the payload relative to the UAV. The carrier may support the weight of the payload on the UAV. The carrier may optionally be a gimbaled platform that may permit rotation of the payload with respect to one, two, or three axes relative to the UAV. One or more frame components and one or more actuators may be provided that may effect adjustment of the positioning of the payload. The flight response measures may control the carrier or any other mechanism that adjusts the position of the payload relative to the UAV. In one example, flight response measures may not permit a payload to be oriented facing downward while flying over a flight restriction region. For instance, the region may have sensitive data that it may not be desirable for the payload to capture. In another example, the flight response measures may cause the payload to move translationally downward relative to the UAV while within a flight restriction region, which may permit a wider field of view, such as panoramic image capture. The positioning of the payload may be governed with respect to a flight restriction region.

The flight response measures may govern the operation of one or more sensors of an unmanned aerial vehicle. For instance, the flight response measures may govern whether the sensors are turned on or off (or which sensors are turned on or off), a mode in which information is collected, a mode about how information is pre-processed or processed, a resolution at which the information is collected, a frequency or sampling rate at which the information is collected, a range from which the information is collected, or a direction from which the information is collected. The flight response measures may govern whether the sensors can store or transmit information. In one example, a GPS sensor may be turned off while a UAV is within a flight restriction region while vision sensors or inertial sensors are turned on for navigation purposes. In another example, audio sensors of the UAV may be turned off while flying over a flight restriction region. The operation of the one or more sensors may be governed with respect to a flight restriction region.

Communications of the UAV may be controlled in accordance with one or more flight response measures. For instance, the UAV may be capable of remote communication with one or more remote devices. Examples of remote devices may include a remote controller that may control operation of the UAV, payload, carrier, sensors, or any other component of the UAV, a display terminal that may show information received by the UAV, a database that may collect information from the UAV, or any other external device. The remote communications may be wireless communications. The communications may be direct communications between the UAV and the remote device. Examples of direct communications may include WiFi, WiMax, radiofrequency, infrared, visual, or other types of direct communications. The communications may be indirect communications between the UAV and the remote device which may include one or more intermediary device or network. Examples of indirect communications may include 3G, 4G, LTE, satellite, or other types of communications. The flight response measures may dictate whether remote communications are turned on or off. Flight response measures may comprise conditions under which the UAV is not permitted to communicate under one or more wireless conditions. For example, communications may not be permitted while the UAV is within a flight restriction region. The flight response measures may dictate a communication mode that may or may not be permitted. For instance, the flight response measures may dictate whether a direct communication mode is permitted, whether an indirect communication mode is permitted, or whether a preference is established between the direct communication mode and the indirect communication mode. In one example, only direct communications are permitted within a flight restriction. In another example, over a flight restriction region, a preference for direct communications may be established as long as it is available, otherwise indirect communications may be used, while outside a flight restriction region, no communications are permitted. The flight response measures may dictate characteristics of the communications, such as bandwidth used, frequencies used, protocols used, encryptions used, devices that aid in the communication that may be used. For example, the flight response measures may only permit existing networks to be utilized for communications when the UAV is within a predetermined volume. The flight response measures may govern communications of the UAV with respect to a flight restriction region.

Other functions of the UAV, such as navigation, power usage and monitoring, may be governed in accordance with flight response measures. Examples of power usage and monitoring may include the amount of flight time remaining based on the battery and power usage information, the state of charge of the battery, or the remaining amount of estimated distance based on the battery and power usage information. For instance, the flight response measures may require that a UAV in operation within a flight restriction region have a remaining battery life of at least 3 hours. In another example, the flight response measures may require that the UAV be at least at a 50% state of charge when outside a flight restriction region. Such additional functions may be governed by flight response measures with respect to a flight restriction region.

In some instances, the judgment regarding whether UAV can operate within a flight-restriction zone may best be left to the judgment of each individual UAV operator. For example, an operator may be qualified to operate a UAV within a flight-restriction region while another operator may not be qualified. For example, it may not be desirable to allow operation of UAVs during a certain time period (e.g., when a special event may be taking place) while at other times, it may be desirable for UAVs to operate within the designated flight restriction region.

In some instances, it may be beneficial to provide users with a centralized tool, or platform to manage the various flight restriction regions with various rules. The platform may comprise one or more databases (e.g., data source, online server, cloud server, etc). The databases may be utilized in managing the various flight restriction regions and/or parameters associated with the flight restriction regions. The databases may further interact with a mobile terminal or flight controller of the UAV in granting access to flight-restriction regions. In some instances, the databases may pull information from other sources such as government data sources, regulatory databases, sources that list airport information, public records, sources that are publicly accessible over the internet, or sources that are privately accessible when access is granted and may update the various flight restriction regions as the other sources are updated. The platform may be utilized in providing UAVs a unified interface in managing flight-restriction regions and in releasing temporary flight restriction regions.

In some instances, the location of one or more flight-restriction regions, such as airports, may be stored on-board the UAV. The UAV may have a local memory that may store information about flight-restriction regions. Alternatively or in addition, information about the location of one or more flight-restriction regions may be accessed from the database off-board the UAV. For example, if the Internet or another network is accessible, the UAV may obtain information regarding flight restriction regions from a server online. In some instances, some flight-restriction regions may be stored onboard the UAV while other flight-restriction regions may be accessed from a data source off-board the UAV. In some instances, flight-restriction regions accessed from a data source off-board the UAV may be accessed only when necessary, as further described below. In some instances, relatively simple flight-restriction regions may be stored on-board the UAV while more complicated flight-restriction regions may be accessed from a data source off-board the UAV. The aforementioned scheme may enable a more efficient utilization of processing power and save battery, amongst others. The one or more flight-restriction regions may be associated each with one or more flight response measures. The one or more flight response measures may be stored on-board the UAV. Alternatively or in addition, information about the one or more flight response measures may be accessed from a data source off-board the UAV. For example, if the Internet or another network is accessible, the UAV may obtain information regarding flight response measures from a server online. In some instances, data regarding flight restricted regions may be updated. The data regarding flight restricted regions may be updated about or more often than every 30 minutes, every hour, every 3 hours, every 6 hours, every 12 hours, every day, every 3 days, every week, every 2 weeks, every 4 weeks, every month, every 3 months, every 6 months, or every year.

The location of the UAV may be determined. This may occur prior to take-off of the UAV and/or while the UAV is in flight. In some instances, the UAV may have a GPS receiver that may be used to determine the location of the UAV. In other examples, the UAV may be in communication with an external device, such as a mobile control terminal. The location of the external device may be determined and used to approximate the location of the UAV. Information about the location of one or more flight-restriction regions accessed from a data source off-board the UAV may depend on, or be governed by a location of the UAV or an external device in communication with the UAV. For example, the UAV may access information on other flight-restriction regions about or within 1 mile, 2 miles, 5 miles, 10 miles, 20 miles, 50 miles, 100 miles, 200 miles, or 500 miles of the UAV. Information accessed from a data source off-board the UAV may be stored on a temporary or a permanent database. For example, information accessed from a data source off-board the UAV may add to a growing library of flight-restriction regions on board the UAV. Alternatively, only the flight-restriction regions about or within 1 mile, 2 miles, 5 miles, 10 miles, 20 miles, 50 miles, 100 miles, 200 miles, or 500 miles of the UAV may be stored on a temporary database, and flight-restriction regions previously within, but currently outside the aforementioned distance range (e.g., within 50 miles of the UAV) may be deleted. The distance between the UAV and a flight-restriction region may be calculated. Based on the calculated distance, one or more flight response measures may be taken.

A flight-restriction region as used herein may be a point, or the center or location of the flight-restriction region may be designated by a point (e.g., latitude and longitude coordinates, optionally altitude coordinate). For example, a flight-restriction region location may be a point at the center of an airport, or representative of the airport or other type of flight-restriction region. In other examples, a flight-restriction region may be a two-dimensional area. For example, a flight-restriction region location may include an area or region. The area or region may coincide with, mirror, or trace existing boundaries. The existing boundaries may, for example, be property boundary lines, national borders, boundary between states, natural boundaries (e.g., boundary between a body of water and land), and the like. The area or region may have any shape (e.g., rounded shape, rectangular shape, triangular shape, shape corresponding to one or more natural or man-made feature at the location, shape corresponding to one or more zoning rules, or any other boundaries). For example, the flight-restriction region may trace the boundaries of an airport, the border between nations, other jurisdictional borders, or any other type of boundaries.

The flight-restriction regions may be defined by straight or curved lines. In some instances, the flight-restriction region may include a space. The space may be a three-dimensional space that includes latitude, longitude, and altitude coordinates. The three-dimensional space may include length, width, and height. The flight-restriction region may have an altitude limit, such as an altitude floor and/or an altitude ceiling. The altitude limit for the flight restriction region may be constant over the flight restriction region. The altitude limit for the flight restriction region may change over the flight restriction region. For example, the altitude floor may increase as the distance from the center of the flight restriction region increases. The flight-restriction region may include space from the ground up to any altitude above the ground (e.g., predetermined altitude past which a UAV can fly or an altitude beyond which a UAV can fly). This may include altitude straight up from one or more flight-restriction region on the ground. For example, for some latitudes and longitudes, all altitudes may be flight restricted. In some instances, some altitudes for particular lateral regions may be flight-restricted, while others are not. For example, for some latitudes and longitudes, some altitudes may be flight restricted while others are not. Thus, the flight-restriction region may have any number of dimensions, and measurement of dimensions, and/or may be designated by these dimension locations, or by a space, area, line, or point representative of the region.

As mentioned herein, a flight restriction region may include any locations in which it may be desirable to limit or affect operation of a UAV. For example, flight restriction regions may include one or more locations where unauthorized aerial vehicles may not fly. Other examples of types of flight restriction regions are provided further elsewhere herein. This may include unauthorized unmanned aerial vehicles (UAVs) or all UAVs. Flight-restriction regions may include prohibited airspace, which may refer to an area (or volume) of airspace within which flight of aircraft is not allowed, usually due to security concerns. Prohibited areas may contain airspace of defined dimensions identified by an area on the surface of the earth within which the flight of aircraft is prohibited. Such areas can be established for security or other reasons associated with the national welfare. These areas may be published in the Federal Register and are depicted on aeronautical charts in the United States, or in other publications in various jurisdictions. The flight-restriction region may include one or more of special use airspace (e.g., where limitations may be imposed on aircraft not participating in designated operations), such as restricted airspace (i.e., where entry is typically forbidden at all times from all aircraft and is not subject to clearance from the airspace's controlling body), military operations areas, warning areas, alert areas, temporary flight restriction (TFR) areas, national security areas, and controlled firing areas. The flight-restriction regions as used herein may also include any other airspace where flight restriction is desired and may be associated with a flight response measures. For example, cities, certain private properties such as a residential or commercial buildings, or public properties such as parks may be designated as a flight-restriction region.

Flight-restriction regions may be designated by various categories. For example, the various categories of flight-restriction regions may include, but are not limited to, airports, flight corridors, military or other government facilities, locations near sensitive personnel (e.g., when the President or other leader is visiting a location), nuclear sites, research facilities, private airspace, de-militarized zones, certain jurisdictions (e.g., townships, cities, counties, states/provinces, countries, bodies of water or other natural landmarks), national borders (e.g., the border between the U.S. and Mexico), private or public property, or any other types of zones. A flight-restriction region may be a permanent no-fly zone or may be a temporary flight-restriction region where flight is prohibited. A flight-restriction region may be an area where flight is allowed but is associated with a set of flight response measures. A list of flight-restriction regions may be updated. Flight-restriction regions may vary from jurisdiction to jurisdiction. For instance, some countries may include schools as flight-restriction regions while others may not.

As described above, the flight-restriction region may comprise a temporary flight restriction (TFR region). A TFR region as used herein may refer to a region which may be released. The TFR region may be released based on one or more conditions. For instance, the TFR region may be released based on authentication of the operator of a UAV, or an identity of the UAV. The TFR may be may be released based on other conditions such as financial information pertaining to a user of a UAV. In examples, a user may be identified based upon financial information provided from the user. In other examples, the user may be identified based upon user information provided from the user. TFR regions may have different levels and/or different time limitations associated with the restriction. It is beneficial to provide a system that allows authenticated users to apply for flight within flight-restricted zones having a certain, releasable restriction level and recording details of a user's flight application. In examples, authenticated users may apply for release from a TFR region using a system as provided herein.

Temporary flight restrictions may comprise geographically-limited, non-permanent airspace restrictions. Temporary flight restrictions may be used in different countries. As such, a temporary flight restriction can be non-permanent or changing. In this way, a UAV may be flying in a region that is not in a flight-restriction region, but the region may become flight-restriction region due to a condition or timing (e.g., after 5:00 pm it becomes a particular region becomes a flight-restriction region until midnight, or a president is visiting an area so it becomes a flight-restriction region). Additionally, a UAV may be assessed to determine whether the location of the UAV is in the flight-restriction region. The assessment may be a real-time assessment. Additionally, if a determination is made that the UAV is in a flight-restriction region, the UAV may respond accordingly. In examples, the UAV may respond to the notification that it is flying in a flight-restriction region by autolanding, auto-exit, or warning. In examples, the response of the UAV can be dependent on the identification information associated with the UAV and/or the identification information associated with the user that is operating the UAV. Additionally, temporary flight restrictions may be used to encompass major events (including private or public events). Public events may include without limitation visits of high-rank government officials, the Pope, and high-profile leaders of various organizations, such as the Pope. In examples, major sporting or stadium events may include professional baseball games, professional basketball games, professional golf tournaments, professional hockey games, professional football games, college athletic events, national athletic competitions, and international athletic competitions. Temporary flight restrictions may also be used to encompass natural disasters. In examples, natural disasters or other emergencies may include floods, fires (forest, wildfires), earthquakes, storms, mudslides, tornadoes, hurricanes, heavy rain showers. Temporary flight restrictions may also encompass geographic areas that are of interest to national security. In examples, temporary flight restrictions may encompass a particular radius around a location of the President of the United States, a particular radius surrounding a no-fly zone, a particular radius surrounding political events, a particular radius surrounding political candidates. Other geographic areas of national security interest include but are not limited to prisons, government buildings, and nuclear power plants.

Temporary flight-restrictions may be substantially stationary. The location, size, and/or shape of a temporary flight-restriction region may remain the same over time. Alternatively, temporary flight-restrictions may be substantially dynamic. For instance, the location, size, and/or shape of a temporary flight-restriction region may change over time. For instance, a temporary flight-restriction may follow a world leader as he or she travels at a location.

Additionally, temporary flight restrictions may be time-based such that a temporary flight restriction may automatically expire at a after a particular amount of time. In examples, a temporary flight restriction may expire after 1 minute, 2 minutes, 3 minutes, 4 minutes, 5 minutes, 10 minutes, 20 minutes, 30 minutes, 40 minutes, 50 minutes, 60 minutes, 70 minutes, 80 minutes, 90 minutes, 2 hours, 3 hours, 4 hours, 5 hours, 6 hours, 12 hours, 18 hours, 24 hours, 2 days, 3 days, 4 days, 5 days, 6 days, a week, 2 weeks, or more than 2 weeks. In additional examples, a TFR may have a timestamp. For example, a TFR may be put in effect at a first particular time and/or may cease to have effect at a second particular time. For instance, a TFR may be applied to a school on Mondays through Fridays during school hours. The start and/or stop time for a TFR may be regular in accordance with a schedule, or may be sporadic in response to events.

Temporary flight restrictions may be mandatory or may be advisory. In some examples, temporary flight restrictions may not be compulsory. In examples, temporary flight restrictions may be updated on short notice. In examples, the status of temporary flight restrictions within one or more flight regions may be updated in real time. In particular, updates to temporary flight restrictions may be provided a UAV and/or to a user that is operating a UAV. Based on the updated status of temporary flight restrictions, the flight path of the UAV may be updated. In examples, other operating characteristics of the UAV may be adjusted based on the updated status of temporary flight restrictions. For example, a UAV may receive an update that the maximum permissible speed in a given flight region has decreased. Accordingly, the UAV may determining whether its current flying speed is within the new flight regulation. If the UAV determines that its current speed exceeds the updated maximum speed, the UAV may decrease its speed.

Examples of updates to temporary flight restrictions may include a change of status to a restricted area (e.g., a change of a restriction level associated with a flight region), For example, a non-restricted area turns into a restricted area, the UAV is informed and appropriate response is taken based on authentication (as further described below) of the UAV or user. The resulting action may be that the UAV should be grounded as the authentication does not go through (As further described below). Alternatively, the reusing action may be that the UAV is allowed to continue or modify its flight path based on the updated temporary flight restrictions.

In some instances, it may be beneficial to provide a system to release flight-restriction regions. For example, actual flight-restriction regions (e.g., as determined by a flight controller of a UAV) may be over-inclusive to a desired flight-restriction region or flight-restriction region as prescribed by laws or regulations. For example, in some instances, different flight-restriction regions may be applicable to different users of the UAV (e.g., operators of the UAV or owners of the UAV). In some instances, different flight-restriction regions may be applicable depending on a date (e.g., of the day, of the week, of the month, of the year, etc). Flight-restriction regions which can be released may herein be referred to as a releasable flight-restriction region.

In one example, an advance application for releasing a flight-restricted zone may be submitted. In particular, an application for releasing a flight restriction of UAV equipment within certain flight-restricted zones may be requested prior to the initiation of a flight. The request for releasing a flight-restriction region of the UAV may be made days in advance of the initiation of the flight, hours in advance of the initiation of the flight, or after initiation of the flight, but in advance of the UAV approaching or being near the flight-restriction region.

In another example, a real-time application for releasing a flight-restricted zone may be provided. In particular, a real-time application for releasing a flight restriction may be submitted using a mobile terminal when a UAV encounters a flight-restricted zone during flight of the UAV. The real-time application may permit the flight-restriction region to be released within less than or equal to 30 minutes, 15 minutes, 10 minutes, 5 minutes, 3 minutes, 2 minutes, 1 minutes, 30 seconds, 15 seconds, 10 seconds, 5 seconds, 3 seconds, or 1 second. The real-time application may permit the flight-restriction region to be released after initiation of the flight, optionally when the UAV is already approaching or nearing the flight-restriction region (e.g., coming within 3200 meters, 1600 meters, 800 meters, 400 meters, 200 meters, 100 meters, 50 meters, 10 meters, 5 meters, or 1 meter of the flight-restriction region).

Systems for releasing flight-restriction regions may include a web-based component, a mobile terminal component and a flight controller component. This is illustrated in FIG. 1. In particular, FIG. 1 provides a flight restriction release system 100, in accordance with embodiments. As seen in FIG. 1, a web-based component of a flight restriction release system may include a web-based component 110 that includes a license request component 112. The flight restriction release system 100 may also include a mobile terminal 120 that stores licenses received from the web-based component 110. Additionally, the flight restriction release system 100 may include a flight controller 130 that communicates with the mobile terminal 120 to verify that a UAV may be released from a flight-restriction region. In particular, the flight controller may receive a license from the mobile terminal. The license may be used to verify that the UAV is allowed to fly in the flight-restriction region.

Alternatively, the systems for releasing the flight-restriction region may have fewer components, such as any one or two of the web-based component, mobile terminal component, or flight controller component. In some instances, the web-based component may be hosted on a server or a database (e.g., cloud server). The web-based component may comprise information regarding a plurality of flight restricted regions. In some instances, the flight restricted regions (e.g., on the web-based component) may be updated, e.g., every hour, every day, every week, every 2 weeks, every 4 weeks, every month, every 3 months, every 6 months, every year. The web-based component may comprise an interface for a UAV user. For example, a UAV user may be able to log into the web-based component. In some instances, the web-based component may be accessed from, or interact with a mobile terminal (e.g., handheld device). For example, the mobile terminal may include an application to access the web-based component. In some instances, the web-based component may be accessed from elsewhere such as a device not coupled to a UAV, e.g., desktop or laptop computer. The mobile terminal may be coupled to a UAV, e.g., controller of a UAV. In some instances, the mobile terminal may be a handheld device such as a smart phone or a remote controller. In some instances, the mobile terminal may be coupled to a handheld device such as a smart phone or a remote controller.

In one example, a release for a flight-restricted zone may be applied for in advance of a UAV flight. In examples, a user may apply for a license key so as to have permission to fly in a flight-restriction region. A license key may be associated with a particular region. The size of the region associated with a license key may vary. Additionally, in examples a user may apply for one license key. In additional examples, the user may apply for more than one license key. In examples, a user may be limited to a certain number of license keys. In particular, a user may be limited to one license key, two license keys, three license keys, four license keys, five license keys, six license keys, eight license keys, ten license keys, fifteen license keys, or more than fifteen license keys. Additionally, a particular region may limit the number of license keys that it gives to users and/or UAVs. The number of license keys that are provided may be limited to a particular time. Additionally, the license keys may be permanent or the license keys may be non-permanent. In other examples, a license key may automatically expire after a period of time. In a first step of an advanced application for releasing a flight-restricted zone, a user may apply for a license to release the flight restricted zone. In particular, at a web-based component, a user may apply for a "releasing license key file." The releasing license key file may be applied for in the premise of real-name authentication. Additionally, an application for the releasing license key file may be stored at a server. After logging into a personal account page with a user name and password, the user can enter a zone releasing page by clicking on one or more flight-restricted zones. In examples, the user may first input information including areas to be released and/or an effective time frame of the releasing of flight regions. Additionally, the user may input the sequence number of a device, such as a UAV, to be flown within the flight-restriction region. In order to release a flight-restricted zone, a user may input the area to be release and may not need to know any details associated with the particular area. In examples, the flight release system may release each flight-restricted zone within an area that is input by the user. In additional examples, the flight release system may release each area that is along a flight path that is input by a particular user.

An example of a releasing license application process is seen in FIG. 2. In particular, FIG. 2 provides a process 200 for an advanced application of releasing a license key, in accordance with embodiments. At block 210, a user may log into his personal account. In particular, a user may input his personal information into a personal information page. Examples of personal information may include a username, password, name, financial information, or other information associated with a user's account. At block 220, after a user has logged into a personal account, the user may select an option to apply for a license to release flight-restricted areas. In additional examples, a user may initiate a request to apply for a license to release flight-restricted areas and then may subsequently be asked for login information. At block 230, a determination is made as to whether a user has been authenticated using real name authentication (as described further below). If a user has not been authenticated using real name authentication, the process proceeds to block 235. At block 235, real name authentication is performed (as described further below). In examples, real name authentication is performed using map service, credit card authentication, or other examples of authentication. Once real name authentication has been verified at block 230, or performed at block 235, the process proceeds to block 240. At block 240, input is received related to flight-restricted areas. In particular, input is received from a user regarding detailed information associated with flight-restricted areas. At block 250, a sequence number that is associated with a device that is requesting a release from a flight-restriction region is input. In examples, the device requesting release from a flight-restricted area is a UAV. At block 260, flight-restricted areas to be release are selected. Additionally, license keys associated with the flight restricted areas to be released are generated.

After applying for flight-restricted zones, the mobile terminal can request from a server interface a list of licenses pertaining to flight restricted areas that have been released. The server can provide a list of license keys pertaining to UAV equipment based on a hardware sequence number of the UAV equipment which requests the release of the flight restricted areas. FIG. 3 provides a process 300 for a mobile terminal to request a list of license keys, in accordance with embodiments. At block 310, a mobile application that may be used to release flight restricted areas is initiated. At block 320, at least one license key of a current user is requested. In examples, the at least one license key that is requested may comprise each license key that is currently associated with the user. In other examples, the user may request a license key associated with a flight-restriction region within close proximity to the user. At block 330, a web server may transmit one or more license keys associated with the current user. In some examples, the web server may transmit all license keys associated with the current user. In some examples, the web server may transmit a list of license keys that are associated with a flight-restriction region within a given proximity to the certain user. In some examples, the web server may transmit a license key that is associated with the flight-restriction region that is the closest to the certain user.

Once the user has received one or more license keys at the mobile terminal of the user, the user may select at least one license key to release a flight-restriction region. In examples, the user may select the at least one license key based on the flight path of a UAV associated with the user. Once the at least one license key is selected, the at least one license key may be downloaded to the mobile terminal from a web server. In examples, the at least one license key may be encrypted. As such, the user may download an encrypted file to the mobile terminal so as to ensure safety of the license key as it is being transmitted from the web server to the mobile terminal. Once at least one license key is downloaded to the mobile terminal, the at least one license key may be uploaded from the mobile terminal to a flight controller to release flight-restriction regions as-needed. In particular, the at least one license key may be uploaded so as to release flight-restriction regions as a UAV, or other flying device, that is being flown by a user approaches and enters flight-restriction regions. FIG. 4 provides a process 400 for providing selected licensing keys to a flight controller, in accordance with embodiments. At block 410, a license to be downloaded is selected. At block 420, a web-based server may return the selected license file. In examples, the selected license file may be encrypted. At block 430, the mobile terminal may provide the selected license file to a flight controller. In particular, a mobile application on a mobile terminal may upload encrypted license files to a flight controller to release flight-restriction regions.

In addition to applying for release of a flight-restriction region in advance, systems discussed herein may also provide real-time applications for releasing a flight-restriction region. This system may provide benefits to an authenticated user who encounters an unexpected flight-restriction region. As discussed above, flight-restriction regions may be implemented without prior warning, such as in the event of a natural disaster or movement of a political official. For these types of examples, a real-time application for releasing flight-restriction regions may enable a user to apply for releasing flight-restriction regions in a real-time manner when a UAV encounters a flight-restriction region, such as during flight of the UAV. An application for releasing a current flight-restriction region may be input from a mobile terminal in a real-time manner when the UAV encounters a flight-restriction region.

This application for applying real-time for release from a flight-restriction region may be uploaded and stored on a web server. The application may be capable of writing information on flight-restriction regions into the server. Additionally, the application may also be capable of writing one or more sequence numbers associated with UAV equipment into the server. The server may generate the license key and may transmit the encrypted license key file to the application of the mobile terminal. Additionally, the license key file may be transmitted from the mobile terminal to the flight controller through the mobile application so as to release the flight restricted zone. FIG. 5 provides a process 500 for requesting a real-time release of a flight restriction region during flight, in accordance with embodiments. At block 510, a UAV encounters a flight restricted zone. The flight restricted zone may be within a threshold of geographic proximity to the UAV. In other examples, the UAV may be within the flight restricted zone. In some examples, the UAV may be within a region that is not flight restricted, but that becomes flight restricted with the UAV is within the region.

At block 520, a user controller the UAV, such as from a mobile terminal, may receive a prompt asking the user to "release or not." In examples, the prompt asking the user to "release or not" may be questioning whether the user would like to release the flight-restriction region. If the user says "No," the process may proceed to block 525. At block 525, a determination is made to not request release of the flight-restriction region. If the user says, "Yes," the process may proceed to block 530. At block 530, a determination is made as to whether a user has been authenticated using real name authentication (as described further below). If a user has not been authenticated using real name authentication, the process proceeds to block 535. At block 535, real name authentication is performed (as described further below). In examples, real name authentication is performed using a map service, credit card authentication, or other examples of authentication. Once real name authentication has been verified at block 530, or performed at block 535, the process proceeds to block 540.

At block 540, a user may write detailed information associated with a flight restricted zone to a server. At block 550, a user may input a sequence number of a device to be released in the flight-restriction region. In examples, the device to be released in the flight-restriction region is a UAV. At block 560, the server generates a license key. When the server generates the license key, the server may name the license key. At block 570, the server may return the license file to the application on the mobile terminal. At block 580, the application on the mobile terminal may upload the license file to the flight controller. Once the flight controller has received the license file associated with the license to release the flight-restriction region, the flight controller may release the flight-restriction region to the UAV.

If a request for release of a flight restriction region from a user is granted, a UAV may be released from a flight-restriction region. Additionally, once a user has permission to fly in an area, the user can configure a plurality of flight parameters within the predetermined area, such as height, speed, etc. The UAV may be release for a particular amount of time. The user may specify a request for a particular duration of time or a particular window of time (e.g., start and/or stop time). The entirety of the request may be granted, or a limited amount of time may be granted. Alternatively, the amount of time may be predetermined or pre-limited. In examples, a UAV may be released for 1 minute, 2 minutes, 3 minutes, 4 minutes, 5 minutes, 10 minutes, 20 minutes, 30 minutes, 40 minutes, 50 minutes, 60 minutes, 70 minutes, 80 minutes, 90 minutes, 2 hours, 3 hours, 4 hours, 5 hours, 6 hours, 12 hours, 18 hours, 24 hours, 2 days, 3 days, 4 days, 5 days, 6 days, a week, 2 weeks, or more than 2 weeks.

In some instances, if the flight-restriction region is a TFR region, the UAV may also be released from the TFR region during the remaining duration of the TFR. For example, if a UAV is released from a TFR that is associated with a sporting event, the UAV may be released from the TFR for the remaining duration of the sporting event. In other examples, the UAV may be released from certain levels of flight-restriction region, but may not be released for other levels of flight-restriction regions, further described below.

In some instances, if a UAV is released for a particular flight restriction level, but the flight restriction level of a particular region is heightened, the release of the UAV from the flight restriction region may be revoked. In some instances, a UAV may be notified that it is flying in a flight-restriction region. In some examples, the UAV may be given a predetermined amount of time to leave the flight-restriction region. In some examples, the UAV may be required to exit a flight-restriction region using a path requires the least amount of time to exit the flight-restriction region. IN other examples, the UAV may be required to leave the flight-restriction region using a particular path as determined by a flight controller.

An authentication may be used for releasing a flight-restriction region to user. FIG. 6 shows an example of interactions between one or more users 610a, 610b, 610c and one or more UAVs 620a, 620b, 620c. A user may interact with a UAV with aid of a remote controller 615a, 615b, 615c. The users 610a, 610b, 610c may interact with a UAV that is flying in regions 640, 650, and/or 655. An authentication system may be used to release flight-restriction regions to users 610a, 610b, 610c. In particular, an authentication system may include memory storage 630 that may store information about the users, remote controllers, and/or the UAVs.

A user 610a, 610b, 610c may be an individual associated with a UAV. The user may be an operator of the UAV. The user may be an individual that is authorized to operate the UAV. The user may provide input to control the UAV. A user may provide input to control the UAV with a remote controller 615a, 615b, 615c. A user may provide user input that controls flight of the UAV, operation of a payload of a UAV, a state of a payload relative to the UAV, operation of one or more sensors of the UAV, operation of UAV communication, or other functions of the UAV. The user may receive data from the UAV. Data acquired using one or more sensors of the UAV may be provided to the user, optionally via the remote controller. The user may be an owner of the UAV. The user may be a registered owner of the UAV. A user may be registered as being authorized to operate the UAV. The user may be from a government user. The user may be registered with the government. The user may be a completely separate entity from the government. The user may be a third party that is separate from the government. The user may be a human operator. The user may be an adult or a child. The user may or may not have line-of-sight with the UAV while operating the UAV. The user may directly communicate with the UAV using the remote controller. Alternatively, the user may indirectly communicate with the UAV (optionally, using the remote controller) over a network.

A user may have a user identifier (e.g., USER ID1, USER ID2, USER ID3, . . . ) that identifies the user. The user of the UAV may be an operator of the UAV. The user of the UAV may be an owner of the UAV. The user identifier may be unique to the user. Other users may have different identifiers from user. A user identifier may uniquely differentiate and/or distinguish the user from other individuals, such as other users. Additionally, the user identifier may be included in user identification information. In some examples, user information may be provided by or registered with a governmental agency. In additional examples, user information may not be provided by or registered with a governmental agency. Each user may only be assigned a single user identifier. Alternatively, a user may be able to register multiple user identifiers. In some instances, a single user identifier may be assigned to only a single user. Alternatively, a single user identifier may be shared by multiple users. In preferable embodiments a one-to-one correspondence may be provided between a user and a corresponding user identifier.

Optionally, a user may be authenticated as being an authorized user for the user identifier. An authentication process may include a verification of the user's identity. In some examples, a user may be verified using real name authentication. Additional examples of authentication processes are described in greater detail elsewhere herein.

The UAV 620a, 620b, 620c may be operable when powered on. The UAV may be in flight, or may be in a landed state. The UAV may collect data using one or more sensors (optionally, the payload may be a sensor). The UAV may operate in response to controls from the user (e.g., manually through a remote controller), autonomously (e.g., without requiring user input), or semi-autonomously (e.g., may include some user input but may also include aspects that do not rely on user input). The UAV may be capable of responding to commands from a remote controller 615a, 615b, 615c. The remote controller may be not connected to the UAV, the remote controller may communicate with the UAV wirelessly from a distance. The remote controller may accept and/or detect user input. The UAV may be capable of following a set of preprogrammed instructions. In some instances, the UAV may operate semi-autonomously by responding to one or more commands from a remote controller while otherwise operating autonomously. For instance, one or more commands from a remote controller may initiate a sequence of autonomous or semi-autonomous actions by the UAV in accordance with one or more parameters. The UAV may switch between being operated manually, autonomously, and/or semi-autonomously. In some instances, the activities of the UAV may be governed by one or more sets of flight regulations.

A UAV may have a UAV identifier (e.g., UAV ID1, UAV ID2, UAV ID3, . . . ) that identifies the UAV. The UAV identifier may uniquely identify the UAV from other UAVs. Additionally, the UAV identifier may be included in identification information of the UAV. The UAV identifier may be a government identifier. The UAV identifier may be a UAV identifier registered with the government. The UAV identifier may be an identifier that is a completely separate entity from a government identifier. The UAV identifier may be a third party identifier that is separate from a government identifier. The UAV identifier may be unique to the UAV. Other UAVs may have different identifiers from the UAV. A UAV identifier may uniquely differentiate and/or distinguish the UAV from other UAVs. Each UAV only be assigned a single UAV identifier. Alternatively, multiple UAV identifiers may be registered for a single UAV. In some instances, a single UAV identifier may be assigned to only a single UAV. Alternatively, a single UAV identifier may be shared by multiple UAVs. In preferable embodiments a one-to-one correspondence may be provided between a UAV and a corresponding UAV identifier.

Optionally, a UAV may be authenticated as being an authorized UAV for the UAV identifier. An authentication process may include a verification of the UAV's identity. Examples of authentication processes are described in greater detail elsewhere herein.

In some embodiments, a remote controller may have a remote controller identifier that identifies the remote controller. The remote controller identifier may be unique to the remote controller. Other remote controllers may have different identifiers from the remote controller. A remote controller identifier may uniquely differentiate and/or distinguish the remote controller from other remote controllers. Each remote controller may only be assigned a single remote controller identifier. Alternatively, multiple remote controller identifiers may be registered for a single remote controller. In some instances, a single remote controller identifier may be assigned to only a single remote controller. Alternatively, a single remote controller identifier may be shared by multiple remote controllers. In preferable embodiments a one-to-one correspondence may be provided between a remote controller and a corresponding remote controller identifier. Remote controller identifiers may or may not be associated with a corresponding user identifier.

Optionally, a remote controller may be authenticated as being an authorized remote controller for the remote controller identifier. An authentication process may include a verification of the remote controller's identity. Examples of authentication processes are described in greater detail elsewhere herein.

A remote controller may be any type of device. The device may be a computer (e.g., personal computer, laptop computer, server), mobile device (e.g., smartphone, cellular phone, tablet, personal digital assistant), or any other type of device. The device may be a network device capable of communicating over a network. The device may comprise one or more memory storage units which may include non-transitory computer readable medium which may store code, logic or instructions for performing one or more steps described elsewhere herein. The device may include one or more processors that may individually or collectively execute one or more steps in accordance with the code, logic, or instructions of the non-transitory computer readable medium as described herein. The remote controller may be handheld. The remote controller may accept inputs from a user via any user interactive mechanism. In one example, the device may have a touchscreen that may register a user input when the user touches the screen, or swipes the screen. The device may have any other type user interactive component, such as a button, mouse, joystick, trackball, touchpad, pen, inertial sensors, image capturing device, motion capture device, or microphone. The device may sense when the device is tilted, which may affect operation of the UAV. The remote controller may be a single piece configured to perform the various functions of the remote controller described elsewhere herein. Alternatively, the remote controller may be provided as multiple pieces or components that may individually or collectively perform the various functions of the remote controller as provided elsewhere herein.

An authentication system may include memory storage 130 that may store information about the users, remote controllers, and/or the UAVs. The memory storage may include one or more memory storage units. The one or more memory storage units may be provided together or may distributed over a network and/or at different locations. In some instances, the memory storage may be a cloud storage system. The memory storage may include one or more databases storing the information.

The information may include identification information about the users, remote controllers, and/or the UAVs. For example, the identification may include user identifiers (e.g., USER ID1, USER ID2, USER ID3, . . . ) and/or UAV identifiers (e.g., UAV ID1, UAV ID2, UAV ID3, . . . ). Remote controller identifiers may optionally be stored as well. The information may be stored in long-term memory storage, or may only be stored for a short period. The information may be received and buffered.

FIG. 6 shows a scenario where various users 610*a*, 610*b*, 610*c* may be controlling corresponding UAVs 620*a*, 620*b*, 620*c* within regions 640, 650, 655. In examples, one or more of regions 640, 650, 655 may be flight-restriction regions. In some examples, one or more of regions 640, 650, 655 may be TFR regions. In examples, a first user 610*a* may control a first UAV 620*a* with aid of a remote controller within region 640. A second user 610*b* may control a second UAV 620*b* with aid of a remote controller within regions 650, 655. A third user 610*c* may control a third UAV 620*c* with aid of a remote controller within region 655. The users may be remote to one another. In examples, the users may operate the UAVs in the same region. The users may operate their corresponding UAVs at the same time, or may operate them at different times. The times of use may overlap. The users and UAVs may be individually identifiable so that instructions from each user may only be accepted by the corresponding UAV, and not accepted by other UAVs. This may reduce the likelihood of interfering signals when multiple UAVs are in operation at the same time.

Each user may control the corresponding user's UAV. The user may be pre-registered with the UAV so that only the authorized user can control the corresponding UAV. Additionally, the user may have a license associated with the user that permits the user to operate their UAV in a particular region or regions. The UAV may be pre-registered so the user can only control the authorized UAV. Additionally, the UAV may have a license associated with the UAV that permits the UAV to operate in a particular region or regions. The relationship and/or association between the user and UAV may be known. Optionally, the relationship and/or association between the UAV may be stored in memory storage 630 of an authentication system. The user identifier may be associated with the corresponding UAV's UAV identifier.

The memory storage unit may keep track of commands from the user to the UAV. Additionally, the memory storage unit may keep track of a geographic position of the UAV.

The stored commands and/or location may be associated with a corresponding user identifier of the user and/or UAV identifier of the UAV. Optionally, an identifier for a corresponding remote controller may be stored as well.

The identities of the device or parties involved in the operation of the UAV may be authenticated. In particular, the identifiers of the device or parties involved in operation of the UAV within particular regions, such as flight-restriction regions, may be authenticated. For example, an identity of the user may be authenticated. The user may be verified as the user associated with the user identifier. The identity of the UAV may be authenticated. The UAV may be verified as the UAV associated with the UAV identifier. The identity of the remote controller may optionally be authenticated. The remote controller may be verified as the remote controller associated with a remote controller identifier.

FIG. 7 shows an example of an authentication system in accordance with an embodiment of the invention. The authentication system may be a UAV safety system or may operate as part of a UAV safety system. The authentication system may provide improved UAV safety. The authentication system may authenticate a user, a UAV, a remote controller, and/or a geo-fencing device.

The authentication system may include an identification (ID) registration database 710. The ID registration database may in communication with an authentication center 720. The authentication system may be in communication with an air control system 730 that may include a flight supervision module 740, flight regulation module 742, traffic management module 744, user access control module 746, and UAV access control module 748.

The ID registration database 710 may maintain identity information for a user 750a, 750b, 750c and a UAV 760a, 760b, 760c. The ID registration database may assign a unique identifier to each user and each UAV (Connection 1). The unique identifier may optionally be a randomly generated alphanumeric string, or any other type of identifier that may uniquely identifier a user from other users, or a UAV from other UAVs. The unique identifier may be generated by the ID registration database or may be selected from a list of possible identifiers that remain unassigned. The ID registration database may optionally assign a unique identifier for a geo-fencing device and/or remote controller, or any other device that may be involved in the UAV safety system. The identifiers may be used to authenticate the user, UAV, and/or the other device. The ID registration database may or may not interact with one or more users, or one or more UAVs.

The authentication center 720 may provide authentication of an identity of a user 750a, 750b, 750c or a UAV 760a, 760b, 760c. The authentication center may optionally authentication an identity of a geo-fencing device and/or remote controller, or any other device that may be involved in the UAV safety system. The authentication center may obtain information about the user and the UAV (and/or any other devices involved in the UAV safety system) from the ID registration database 710 (Connection 2). In some examples, the UAV may be automatically prevented from flying within a flight-restriction region without granted permission to fly within the flight-restriction region. In some examples, the UAV may be able to fly within the flight-restriction region when granted permission to fly within the flight-restriction region. Further details about the authentication process are provided elsewhere herein.

In examples, a user may be authenticated based on financial information provided by the user. In some examples, the identity of the user may be authenticated based upon financial information provided by the user. In particular, financial information may be used to determine or verify the legal name or legal identity of the user. In some instances, a user may be granted permission to fly in a flight-restriction region based on financial information provided by the user. In some examples, the financial information may comprise a payment card for the user. In some examples, the payment card may comprise at least one of a credit card, debit card, or gift card. The payment card may belong to the user. In additional examples, the payment card may be belong to another person, such as a parent of the user, and may be associated with the user. In additional examples, the payment card may comprise account information associated with the user. In some instances, the financial information for the user comprises bank account information of the user. In some examples, the financial information may comprise insurance information of the user. In some instances, the financial information for the user comprises a pre-paid flight pass of the user.

In examples, the granting or denying of permission for the UAV to fly within the flight-restriction region may be based on an identity of the user or an identity of the UAV. In examples, a user may be authenticated based on real name authentication. In particular, a user may be authenticated based on information that is tied to the user's legal name and/or legal identification information. Real name authentication is particularly beneficial with respect to the granting of licenses to allow a UAV to enter airspace that has flight restrictions. In particular, it is beneficial to have authentication based on the legal identity of a user so that additional information that may relate to the user's legal identity may be used to assess whether to grant a license to fly in a flight restricted area. Additionally, when a user has been verified using real name authentication, the user may be accountable for actions that occur through the use of the UAV. For example, when a user has been authenticated using real name authentication, the user may be responsible for fines that may result in violation of flight regulations. In additional examples, when a user has been authenticated using real name authentication, the user may be responsible for accidents that may result from the use of the UAV.

A user may be authenticated using real name authentication by providing information, including but not limited to financial information, associated with the user's legal identity. Examples of information that may tie a user to his or her legal identity include legal name, birthplace, parent name(s), credit card information, debit card information, mobile phone number, a phone number, bank account number, insurance information, and home address, among other types of information. In examples, a credit card may be used to verify the real name authentication of a user. In some examples, a credit card number and a telephone number may be used to verify the real name authentication of a user. In some examples, the credit card information may not be stored at an authentication system. In some examples, the credit card information may only be used to verify the identity of a user. Similarly, a mobile phone number may be used to verify a user's identity, but may not be stored within an authentication system. For example, a mobile phone number may be used to place a confirmatory call or to send a confirmatory text to a user. As used herein, "financial information" is not limited to the balance of any account in a bank or a financial institute. Any information relating to a user's financial situation, including without limitation, e.g., credit card information, debit card information, bank account numbers, salary, employment, assets owned or leased, any personal information of the user (e.g., name, citizenship, nationality, address, telephone number (such as mobile phone number, home number, work number), e-mail address, website, birthdate, social security number) that may be associated with the account, and any other information that is related to accountability of the user.

Once a user has been authenticated using real name authentication, the identification of the user's legal name and/or legal identification information may be used to hold the user accountable for action that occur through the use of a UAV. In some examples, the user of the UAV is the owner of the UAV. In some examples, the user is an operator of the UAV. For example, if a user flies a UAV into a restricted flight area, the legal name of the user may be used to contact the user and/or find the user's current location. In determining whether a UAV has entered into a restricted area, the system may assess whether a location associated with the UAV falls within the flight-restriction region. In examples, the assessing of the location of the UAV may occur in real-time. In examples, the assessing of the location of the UAV may occur prior to granting permission for the UAV to fly within the flight-restriction region. In some examples, the assessing of the location of the UAV may occur prior to denying permission for the UAV to fly within the flight-restriction region. In additional examples, the system may detect that the flight-restriction region is designated in error. In particular, the system may detect that the flight-restriction region is designated in error with aid of the UAV. In example, sensors of the UAV may be used to detect whether the flight-restriction region has been designated in error. Additionally, in examples, the system may report, by the UAV, an update that the flight-restriction region is designed in error. Accordingly, in examples, the UAV and/or user can detect this type of designation error and can report a designation error to the system. In response to the UAV reporting the error, the system can verify and/or update records. In this way, the detection of designation errors and the reporting of designation errors may be a self-learning aspect that may be integrated into the system. In examples, the system may receive information from a plurality of UAV users, and may use the information received to update information within the system that is associated with determining the boundaries and/or classifications of flight-restriction regions using the information that is collected from various UAVs. In examples, the system may update its mapping component in a continuous manner. In examples, the system may update its mapping component in a periodic manner. In examples, the system may update some or all UAVs based on designated errors that are detected. Additionally, the system may also provide updates based on detection that a region is no longer a flight-restriction region.

This may be beneficial so as to avoid or resolve violations of flight regulations. In examples, the financial information may be stored during the duration of the flight of the UAV within the flight-restriction region. In some examples, the financial information may be stored subsequent to the flight of the UAV within the flight-restriction region. In some examples, the financial information may be stored for a predetermined period of time following the flight of the UAV within the flight-restriction region. In some examples, the financial information may be stored until a request is received to delete the financial information of the user. The request to delete the financial information of the user may be received from the user, from a bank, from another person associated with the user, or from another third party. In other examples, the financial information is automatically deleted after the flight of the UAV within the flight-restriction region. Additionally, in the event that a violation has occurred, identification information associated with the user may be used to assess a fine or warning so as to prevent future violations.

There are many ways to track and determine whether a violation has occurred during the use of a UAV. For example, the UAV may itself be tracked using sensors on the UAV. In other examples, the UAV may be tracked by viewing the geographic location of the UAV from other sensors, such as cameras. Based on the detection of a violation of flight regulations or other incidents that may occur during the use of the UAV, the user that is associated with the UAV may be assessed fines or other penalties. Additionally, the fines and penalties that may be assessed against the user may be connected to the real name authentication of the user.

An air control system 730 may interact with the authentication center 720. The air control system may obtain information, about the user and the UAV (and/or any other devices involved in the UAV safety system) from the authentication center (Connection 4). The information may include the user identifier and the UAV identifier. The information may relate to confirmation or identification of the user and/or UAV identity. The air control system may be a management cluster that may include one or more subsystems, such as a flight supervision module 740, flight regulation module 742, traffic management module 744, user access control module 746, and UAV access control module 748. The one or more subsystems may be used for flight control, air traffic control, relevant authorization, identification of flight restriction regions, release of flight restriction regions to authenticated users, tracking of UAVs within flight regions, determination of flight violations by UAVs within flight regions, user and UAV access management, and other functions.

In one example, a flight supervision module/subsystem 740 may be used to monitor flight of UAVs within an allocated airspace. The flight supervision module may be configured to detect when one or more UAVs deviate from a predetermined course. The flight supervision module may detect when one or more UAVs perform an unauthorized action, or an action that was not inputted by the user. The flight supervision module may also detect when one or more unauthorized UAVs enter an allocated airspace. The flight supervision module may issue a warning or alert to the unauthorized UAVs. The alert may be provided to a remote controller of a user operating the unauthorized UAV. The alert may be issued in a visual manner, auditory manner, or tactile manner.

The flight supervision module may utilize data collected by one or more sensors onboard the UAV. The flight supervision module may utilize data collected by one or more sensors off-board the UAV. The data may be collected by radar, photoelectric sensors, or acoustic sensors that ma monitor UAVs or other activity within an allocated airspace. The data may be collected by one or more base stations, docks, battery stations, geo-fencing devices, or networks. The data may be collected by stationary devices. The stationary devices may or may not be configured to physically interact with the UAVs (e.g., restore energy to the UAV, accept a delivery from a UAV, or provide repairs to the UAV). The data may be provided from wired or wireless communications.

The air control system may further include a flight regulation module/subsystem 742. The flight regulation module may be configured to generate and store one or more sets of flight regulations. Air traffic management may be regulated based on a set of flight regulations. Generation of the flight regulations may include the creation of flight regulations from scratch, or may include selecting one or more sets of flight regulations from a plurality of sets of flight regulations. The generation of flight regulations may include combining selected sets of flight regulations.

A UAV may operate in accordance with one or more sets of imposed flight regulations. The flight regulations may regulate any aspect of operation of the UAV (e.g., flight, sensors, communications, payload, navigation, power usage, speed, items carried). For instance, the flight regulations may dictate where the UAV may or may not fly. The flight regulations may dictate when the UAVs may or may not fly in particular regions. The flight regulations may dictate when data may be collected, transmitted and/or recorded by one or more sensors on-board the UAV. The flight regulations may dictate when a payload may be operational. For example, a payload may be an image capturing device, and the flight regulations may dictate when and when the image capturing device may be capturing images, transmitting the images, and/or storing the images. The flight regulations may dictate how communications may occur (e.g., channels or methods that may be used) or what types of communications may occur.

The flight regulation module may include one or more databases storing information pertaining to the flight regulations. For example the one or more databases may store one or more locations where flight of a UAV is restricted. The flight regulation module may store sets of flight regulations for multiple types of UAVs, and the sets of flight regulations may be associated with particular UAVs. It may be possible to access a set of flight regulations associated with a specific type of UAV from multiple types of UAVs.

The flight regulation module may approve or reject one or more flight plans of a UAV. In some instances, a flight plan including a proposed flight path for a UAV may be designated. The flight path may be provided in relation to the UAV and/or the environment. The flight path may be entirely defined (all points along the path are defined), semi-defined (e.g., may include one or more waypoints but the paths to get to the waypoints may be variable), or not very defined (e.g., may include an end destination or other parameter, but the path to get there may not be defined). The flight regulation module may receive the flight plans and may approve or reject the flight plans. The flight regulation module may reject the flight plans if they are in contradiction to a set of flight regulations for the UAV. The flight regulation module may suggest modifications to the flight plans that may put them in compliance with the set of flight regulations. The flight regulation module may generate or suggest a set of flight plans for the UAV that may comply with the set of flight regulations. A user may enter one or more parameters or goals for a UAV mission, and the flight regulation modules may generate or suggest a set of flight plans that may meet the one or more parameters while complying with the set of flight regulations. Examples of parameters or goals for a UAV mission may include a destination, one or more waypoints, timing requirements (e.g., overall time limit, time to be at certain locations), maximum speeds, maximum accelerations, type of data to be collected, type of image to be captured, any other parameter or goal.

A traffic management module/subsystem 744 may be provided for the air control system. The traffic management module may be configured to receive a request for a resource from a user. Examples of resources may include, but are not limited to, wireless resources (e.g., bandwidth, access to communication devices), locations or space (e.g., for a flight plan), time (e.g., for a flight plan), access to base stations, access to docking stations, access to battery stations, access to delivery or pick-up points, or any other type of resource. The traffic management module may be configured to plan a flight course for a UAV in response to the request. The flight course may make use of the allocated resources. The traffic management module may be configured to plan a mission for the UAV, which may optionally include a flight course as well as operation of any sensors or other devices on-board the UAV. The mission may utilize any of the allocated resources.

The traffic management module may be configured to adjust a mission based on detected conditions in the allocated airspace. For instance, the traffic management module may adjust a predetermined flight path based on the detected conditions. In other examples, the traffic management module may adjust a predetermined flight path based on flight-restriction regions. In particular, the traffic management module may adjust the flight path of a device based on a region that becomes a flight-restriction region. Adjusting the flight path may include adjusting an entirely predetermined flight path, adjusting a way-point of a semi-defined flight path, or adjusting a destination of a flight path. The detected conditions may include climate, changes in available airspace, accidents, establishment of geo-fencing devices, or changes in flight regulations. The traffic management module may inform a user of the adjustment to the mission, such as an adjustment to the flight path.

A user 750a, 750b, 750c may be an individual associated with the UAV 760a, 760b, 760c, such as a person operating the UAV. Examples of users and UAVs are described elsewhere herein. A communication channel may be provided between a user and a corresponding UAV that may be user to control operation of the UAV (Connection 3). Controlling operation of the UAV may include controlling flight of the UAV, or any other portions of the UAV as described elsewhere herein.

A communication channel (Connection 5) may be provided between the UAVs and the air control system, as the air control system may identify a condition, warn a user about the condition, and/or take over the UAV to ameliorate the condition. The communication channel may also be useful for identity authentication when a user and/or UAV are undergoing to the authentication process. Optionally, a communication channel may be established between the air control system and a remote controller of a user, and may provide some of the similar functionality. In systems including geo-fencing devices, communication channels may be provided between the geo-fencing devices for identification/authentication and/or condition identification, alert and/or takeover.

A communication channel (Connection 6) may be provided between the users and the air control system, as the air control system may identify a condition, warn a user about the condition, and/or take over the UAV to ameliorate the condition. Additionally, the communication channel may be used by the air control system to identify, notify, and/or warn users of violations or potential violations of flight regulations. For example, the air control system may notify a user that the user is flying at too high of a speed, e.g. a speed that exceeds a permissible amount. The air control system may notify users of potential violations of flight regulations that may result in a fine to the user. The communication channel may also be useful for identity authentication when a user and/or UAV are undergoing to the authentication process.

Optionally, Connection 1 may be a logic channel. Connection 2 and Connection 4 may be a network connection. For instance, Connection 2 and Connection 4 may be provided over a location area network (LAN), wide area network (WAN) such as the Internet, a telecommunications network, a data network, a cellular network, or any other type of network. Connection 2 and Connection 4 may be provided through indirect communications (e.g., over a network). Alternatively, they may be provided through a direct communication channel. Connection 3, Connection 5, and Connection 6 may be a network connection, a mobile access network connection, provided via a remote controller or ground station, or any other type of connection. They may be provided via indirect communication channels or direct communication channels.

An authorized third party (such as an air control system, a geo-fencing system, etc.) can identify a corresponding UAV through the authentication center according to its UAV identifier (ID) and obtain relevant information (such as the UAV's configuration, its capacity level and security level). The security system may be able to handle UAVs of different types. UAVs of different types may have different physical characteristics (e.g., models, shapes, sizes, engine power, ranges, battery life, sensors, performance capabilities, payload, payload ratings or capacity) or may be used to perform different missions (e.g., surveillance, videography, communications, delivery). The UAVs of different types may have different security levels or priorities. For example, UAVs of different types may be authorized to perform different activities. For instance, a UAV of a first authorization type may be authorized to enter a region that a UAV of a second authorization type may be not be authorized to enter. UAV types may include different UAV types created by the same manufacturer or designer, or by different manufacturers or designers.

An authorized third party (such as an air control system, a geo-fencing system, etc.) can identify a corresponding user through the authentication center according to a user identifier (ID) and obtain relevant information. The security system may be able to handle users of different types. Users of different types may have different skill levels, amounts of experience, associations with different types of UAVs, authorization levels, or different demographic information. For examples, users with different levels of skills may be considered users of different types. The users may undergo certification or testing to verify the user skill level. One or more other users may vouch for or verify the user's skill level. For instance, an instructor of the user may verify the user's skill level. The user may alternatively self-identify the user skill level. Users with different degrees of experience may be considered users of different types. For instance, the user may log or certify certain number of hours of operation of a UAV, or number of missions flown using the UAV. Other users may verify or vouch for the degree of experience of the user. The user may self-identify the amount of experience for the user. The user type may be indicative of a level of training of the user. The skill level and/or experience of the user may be general to UAVs. Alternatively, the skill level and/or experience of the user may be specific to UAV type. For example, a user may have a high skill level or great amount of experience with a first type of UAV while having a low skill level or not much experience with a second type of UAV. Different users of different types may include users of different authorization types. Different authorization types may mean different sets of flight regulations may be imposed on different users. In some instances, some users may have higher security levels than other users which may mean fewer flight regulations or restrictions are placed on the users. In some instances, regular users may be differentiated from administrative users who may be able to take-over control from regular users. Regular users may be differentiated from control entity users (e.g., members of government agencies, members of emergency services, such as law enforcement). In some embodiments, administrative users may be control entity users or may be differentiated from control entity users. In another example a parent may be able to take over flight control from the parent's child, or an instructor may be able to take over flight control from a student. User type may be indicative of a class or category of a user in operating one or more types of UAVs. Other user type information may be based on user demographics (e.g., location, age, etc.).

Additionally, the implementation of distinct levels of flight restriction regions, including TFR regions, may provide a path to both autonomy and accountability for operators of UAVs. In examples, authentication of a UAV entering a flight restricted area may be used to tie actions of the UAV with an owner and/or operator of the UAV.

In examples, penalties associated with violations of flight regulations and/or other incidents associated with the flight of a UAV may be assessed during flight of the UAV. In some examples, penalties associated with violations may be applied after the flight. In examples, penalties may be assessed against a user that is controlling a UAV when the UAV exceeds a maximum speed associated with a flight region. Additionally, penalties may be assessed against a user that is controlling a UAV if the UAV is involved in an accident. Further, if a UAV is involved in an accident, user identification information such as insurance information may be used to assess a claim against the user.

As discussed above, users may be authenticated so as to be released to fly in flight-restriction regions based on real name authentication. In examples, a user that is controlling a UAV that commits a flight violation may be tracked down based on information provided by the user during real name authentication. Alternatively, the user may be tracked down based on information associated with the user that has not necessarily been provided from the user, but that can be found based on the user's legal name. In examples, if a user provides a credit card for identification purposes, the information associated with the credit card may be used to identify a legal address associated with the user. In this way, identification information that is provided from a user (e.g. credit card information) may be used to determine additional information associated with the user (e.g. a home address and/or phone number). In this way, a user that is found to have violated one or more regulations may be tracked down based on their personal identifying information. Additionally, information that is associated with a user's real name authentication may be used to notify authorities, such as a local police, if a determination has been made that an accident and/or violation has occurred.

Based on the tracking and accountability mechanisms described herein, users may be responsible for taking their own actions with respect to flying a device, such as a UAV. In some cases, a user that is flying a UAV may be notified that they are violating a flight regulation. In examples, the user may be notified that they may be assessed a fine based on their flying behavior. Additionally, the user may choose to continue flying their device, such as a UAV, despite the notification of potential violations. In this way, the user may be held responsible for his or her actions when flying a UAV. Additionally, when users violate flight regulations or other regulations, the information associated with the user may be provided to a government entity so that the user may be contacted for accountability purposes.

As discussed above, flight-restriction regions may be released in real time when UAV encounters restriction zone. In example, a release process used by a UAV may be initiated using a mobile application on a mobile terminal. For example, a mobile application may be used to initiate a release process using mobile equipment, a smart phone, or other examples of a mobile device. In some examples, the release process for obtaining a license to fly in flight restricted areas may be internet-based.

In some examples, a request for a license to release a flight-restriction region may be associated with real-name authentication of a user. For example, a license to fly in a particular flight restricted area may be based on a user qualifying as a user that has been authenticated using real name authentication. Additionally, once a user has qualified for a release license for a particular region, a license associated with the region may be stored at a server. Additionally, a license that is provided to a user to release a flight region may include a time stamp. The license may also or alternatively use a flight restriction level as described herein.

Additionally, a mobile application that is associated with a user may also be used to view and select flight-restriction regions to release. The user may use the mobile application to release one or more flight-restriction regions prior to a UAV flight. In other examples, the user may use the mobile application to release one or more flight-restriction regions during a UAV flight. In examples, after logging in a personal account page with user name and password, a user can enter a zone releasing page on the mobile application. In particular, the zone releasing page may allow a user to select flight regions to release by clicking on the flight restricted areas that are of interest to the user.

In examples, a user may input particular flight restriction zones to be released. In other examples, the user may input a particular category of flight restriction zones to release. In additional examples, the user may input an effective time frame of releasing flight-restriction regions. For example, a user may request that flight restriction zones within a particular geographic area are released simultaneously. A particular geographic area may include a city, a neighborhood, an area associated with a natural geographic boundary (e.g., a river, lake, mountain range, etc.), or another defined geographic area. Additionally or alternatively, a user may request that flight restriction zones within a particular flight path are released simultaneously. Additionally, the user may input a sequence number of one or more devices to fly within a particular area.

After applying for a release, mobile terminal can request from server interface a list of licenses pertaining to released areas. In examples, a server can provide a list of license keys that are associated with the mobile terminal. The list of license keys may pertain to UAV devices and/or equipment based on one or more sequence numbers that a user input when requesting release of one or more flight-restriction regions. Additionally, a user can select license keys according to flight-restriction regions that may be needed to be released based on a user's proposed flight plan. Further, the user may download one or more license keys from a server and may upload the license keys to a flight controller so as to release flight-restriction regions. In some examples, flight keys that are downloaded by the user at a mobile terminal may be encrypted. In particular, a user at a mobile terminal may download encrypted licenses associated with releasing flight-restriction regions.

In another example of applying for a release of a flight restricted zone in a real time, a UAV may use a global position system (GPS) to determine the position of the UAV. Based on the GPS position of the UAV, a mobile application associated with the UAV may determine whether the UAV is in proximity to a flight-restriction region. If the mobile application determines that the user is within a threshold geographic proximity of a flight-restriction region, the mobile application may prompt the user of a potential legal risk that may be associated with flying into a flight restricted area.

Based on the notification of a potential legal risk, the user may provide an indication that he or she intends to continue flying the UAV despite the potential legal risk. Alternatively, the user may provide an indication that he or she intends to modify the UAV flight path so as to avoid the potential legal risk. If the user provides an indication that he intends to continue flying despite the potential legal risk, the system may recheck the user's authentication information. In particular, the system may recheck to see if there is any additional information that is associated with the user. This additional check of the user's authentication may also or alternatively be triggered by a failure of a user to response to a notification of potential legal risk associated with flying the UAV.

In additional examples, if a user account is authenticated, or re-authenticated, in view of a potential legal risk of flying into a restricted flight region, the system may request a release associated with the upcoming flight-restriction region. In examples, the system may request a temporary release that is based on the user's close proximity to the flight-restriction region. In examples, an interface of user authentication information may be requested from the server. Based on information input in the user interface, a temporary release for a flight-restriction region may be requested. In other examples, a temporary release may be obtained using an automatic approval process.

An example of a process 800 of communication related to releasing a flight-restriction region is provided in FIG. 8. At block 810, a user provides an indication to release a restriction on a flight-restriction region. This may be completed by the user clicking a "release a restriction" indication on a mobile application, which may be referred to as an "APP". Once the user has provided an indication to release a restriction, the user may be presented with flight-restricted regions and, further, may select a flight-restricted region. In examples, the user may select a flight-restriction region that the user from which the user wishes to obtain a release.

At block 820, a determination is made as to whether the flight-restricted region is in a nation that allows releasing. If the answer to the determination is "No" or "Unknown," the process may proceed to block 825, and the user may be presented with a notification that states releasing is not supported. In particular, the user may be presented with a user interface that presents a notification that states, "Releasing is not supported in current location." If the answer to the determination of block 820 is yes, however, the process may proceed to block 830. At block 830, a request may be provided to a restriction-releasing privilege port of a server. If the server returns an indication that there is no privilege to release, the process may proceed to block 840. At block 840, the mobile application may provide a request to the credit card authentication port of a server. Using this request, the mobile application may acquire the user's authentication information. If the authentication fails, the process may proceed to block 845 where the mobile application may provide a prompt to the user that the application has failed. If the authentication is successful, the process may proceed to block 850.

At block 850, the mobile application may initiate a call to the authentication confirmation port and write user information to an authentication service. If the writing fails, the process may proceed to block 860, and the mobile application may prompt the user that the "user information writing fails." If the writing is successful, the process may proceed to block 855. At block 855, the mobile application may request to the restriction-releasing port of a server. In particular, the mobile application may write information on regions to be released. Additionally, a license key port may be called, and the mobile application may acquire a license file. The mobile application may also upload the license file to a flight controller.

Methods and systems are provided for automating approval of regulated flight based on confirmation of an identity of a user and/or a UAV. Accordingly, FIG. 9 provides a method 900 for regulating flight of an unmanned aerial vehicle (UAV), in accordance with embodiments. At block 910, identification information associated with a UAV is obtained. In particular, at block 910, UAV identification information is obtained for the UAV or user identification information for a user of a UAV is obtained. In examples, UAV identification information may include information about a model of the UAV, a manufacturer of the UAV, and/or performance characteristics of the UAV. Additionally, the UAV identification information may include a serial number of a UAV. In some examples, the UAV identification information may include a portion of a serial number of a UAV. Additionally, in some examples, user information may include information about a user's name, address, or phone number. The user information may also comprise information about a level of training for UAV flight of the user. Additionally, the user information may include information about certifications or licenses for UAV flight that are held by the user.

In additional examples, user information may include financial information for the user. In examples, the financial information for the user may comprise a payment card for the user. The payment card may be a credit card of the user, debit card of the user, gift card of the user, or a corresponding record thereof. The financial information for the user may also comprise bank account information of the user. Additionally, the financial information for the user may comprise a pre-paid flight pass of the user.

At block 920, the UAV is either granted or denied permission to fly within a flight-restriction region. In particular, the UAV is automatically granted or denied permission to fly within a flight-restriction region based on the UAV identification information or the user identification information.

In some examples, an assessment may be made as to whether a location of the UAV falls within a flight-restriction region. The assessment of the location of the UAV may occur in real time. The assessment of the location of the UAV may occur prior to granting or denying permission for the UAV to fly within the flight-restriction zone. The assessment of whether the UAV falls within the flight-restriction region may depend on the UAV identification information or the user identification information.

In additional examples, a request for the UAV to fly within the flight-restriction region may be obtained prior to granting or denying permission for the UAV to fly within the flight-restriction region. In some examples, the request may originate from the UAV. In some examples, the request may originate from a remote controller of the UAV. In some examples, the request may originate from a server remote to the UAV. In some examples, the request may be provided through a web-based application. In some examples, the request may be provided through a mobile application. In some examples, the request may comprise an indication of a proposed flight path of the UAV. In some examples, the request may comprise an indication of a proposed flight area of the UAV for releasing a flight-restriction region. In some examples, the request may comprise an indication of a proposed timing of the UAV flight. In some examples, the request may comprise a current UAV location. In some examples, the request may be made in real-time while the UAV is in flight towards the flight-restriction region. In some examples, the request may be made in advance prior to the UAV flying toward the flight-restriction region.

The granting or denying permission for the UAV to fly within the flight-restriction region may occur subsequent to authenticating an identity of the UAV or the user. In some examples, authenticating the identity of the UAV may comprise verification of the UAV identity. In some examples, the authenticating the identity of the user of the UAV may comprise verification of the user identity. In some examples, authenticating the identity of the UAV may include verifying whether the UAV having the verified UAV identity does not have any record that the UAV should not be permitted to fly within the flight-restriction region, or authenticating the identity of the user further comprises verification whether the user having the verified user identity does not have any record that the user should not be permitted to operate the UAV within the flight-restriction region. In some examples, the UAV may be granted permission to fly within the flight-restriction region when the UAV identity or the user identity is authenticated. In some examples, the UAV may be denied permission to fly within the flight-restriction region when the UAV identity or the user identity is not authenticated.

A license key corresponding to the flight-restriction region for the UAV or the user may be generated upon authenticating the identity of the UAV or the user. The license key may permit UAV or the user to fly within the flight-restriction region. In examples, the UAV may be prevented from flying within the flight-restriction region without granted permission to fly within the flight-restriction region. In examples, the UAV may be able to fly within the fight-restriction region when granted permission to fly within the flight-restriction region. The granting or denying permission for the UAV to fly within the flight-restriction region may depend on air traffic within the flight-restriction region. In examples, the air traffic within the flight-restriction region may comprise a number of other UAVs already within the flight-restriction region.

The user may be permitted to configure one or more flight parameters within the flight-restriction region, when the user is granted permission to fly within the flight-restriction region. In examples, a flight parameter of the one or more flight parameters may be a maximum or minimum height of UAV flight. In examples, a flight parameter of the one or more flight parameters may be a maximum speed of the UAV flight.

Activity of the UAV may be monitored within the flight-restriction region when the UAV is granted permission to fly within the flight-restriction region. In some examples, the activity of the UAV may be monitored with aid of a server at a location remote to the UAV. In some examples, the activity of the UAV is monitored with aid of a server at a location remote to the UAV, wherein monitoring the activity of the UAV with aid of a server comprises recording activity of the UAV, recording all activity of the UAV during a period of time, or recording a portion of activity of the UAV during a period of time. In some examples, the activity of the UAV may be monitored with aid of a data recording device on-board the UAV or on-board a remote controller of the UAV. In some examples, the activity may be monitored with aid of data transmitted from the UAV, a remote controller of the UAV, or a flight-restriction monitoring device. In additional examples, an error in the designation of the flight-restriction region may be detected. Additionally, the method may comprise reporting an update, by the UAV, that the flight-restriction region is designated in error.

Additional methods and systems are provided for collecting financial information prior to providing permission to fly in a flight-regulated region. Accordingly, FIG. 10 provides another method 1000 for regulating flight of an unmanned aerial vehicle (UAV), in accordance with embodiments. At block 1010, financial information for a user of the UAV is obtained. In examples, the financial information for the user may comprise a payment card for the user. In some examples, the payment card may comprise at least one of a credit card, debit card, or gift card. The payment card may belong to the user. In additional examples, the payment card may be belong to another person, such as a parent of the user, and may be associated with the user.

At block 1020, the UAV is either granted or denied permission to fly within a flight-restriction region. In particular, the UAV is granted or denied permission to fly within a flight-restriction region in response to obtaining the financial information for the user.

In some examples, a request for the UAV to fly within the flight-restriction region may be received prior to granting or denying permission for the UAV to fly within the flight-restriction region. In some examples, the request may originate from the UAV. In some examples, the request may originate from a remote controller of the UAV. In some examples, the request may originate from a server remote to the UAV. In some examples, the request may be provided through a web-based application. In some examples, the request may be provided through a mobile application. In some examples, the request may comprise an indication of proposed flight path of the UAV. In some examples, the request may comprise an indication of proposed flight area of the UAV. In some examples, the request may comprise an indication of a proposed timing of the UAV flight. In some examples, the request may be made in advance prior to the UAV flying toward the flight-restriction region. In some examples, the request may be made in real-time as the UAV is flying towards the flight-restriction region.

In some examples, financial information may include insurance information. Additionally, in an event of an accident that results in financial liability, charges associated with the accident may be pulled directly or indirectly from an insurance company. In examples, monitored information of activity associated with an accident may be used to aid in the determination of which users, if any, should pay money towards a financial obligation associated with an accident. For example, if an event occurs involving a UAV, it may be difficult to assess blame and/or responsibility of the accident. However, when UAV activity is reviewed, additional information may be assessed to determine which parties are responsible for the accident. This assessment may be conducted in real-time. In other examples, this assessment may be conducted at a later time after the accident. Additionally, in examples, financial information may include information associated with a payment card, such as the type of payment card, the card number of the payment card, the expiration date of the payment card, the verification code on the back of the payment card, a name on the payment card, a name associated with the payment card, and other information associated with the payment card.

In some instances, the granting or denying permission for the UAV to fly within the flight-restriction region may occur with the aid of one or more processors. In some examples, the granting or denying of permission for the UAV to fly within the flight-restriction region may occur without human intervention. In some examples, the granting or denying of permission for the UAV to fly within the flight-restriction region may occur based on one or more rule-based assessments by the one or more processors. In examples, the one or more processors may be configured to obtain a request for the UAV to fly within the flight-restriction region prior to granting or denying permission for the UAV to fly within the flight-restriction region. In examples, obtaining a request may comprise receiving a request.

Additionally, the granting or denying of permission for the UAV to fly within a particular flight-restriction region may occur subsequent to verifying the financial information for the user. In some examples, verifying the financial information for the user may comprise verifying a minimum availability of accessible funds for the user. In some examples, verifying the financial information for the user may comprise verifying accuracy of the financial information for the user. In some examples, verifying the financial information for the user may comprise undergoing an automated clearing house (ACH) process. In some examples, the UAV may be granted permission to fly within the flight-restriction region when the financial information is verified. In some examples, the UAV may be denied permission to fly within the flight-restriction region when the financial information is not verified.

In some examples, a user may be permitted to configure one or more flight parameters within the flight-restriction region. In examples, the user may be granted permission to fly within the flight-restriction region. In some examples, a flight parameter of the one or more flight parameters may be a maximum or minimum height of a UAV flight. In some examples, a flight parameter of the one or more flight parameters may be a maximum speed of a UAV flight.

Additionally, activity of the UAV may be monitored within the flight-restriction region when the UAV is granted permission to fly within the flight-restriction region. In examples, the activity of the UAV may be monitored with aid of a server at a location that is remote to the UAV. In some examples, the activity of the UAV may be monitored with aid of a data recording device on-board the UAV. In some examples, the activity of the UAV may be monitored with aid of a data recording device on-board a remote controller of the UAV.

In some examples, a determination may be made as to whether an activity of the UAV results in financial liability. In some examples, financial liability may be automatically imparted to the user based on the user's credit card or debit card when monitoring the activity results in a detection of financial liability. In some examples, the toll or fee for the activity of the UAV within the flight-restriction region may be charged. In some instances, the toll or the fee may be shared with one or more owners of a property that is affected by the activity of the UAV. In some examples, the owner of the property may be affected by the activity of the UAV when damage is caused by the UAV to the property. In some examples, the owner of the property may be affected by the activity of the UAV when the UAV flies over the property.

In some examples, the financial liability may comprise damage to property within a flight-restriction region. In some examples, the financial liability may comprise injury to an individual or animal within the flight-restriction region. In some examples, the financial liability may comprise nuisance or inconvenience to individuals within the flight-restriction region. In some examples, the financial liability may comprise violation of a law, rule, or regulation within the flight-restriction region. In some examples, the user of the UAV may be charged an amount of money based on the assessed financial liability. In some examples, the user may automatically have an amount of money associated with the financial liability deducted from the user based on the financial information for the user of the UAV. In some examples, the insurance of a user of the UAV may be charged an amount of money based on the financial liability.

In some instances, each of the various categories of areas where flight restriction is necessary, beneficial, or desired may be divided into a plurality of different flight restriction levels. The various categories may comprise airports, flight corridors, military or other government facilities, locations near sensitive personnel (e.g., when the President or other leader is visiting a location), nuclear sites, research facilities, private airspace, de-militarized zones, certain jurisdictions (e.g., townships, cities, counties, states/provinces, countries, bodies of water or other natural landmarks), national borders (e.g., the border between the U.S. and Mexico), private or public property, or any other types of zones. For example, each category of flight restricted region may be divided into 2, 3 4, 5, 6, 7, 8, 9, 10 or more flight restriction levels. Each of the flight restriction level may have a corresponding flight restriction rule for UAVs associated with it. FIG. 11 illustrates an area 1100 comprising a plurality of different flight restricted regions of three different flight restriction levels 1104, in accordance with embodiments. Each of the different flight restricted regions may be associated with a distinct flight restriction level, which may affect or limit activity of the UAV within the region.

Each of the different flight restricted regions may have a regular shape or an irregular shape. Each of the different flight restricted regions may have a regularly shaped boundary or an irregularly shaped boundary. Each of the different flight restricted regions may be defined by a two dimensional boundary or a three dimensional boundary. For example, flight restricted region 1110 may have a regularly shaped two dimensional boundary. For example, flight restricted regions 1106 or 1108 may have an irregularly shaped two dimensional boundary. A regularly shaped flight restriction region may be mathematically definable. A regularly shaped flight restriction region may comprise a polygonal shape or a spherical shape. An irregularly shaped flight restriction region may be defined by locations on a grid map or may trace a boundary of a desired region, e.g., with a plurality of flight restricted strips. Each of the flight restricted regions may be stored on board the UAV. Each of the flight restricted regions may be stored off board the UAV (e.g., on an online database) and may be accessed by the UAV. In some instances, some of the flight restricted regions may be stored on board the UAV while some of the flight restricted regions may be stored off board the UAV (e.g., on an online database).

In some instances, the different flight restriction levels may be associated with a warning. For example, in FIG. 11 shows flight restricted region 1106 associated with flight restriction level 1 which is associated with a warning. When a UAV enters or encroaches upon flight restricted region 1106, a warning or an alert may be provided. When a UAV attempts to take off within flight restricted region 1106, a warning or an alert may be provided. If a UAV inadvertently enters or ends up within flight restricted region 1106 (e.g., through error), a warning or an alert may be provided. The flight restricted region associated with a warning may herein be referred to as a warning region.

The warning or the alert may be visual, tactile, auditory, and the like. In some instances, the alert of the warning may be provided on the UAV. For example, the UAV may comprise means for visual display (e.g., LEDs). The means for visual display may react (e.g., the LEDs may flash) in response to the UAV entering the warning region. For example, the UAV may comprise a means to broadcast auditory signals (e.g., speakers). The means to broadcast auditory signals may react (e.g., speakers may broadcast a sound) in response to the UAV entering the flight restricted region associated with a warning. Alternatively or in addition, the alert may be provided on a mobile terminal coupled to the UAV or a controller of the UAV. For example, the mobile terminal may vibrate in response to the UAV encroaching upon or attempting to take off within the flight restricted region associated with a warning. In some instances, a message may be displayed on a display of the mobile terminal in response to the UAV encroaching upon or attempting to take off within the warning region. The message may comprise a generic warning regarding the fact that the UAV is attempting flight within a flight restricted region. In some instances, the warning may comprise additional information that may be useful to an operator of the UAV. For example, the warning may comprise information regarding the flight restricted region (e.g., it is near a city), information regarding flight conditions (e.g., wind speed, temperature, etc), or events (e.g., sporting events regularly take place within the region), amongst others. The warning may be provided when the UAV attempts to take flight (e.g., take off in the warning region). The warning may be provided when the UAV attempts to enter the warning region. The warning may be provided when the UAV inadvertently ends up within the warning region.

In some instances, the different flight restriction levels may be associated with compulsory prohibition of flight. For example, in FIG. 11 shows flight restricted region 1108 associated with flight restriction level 3 which is associated with compulsory flight prohibition. When a UAV encroaches upon flight restricted region 1108, entrance may be prohibited. When a UAV attempts to take off within flight restricted region 1108, taking off may be prohibited. If a UAV inadvertently enters or ends up within flight restricted region 1108 (e.g., through error, due to a temporary flight restriction, etc), the UAV may be forced to land, return to a region outside of flight restricted region 1108, or take a flight response measure substantially as described throughout. The flight restricted region associated with compulsory prohibition of flight may herein be referred to as a flight prohibited region.

In some instances, an alert may be provided when a UAV encroaches upon, attempts flight within, or inadvertently enters within flight restricted region 1108. The alert may be visual, tactile, auditory, and the like. The alert may be provided on a UAV (e.g., flashing red light). Alternatively or in addition, the alert may be provided on a mobile terminal coupled to the UAV or a controller of the UAV. For example, the mobile terminal may vibrate in response to the UAV encroaching upon or attempting to take off within the flight prohibited region. In some instances, a message may be displayed on a display of the mobile terminal in response to the UAV encroaching upon or attempting to take off within the flight prohibited region. The message may comprise a generic warning regarding the fact that flight is prohibited within the flight prohibited region. In some instances, the message may comprise additional information that may be useful to an operator of the UAV. For example, the warning may comprise information regarding the flight restricted region (e.g., near the White House) or information regarding why flight is prohibited within the region. The message may be provided when the UAV attempts to take flight (e.g., take off in the flight prohibited region). The message may be provided when the UAV attempts to enter the flight prohibited region. The message may be provided when the UAV inadvertently ends up within the flight prohibited region.

In some instances, the different flight restriction levels may be associated with a releasable flight restricted region. For example, in FIG. 11 shows flight restricted region 1110 associated with flight restriction level 2 which is associated with releasable (e.g., unlockable) flight prohibition. When a UAV encroaches upon flight restricted region 1110, entrance may be granted if the operator of the UAV or the UAV is authenticated. If the operator of the UAV or UAV is not authenticated, entrance may be prohibited. When a UAV attempts to take off within flight restricted region 110, taking off may be permitted if the operator of the UAV or the UAV is authenticated. If the operator of the UAV or the UAV is not authenticated, taking off may be prohibited. If a UAV inadvertently enters or ends up within flight restricted region 1110 (e.g., through error), or if time in which permission to operate the UAV within flight restricted region lapses, the UAV may be permitted to continue flight within the region if the operator of the UAV or the UAV is authenticated. If the operator of the UAV or the UAV is not authenticated, the UAV may be forced to land or fly to a region outside the flight restricted region 1110. The flight restricted region associated with a releasable flight prohibition may herein be referred to as a releasable region. The process for releasing flight restricted regions and authentication are further described elsewhere in the specification.

In some instances, the division of the various categories of flight restricted regions into discrete levels may provide a simple and intuitive way to manage and understand the plurality of different flight restriction regions. FIG. 12 illustrates three different flight restriction levels that may be associated with a given flight restricted region, in accordance with embodiments. For example, substantially as described herein. For example, the various categories of flight restricted regions may be divided into three discrete flight restriction levels. The different levels may be color coded and displayed (e.g., on an app on the mobile terminal, on a website, etc) for easy identification and management of flight restricted regions by an operator of the UAV. All flight restricted regions designated level 1 may be associated with a white color. All flight restricted regions designated level 1 may be associated with a white region 1202. The white color may signal that the flight restricted region is a warning region. When a UAV attempts to enter the white region, a warning or an alert may be given to a UAV user, substantially as described herein. When a UAV attempts to take off within the white region, a warning or an alert may be given to a UAV user. If a UAV is within an area that is subsequently designated a white region (e.g., temporary flight restricted region) such that the UAV ends up within the white region, a warning or an alert may be given to the UAV user. All flight restricted regions designated level 2 may be associated with a yellow color. All flight restricted regions designated level 2 may be associated with a yellow region 1204. When a UAV attempts to enter the yellow region, flight may be permitted if the UAV or the UAV user is authenticated, substantially as described herein (e.g., with credit card information). When a UAV attempts to take off within the yellow region, taking off may be permitted if the UAV or the UAV user is authenticated. If a UAV is within an area that is subsequently designated a yellow region (e.g., temporary flight restricted region) such that the UAV ends up within the yellow region, continued flight within the area (e.g., region) may be permitted if the UAV or the UAV user is authenticated. If the UAV or the UAV user is not authenticated, the UAV may be forced out of the yellow region (e.g., automatically). In some instances, if the UAV or the UAV user is not authenticated, the UAV may be forced to land or take a specific flight response measure, substantially as described throughout. The yellow color may signal that the flight restricted region is a releasable region. All flight restricted regions designated level 3 may be associated with a red color. All flight restricted regions designated level 3 may be associated with a red region 1206. The red color may signal that the flight restricted region is a flight prohibited region. When a UAV attempts to enter the red region, entrance may be prohibited altogether. When a UAV attempts to take off within the red region, taking off may be prohibited altogether. IF a UAV is within an area that is subsequently designated a red region (e.g., temporary flight restricted region) such that the UAV ends up within the red region, the UAV may be forced out of the red region (e.g., automatically fly out of the red region). In some instances, the UAV may be forced to land or take a specific flight response measure, substantially as described throughout. In some instances, the division of the plurality of different flight restricted regions into discrete flight restriction levels (e.g., 3 levels) including a level associated with a releasable region may provide for intuitive management of flight restricted regions while providing flexibility and autonomy to an operator of the UAV to use their own judgement in operating the UAV.

In some instances, certain flight restricted regions may not be associated with a flight restriction level (e.g., through error). In some instances, a flight restriction level of a flight restricted region may not be determined. In some instances, certain areas that used to be a flight-restricted region may become defunct. For example, a previously flight restricted region such as an airport may become defunct or unused. Flight restricted regions not associated with a flight restriction level or flight restricted regions that become defunct may herein be referred to as an error region. The error regions may be treated as releasable regions. For example, flight within the error region may be permitted if the operator of the UAV or the UAV is authenticated. In some instances, the error may be verified (e.g., verify whether the airport is no longer being used). In some instances, the error may be reported. For example, the lack of flight restriction level associated with the flight restricted region may be reported to the online database (e.g., online server) and further analyzed or evaluated. In some instances other information such as information regarding the UAV or an user of the UAV may be reported. In some instances, the error regions may be updated. The error regions may be updated based on the analysis or user report. In some instances, the error reporting and analysis may enable self-learning or correction of error concerning an identity of the user, UAV identity, or status of a flight restricted region. In some instances, the updated information may be applicable to all UAVs. In some instances, the updated information may be applicable only to the UAVs associated with the error experience.

In some instances, each of the flight restricted regions as described in FIG. 11 may comprise two or more flight restriction levels. For example, a flight restricted region may comprise two or more zones of differing flight restriction levels. FIG. 13 illustrates various flight restricted regions associated with two or more zones, in accordance with embodiments. The different zones may be regularly shaped or irregularly shaped, substantially as described herein. For example, flight restricted region 1301 is associated with zones 1302, 1304, and 1306. Each zone within the flight restricted region 1301 may be associated with different flight restriction levels. For example, a first zone 1302 may be associated with a first flight restriction level (e.g., a warning region). For example, a second zone 1304 may be associated with a second flight restriction level (e.g., a releasable region). For example, a third zone 1306 may be associated with a third flight restriction level (e.g., a flight prohibition region).

The different zones may comprise a same shape as the overall flight restricted region. The different zones may comprise a same shape as one or more flight restricted regions. An outer shape of the different zones may comprise a shape that substantially mirrors the overall shape of the flight restricted region. An outer shape of the different zones may comprise a shape that substantially mirrors the shape of one or more flight restricted regions. For example, flight restricted region 1301 having a circular shape may comprise different zones defined by concentric circles. For example, flight restricted region 1307 having an irregular shape may comprise different zones that have an outer shape that substantially mirrors the shape of the flight restricted region 1307.

In some instances, the different zones may comprise a different shape compared to the shape of the overall flight restricted region. In some instances, the different zones may comprise a different shape compared to the shape of one or more flight restricted regions. An outer shape of the different zones may comprise a shape that does not substantially mirror the overall shape of the flight restricted region. An outer shape of the different zones may comprise a shape that does not substantially mirror the shape of one or more flight restricted regions. In some instances, a regularly shaped flight restricted region may comprise an irregularly shaped zone. In some instances, an irregularly shaped flight restricted region may comprise a regularly shaped zone. For example, irregularly shaped flight restricted region 1309 comprises a first zone 1311 encompassing a second zone 1313. The first zone comprises an irregular shape that substantially mirrors the shape of the flight restricted region 1309 while the second zone comprises a circular shape that does not mirror the shape of the flight restricted region. For example, regularly shaped flight restriction region 1315 comprises a first zone 1317 encompassing a second zone 1319. The first zone comprises a regularly shape that substantially mirrors the shape of the flight restricted region 1315 while the second zone comprises an irregular shape that does not mirror the shape of the flight restricted region.

In some instances, the different zones may comprise a hierarchy such that only certain zones may be nested within (e.g., encompassed by) another. For example, a zone associated with a third flight restriction level (e.g., a flight prohibition region) may be encompassed by either a zone associated with a second flight restriction level (e.g., a releasable region) or a zone associated with a first flight restriction level (e.g., a warning region). For example, a zone associated with a second flight restriction level (e.g., a releasable region) may be encompassed by a zone associated with a first flight restriction level (e.g., a warning region) but not a zone associated with a third flight restriction level (e.g., a flight prohibition region). For example, a zone associated with a first flight restriction level (e.g., a warning region) may not be encompassed by another zone. In examples, zones can overlap completely. In examples, zones can overlap partially.

A UAV operating in a vicinity of the flight restriction region may encounter the different zones according to the hierarchy. For example, a UAV operating in a vicinity of flight restricted region 1309 may encroach upon a first zone 1311 associated with a second flight restriction level (e.g., a releasable region). Upon encroaching upon the first zone, the user may receive a notification, request permission to fly within the first zone, and receive or be denied permission (e.g., via authentication), substantially as described elsewhere. Subsequently, the UAV may encroach upon a second zone 1313 associated with a third flight restriction level (e.g., a flight prohibition region). The UAV may be prevented from entering the second zone. For example, a UAV operating in a vicinity of flight restricted region 1301 may encroach upon a first zone 1302 associated with a first flight restriction level (e.g., a warning region). The UAV may be allowed to fly within the first zone without hindrance. The UAV, or a mobile terminal or controller coupled to the UAV may receive an alert or a warning when entering the first zone. Subsequently, the UAV may encroach upon a second zone 1304 associated with a second flight restriction level (e.g., a releasable region). Upon encroaching upon the second zone, the user may receive a notification, request permission to fly within the second zone, and receive or be denied permission (e.g., via authentication), substantially as described elsewhere. If permission is granted, the UAV may encroach upon a third zone 1306 associated with a third flight restriction level (e.g., a flight prohibition region). The UAV may be prevented from entering the third zone.

FIG. 14 provides a method 1400 for assessing a flight restricted region applicable to an unmanned aerial vehicle (UAV), in accordance with embodiments. The flight restricted region may comprise three different zones, each associated with a different flight restriction level. In some instances, the flight restricted region may comprise a first zone associated with a warning region, a second zone associated with a releasable region, and the third zone associated with a flight prohibition region. In some instances, each of the first zone, second zone, and third zone may have the same or substantially similar shapes. In some instances, at least two of the first zone, second zone, or third zone has the same or substantially similar shapes. In some instances, each of the first zone, second zone, and third zone may have different shapes. In some instances, the centers of the first zone, second zone, and third zone may coincide with one another. In some instances, at least two of the centers of the first zone, second zone, and third zone may coincide with one another. In some instances, a given zone may entirely encompass another zone. For example, the third zone may be encompassed entirely by the second zone. For example, the second zone may be encompassed entirely by the first zone. In some instances, the third zone may be encompassed entirely by the second zone which is encompassed entirely by the first zone. Although method 300 is described with respect to assessing a flight restricted region having three different zones, it is to be understood that similar methods may exist for assessing a flight restricted region applicable to an unmanned aerial vehicle where the flight restricted region comprises two different zones, four different zones, five different zones, or more. In some instances, a first zone encompassing a second zone may comprise a flight response measure that is less severe than the flight response measure of the second zone. For example, a flight restricted region may comprise a first zone encompassing a second zone encompassing a third zone encompassing a fourth zone. The first zone may be associated with a flight response measure that sends a warning. The second zone may be associated with a flight response measure that sets a limit on an altitude of the UAV. The third zone may be associated with a flight response measure that sets a limit on an altitude and a speed of the UAV. The fourth zone may be associated with prohibiting flight of the UAV within the fourth zone.

In some instances, the method may comprise assessing a location of a first zone within the flight restricted region, assessing a location of a second zone within the first zone, and assessing a location of a third zone within the second zone. For example, described with respect to flight restriction region 1301 of FIG. 13, a location of zone 1302 within the flight restricted region may be assessed, a location of second zone 1304 within the first zone 1302 may be assessed, and a location of third zone 1306 within the second zone 1304 may be assessed. Each of the different zones may be associated with a different flight restriction level. For example, the first zone may be associated with a warning region, the second zone may be associated with a releasable region, and the third zone may be associated with a flight prohibition region. In some instances, the method may comprise assessing a location of the UAV. e.g., via a GPS. Each of the assessments referred to herein may occur on-board the UAV. In some instances, the assessment may occur at a remote controller or a mobile terminal coupled to the UAV. In some instances, the assessment may occur at one or more servers external to the UAV.

The assessment as referred to herein may assess or determine a location (e.g., of the region, of the zone, UAV, etc). In some instances, the assessment may comprise generating a location or flight restricted regions or zones. In sometimes, the assessment may comprise receiving information about a pre-existing flight restricted regions or zones, e.g., by downloading to a controller of the UAV.

The relative location of the UAV to each of the first, second, or third zones may be assessed. When the UAV is assessed to be within the first zone and outside the second zone, a warning may be received by the UAV or a user of the UAV. The user of the UAV may refer to an operator of the UAV or an owner of the UAV. The warning may be received by the user of the UAV via an alert on a remote controller of the UAV, substantially as previously described herein. When the UAV is assessed to be encroaching upon the third zone, within the third zone, or attempting flight (e.g., take off) within the third zone, flight of the UAV may be prohibited within the third zone. In some instances, the UAV may be forcibly or automatically removed from the third zone. In some instances, the third zone may not be released (e.g., may not be a releasable region) despite an authentication of the UAV or the user. When the UAV is assessed to be encroaching upon the second zone, within the second zone and outside the third zone, or attempting flight (e.g., take off) within the second zone, the UAV or the user of the UAV may be authenticated before flight is allowed.

The UAV may be permitted to fly within the second zone and outside the third zone only when the UAV or the user of the UAV is granted permission to fly within the second zone outside the third zone. For example, the user of the UAV may request for permission to fly within the second zone. The request may originate from the UAV, from a remote controller of the UAV, or from a server remote to the UAV. In some instances, the request may be provided through a web-based application or a mobile application. The request may comprise an indication of a proposed flight path of the UAV, an indication of a proposed flight area of the UAV, or an indication of a proposed timing of the UAV flight. The request may be made in real-time while the UAV is in flight toward the flight-restriction region (e.g., the second zone). The request may be made in advance prior to the UAV flying toward the flight-restriction region (e.g., the second zone).

After the request is made, the user may be authenticated. If the UAV or the user of the UAV is authenticated (e.g., verified), flight of the UAV may be permitted within the second zone and outside the third zone. Alternatively, flight of the UAV may be barred or prohibited if the UAV or the user of the UAV is not authenticated or verified. The granting or denying permission for the UAV to fly within the flight-restriction region may occur subsequent to authenticating an identity of the UAV or the user.

In some instances, the user may be granted or denied permission for the UAV to fly within the second zone, based on UAV identification information or user identification information. The UAV identification information may comprise a UAV identifier that uniquely identifies the UAV from other UAVs. For example, the UAV identification information may comprise information about a model, manufacturer, or performance characteristics of the UAV. In some instances, the UAV identification information may comprise a serial number of the UAV. The user identification information may comprise a user identifier that uniquely identifies the user from other users. For example, the user information may comprise information about a user's name, address, phone number. In some instances, the user information may comprise information about a level of training for UAV flight of the user, or certifications or licenses for UAV flight held by the user.

The user information may comprise financial information of the user. In some instances, the financial information of the user comprises a payment card for the user (e.g., information derived from a payment card of the user). The payment card may be a credit card, debit card, or gift card of the user. In some instances, the financial information for the user comprises bank account information of the user. In some instances, the financial information for the user comprises a pre-paid flight pass of the user.

In some instances, a system may be provided for assessing a flight restricted region applicable to an unmanned aerial vehicle (UAV). The system may be configured to perform the method 1400 of FIG. 14. The system may comprise one or more processors, individually or collectively configured to: assess a location of a first zone within the flight-restriction region; assess a location of a second zone within the first zone; and assess a location of a third zone within the second zone, wherein a warning is received by the UAV or a user of the UAV when the UAV is within the first zone and outside the second zone, wherein the UAV is permitted to fly within the second zone and outside the third zone only when the UAV or the user of the UAV is granted permission to fly within the second zone outside the third zone, and wherein the UAV is prohibited from flying within the third zone.

In some instances, a non-transitory computer readable medium may be provided for assessing a flight-restriction region applicable to an unmanned aerial vehicle (UAV). The non-transitory computer readable medium may be configured to perform the method 1400 of FIG. 14. The non-transitory computer readable medium may comprise code, logic, or instructions to: assess a location of a first zone within the flight-restriction region; assess a location of a second zone within the first zone, wherein the second zone; and assess a location of a third zone within the second zone, wherein the third zone, wherein a warning is received by the UAV or a user of the UAV when the UAV is within the first zone and outside the second zone, wherein the UAV is permitted to fly within the second zone and outside the third zone only when the UAV or the user of the UAV is granted permission to fly within the second zone outside the third zone, and wherein the UAV is prohibited from flying within the third zone.

In some instances, an unmanned aerial vehicle (UAV) may be provided. The UAV may be configured to perform the method 1400 of FIG. 14. The UAV may comprise: one or more propulsion units configured to effect flight of the UAV; and one or more processors that are, individually or collectively, configured to: receive a location of a first zone within the flight-restriction region; receive a location of a second zone within the first zone, wherein the second zone; and receive a location of a third zone within the second zone, wherein the third zone, wherein a warning is received by the UAV or a user of the UAV when the UAV is within the first zone and outside the second zone, wherein the UAV is permitted to fly within the second zone and outside the third zone only when the UAV or the user of the UAV is granted permission to fly within the second zone outside the third zone, and wherein the UAV is prohibited from flying within the third zone.

In some instances, the flight restricted regions as described in FIG. 11 or FIG. 13 may be further layered within one another. FIG. 15 illustrates flight restricted regions comprising two or more distinct zones that are not encompassed or surrounded by another, in accordance with embodiments. The two or more distinct zones may each be associated with a flight restriction level. The two or more distinct zones may be associated with the same flight restriction level. In some instances, the two or more distinct zones may be associated with different flight restriction levels. In some instances, at least one of the two or more distinct zones may be associated with a third flight restriction level (e.g., a flight prohibition region). In some instances, at least one of the two or more distinct zones may be associated with a second flight restriction level (e.g., a releasable region). In some instances, the flight restricted region may comprise two, three, four, five, six, seven, eight, nine, ten, or more distinct zones that are not encompassed or surrounded by another.

In some instances, the flight restricted region may comprise an outer zone associated with a flight restriction level encompassing two or more distinct zones that are not encompassed or surrounded by another. The outer zone may be associated with a different flight restriction level than the two or more distinct zones. The outer zone may be associated with a first flight restriction level (e.g., a warning region). The outer zone may be associated with a second flight restriction level (e.g., a releasable region). The two or more distinct zones may each be associated with a flight restriction level. The two or more distinct zones may be associated with the same flight restriction level. In some instances, the two or more distinct zones may be associated with different flight restriction levels. In some instances, at least one of the two or more distinct zones may be associated with a third flight restriction level (e.g., a flight prohibition region). In some instances, at least one of the two or more distinct zones may be associated with a second flight restriction level (e.g., a releasable region). In some instances, the flight restricted region may comprise two, three, four, five, six, seven, eight, nine, ten, or more distinct zones that are not encompassed or surrounded by another. In some instances, the flight restricted region may comprise an outer zone associated with a flight restriction level encompassing two or more distinct zones associated with the same flight restriction level.

For example, flight restricted region 1502 comprises a first zone (e.g., outer zone) 1504 associated with a second flight restriction level encompassing four distinct zones 1505, 1506, 1507, and 1508 that are not encompassed or surrounded by another. Each of the four distinct zones is associated with a third flight restriction level. For example, flight restricted region 1510 comprises a first zone (e.g., outer zone) 1511 associated with a first flight restriction level encompassing three distinct zones 1512, 1514, and 1516 that are not encompassed or surrounded by another. Zone 1512 is associated with a second flight restriction level while zone 1514 is associated with a third flight restriction level. Zone 1516 is associated with a second flight restriction level and encompasses (e.g., surrounds) another zone associated with a third flight restriction level.

In some instances, the different zones may comprise a hierarchy such that only certain zones may be nested within (e.g., encompassed by) another. For example, a zone associated with a third flight restriction level (e.g., a flight prohibition region) may be encompassed by either a zone associated with a second flight restriction level (e.g., a releasable region) or a zone associated with a first flight restriction level (e.g., a warning region). For example, a zone associated with a second flight restriction level (e.g., a releasable region) may be encompassed by a zone associated with a first flight restriction level (e.g., a warning region) but not a zone associated with a third flight restriction level (e.g., a flight prohibition region). For example, a zone associated with a first flight restriction level (e.g., a warning region) may not be encompassed by another zone. Accordingly, if an outer zone is associated with a second flight restriction level, the two or more distinct zones encompassed by the outer zone (e.g., but not with respect to one another) may be associated with a third flight restriction level. If an outer zone is associated with a first flight restriction level, the two or more distinct zones encompassed by the outer zone (e.g., but not with respect to one another) may be associated with a second flight restriction level or a third flight restriction level.

A UAV operating in a vicinity of the flight restriction region may encounter the different zones according to the hierarchy. For example, a UAV operating in a vicinity of flight restricted region 1502 may encroach upon an outer zone 1504 associated with a second flight restriction level (e.g., a releasable region). Upon encroaching upon the outer zone, the user (e.g., operator of the UAV) may receive a notification, request permission to fly within the first zone, and receive or be denied permission (e.g., via authentication), substantially as described elsewhere. Subsequently, the UAV may encroach upon the plurality of distinct zones. Each of the distinct zones may be associated with the same or different flight restriction levels. Each of the distinct zones may be associated with a different flight restriction level compared to the outer zone. In FIG. 15, each of the distinct zones 1505, 1506, 1507, and 1508 are associated with a third flight restriction level (e.g., a flight prohibition region). The UAV may be prevented from entering any of the distinct zones.

For example, a UAV operating in a vicinity of flight restricted region 1510 may encroach upon an outer zone 1511 associated with a first flight restriction level (e.g., a warning region). The UAV may be allowed to fly within the outer zone without hindrance. The UAV, or a mobile terminal or controller coupled to the UAV may receive an alert or a warning when entering the outer zone. Subsequently, the UAV may encroach upon a plurality of distinct zones encompassed within the outer zone. Each of the different distinct zones may be associated with the same or different flight restriction levels. Each of the distinct zones may be associated with a different flight restriction level compared to the outer zone. In FIG. 15, the zone 1512 is associated with a third flight restriction level while zones 1514, and 1516 are associated with a second flight restriction level. The UAV may encroach upon zone 1512 associated with a third flight restriction level (e.g., a flight prohibition region) but may be prevented from entering the zone. The UAV may encroach upon the releasable regions (e.g., zones 1514 and 1516). Upon encroaching upon the releasable regions, the user may receive a notification, request permission to fly within the first zone, and receive or be denied permission (e.g., via authentication), substantially as described elsewhere. If granted permission to fly within zone 1516, the UAV may still be prevented from flying within zone 1518.

As previously described herein, the flight restricted regions may be stored on-board the UAV or may be accessed from the database off-board the UAV. For example, if the Internet or another network is accessible, the UAV may obtain information regarding flight restriction regions from a server online. In some instances, relatively simple flight restricted regions may be stored on-board the UAV while more complicated (e.g., irregularly shaped) flight restricted regions or zones may be stored, processed, and analyzed from a data source off-board the UAV. The irregular shape may require complex processing capabilities and may impose high requirements on data storage (e.g., on the UAV) for the UAV to be able to determine the irregularly shaped flight prohibited region and prevent entrance to the flight prohibited region. For example, grid maps may be used by UAV air traffic control system in managing flight restricted regions having irregular shapes. The grid maps as described herein may impose high requirements on data storage and processing capabilities. Utilizing grid maps for assessment of flight restricted regions may require servers which are not sensitive to computing resources. Utilizing grid maps for assessment of flight restricted regions may limit the ability of aircrafts (e.g., UAVs) to process the flight restricted regions. Accordingly, the aforementioned scheme (e.g., division of processing of flight restricted regions) may enable a more efficient utilization of processing power and save battery, amongst others.

FIG. 16 illustrates a releasable flight restriction region 1602 that is released, in accordance with embodiments. A UAV 1604 may fly from point A to point B, encroaching upon the flight restricted region. The flight restricted region may prescribe, or limit, flight of the UAV. For example, when the UAV approaches the flight restricted region, the UAV may be prevented from entering the region. In some instances, the flight restricted region may comprise a releasable flight restricted region, substantially as described herein. In approaching the releasable region, a user of the UAV may be prompted (e.g., on a handheld or mobile device) that the UAV is reaching a flight restricted region. In some instances, the user may further receive a message advising compliance with the law. In some instances, the user may be asked whether continued flight into the region is desired. The user may further request flight within the releasable region, get authenticated and granted permission (e.g., granted authorization) to fly within the releasable region, substantially as described elsewhere. When authorization is granted, the UAV may be permitted access to the whole releasable region 1602. If the releasable region 1602 encompassed a zone 1606 associated with a flight prohibited region (e.g., that cannot be released), the UAV may be prevented from entering the zone 1606. The flight prohibited region may comprise an irregular shape. The irregular shape may require complex processing capabilities and may impose high requirements on data storage (e.g., on the UAV) for the UAV to be able to determine the irregularly shaped flight prohibited region and prevent entrance to the flight prohibited region.

The released region may be associated with a release time (time in which flight within the releasable region is granted. The release time may be temporary or indefinite. The release time may be equal to or more than about 5 minutes, 10 minutes, 20 minutes, 30 minutes, 1 hour, 3 hours, 6 hours, 12 hours, 24 hours, 2 days, 3 days, 7 days, 2 weeks, 4 weeks, or 3 months. The release time may be equal to or less than about 5 minutes, 10 minutes, 20 minutes, 30 minutes, 1 hour, 3 hours, 6 hours, 12 hours, 24 hours, 2 days, 3 days, 7 days, 2 weeks, 4 weeks, or 3 months. In some instances, the release time may begin when the UAV enters the releasable region and may last for a certain length. Alternatively or in addition, the release time may be from a specified starting time to an ending time (e.g., unrelated to the time of UAV entry within the actual flight restricted region). For example, access to the releasable region may be granted in advance to UAV flight within the releasable region. For example, the release time may be from 2:00 pm to 3:00 pm on Mar. 1, 2020. The period of time may be arbitrary and any period of time may be designated. The period of time may be recurring. For example, the period of time may be every 2nd Saturday of the month, Tuesday of every week, and the like. The release time may last or not last in accordance with a schedule which may include irregular time periods. Data regarding the schedule may be pulled from a calendar (e.g., personal or global), the internet, the news, etc.

FIG. 17 illustrates an actual flight restriction region 1702 associated with a desired flight restriction region 1704, in accordance with embodiments. The desired flight restricted region may comprise a complicated, or irregular shape. The desired flight restricted region may require high processing and data storage capabilities, which may be absent or burdensome for a UAV. For example, grid maps may be used by some UAV air traffic control system in managing flight restricted regions having irregular shapes. The desired flight restricted regions may represent prescribed flight restricted region, e.g., as stipulated by laws and regulations. In some instances, a flight restricted region having a simple or regular shape may be imposed (e.g., for the UAV to follow). The region 1702 may be a flight restricted region as determined by a flight controller of the UAV. The actual flight restricted region 1702 may be sufficient to encompass the desired flight restricted region 1704. The actual flight restricted region may not require high processing and data storage capabilities and may be appropriate for processing by a UAV. The actual flight restricted region may be a releasable region, substantially as described herein.

In some instances, a UAV 1706 may fly from a point A (e.g., outside the flight restricted region 1702) to a point B that neighbors the flight restricted region. Further inward flight of the UAV may be restricted. In approaching the actual flight restricted region, a user of the UAV may be prompted (e.g., on a handheld or mobile device) that the UAV is reaching a flight restricted region. In some instances, the user may further receive a message advising compliance with the law. In some instances, the user may be asked whether continued flight into the region is desired. The user may request flight within the actual flight restricted region, get authenticated, and granted permission (e.g., granted authorization) to fly within the releasable region, substantially as described elsewhere. When authorization is granted, the UAV may be permitted to continue flight within the flight restricted region. In some instances, access to only parts of the actual flight restricted region may be granted.

For example, while the UAV continues to fly inward within the flight restricted region 1702, a mobile device (e.g., handheld device) may send out a request to the server (e.g., online database, cloud server, etc) to acquire a temporary released region 1708. In some instances, while the UAV continues to fly inward within the flight restricted region, the UAV or a handheld device (e.g., mobile device) coupled to the UAV may record flight data and send the flight data to the server. In some instances, the flight data may comprise state information regarding a UAV. In some instances, state information of a flight of an aircraft (e.g., UAV) may be acquired in a real time manner. In some instances, the state information may comprise a coordinate, velocity, altitude, or time of the UAV. In some instances, the state information may comprise operating data of the controller or flight controlling system of the UAV. The transmitted data may be stored on the server. The transmitted data may be further associated or linked with the UAV or UAV owner information (e.g., financial information, ID information) substantially as described herein.

The UAV may be allowed flight within the temporary released region. The UAV may not be allowed flight within the actual flight restricted region outside of the temporary released region. In some instances, the temporary released region may comprise a regular or simple shape. The temporary released region may be determined by resources off board the UAV. For example, the temporary released region may be determined by the server (e.g., cloud server). Subsequently, the UAV may acquire updated flight restrictions (e.g., including the temporary released region) from the server via a link. In some instances, the temporary released region may be determined by resources on-board the UAV. The temporary released region may be determined based on at least some of the flight data described herein. For example, the temporary released region may depend at least part on the coordinating of the UAV or a velocity of the UAV. The temporarily released region may be a subset of the flight restriction region (e.g., smaller than the flight restriction region). The temporary released region may be determined such that it does not encroach upon the desired flight restriction region 1704. In some instances, the temporarily released region may be associated with a set of flight response measures Operation of a UAV may be governed or affected by flight response measures. A set of flight response measures may include one or more flight response measures. In some embodiments, a flight response measure may include preventing a UAV from entering the flight restriction region altogether. A UAV that ended up in the flight restriction region may be forced to land or forced to fly away from the flight restriction region. In some embodiments, a flight response measure may include allowing the UAV to remain in the flight restriction region, but imposing certain restrictions on the operation of the UAV within the flight restriction region. The UAV may be forced to remain within the flight restriction region. Various types and examples of flight response measures are described herein.

Flight response measures may govern physical disposition of the UAV. For instance, the flight response measures may govern flight of the UAV, take-off of the UAV, and/or landing of the UAV. In some examples, the flight response measures may prevent the UAV from flying within a flight restriction region. In some examples, the flight response measures may permit only a certain range of orientations of the UAV, or may not permit certain range of orientations of the UAV. The range of orientations of the UAV may be with respect to one, two, or three axes. The axes may be orthogonal axes, such as yaw, pitch, or roll axes. The physical disposition of the UAV may be governed with respect to a flight restriction region.

The flight response measures may govern movement of the UAV. For instance, the flight response measures may govern translational speed of the UAV, translational acceleration of the UAV, angular speed of the UAV (e.g., about one, two, or three axes), or angular acceleration of the UAV (e.g., about one, two, or three axes). The flight response measures may set a maximum limit for the UAV translational speed, UAV translational acceleration, UAV angular speed, or UAV angular acceleration. Thus, the set of flight response measures may comprise limiting flight speed and/or flight acceleration of the UAV. The flight response measures may set a minimum threshold for UAV translational speed, UAV translational acceleration, UAV angular speed, or UAV angular acceleration. The flight response measures may require that the UAV move between the minimum threshold and the maximum limit. Alternatively, the flight response measures may prevent the UAV from moving within one or more translational speed ranges, translational acceleration ranges, angular speed ranges, or angular acceleration ranges. In one example, a UAV may not be permitted to hover within a designated airspace. The UAV may be required to fly above a minimum translational speed of 0 mph. In another example, a UAV may not be permitted to fly too quickly (e.g., fly beneath a maximum speed limit of 40 mph). The movement of the UAV may be governed with respect to a flight restriction region.

The flight response measures may govern take-off and/or landing procedures for the UAV. For instance, the UAV may be permitted to fly, but not land in a flight restriction region. In another example, a UAV may only be able to take-off in a certain manner or at a certain speed from a flight restriction region. In another example, manual take-off or landing may not be permitted, and an autonomous landing or takeoff process must be used within a flight restriction region. The flight response measures may govern whether take-off is allowed, whether landing is allowed, any rules that the take-off or landing must comply with (e.g., speed, acceleration, direction, orientation, flight modes). In some embodiments, only automated sequences for taking off and/or landing are permitted without permitting manual landing or take-off, or vice versa. The take-off and/or landing procedures of the UAV may be governed with respect to a flight restriction region.

In some instances, the flight response measures may govern operation of a payload of a UAV. The payload of the UAV may be a sensor, emitter, or any other object that may be carried by the UAV. The payload may be powered on or off. The payload may be rendered operational (e.g., powered on) or inoperational (e.g., powered off). Flight response measures may comprise conditions under which the UAV is not permitted to operate a payload. For example, in a flight restriction region, the flight response measures may require that the payload be powered off. The payload may emit a signal and the flight response measures may govern the nature of the signal, a magnitude of the signal, a range of the signal, a direction of signal, or any mode of operation. For example, if the payload is a light source, the flight response measures may require that the light not be brighter than a threshold intensity within a flight restriction region. In another example, if the payload is a speaker for projecting sound, the flight response measures may require that the speaker not transmit any noise outside a flight restriction region. The payload may be a sensor that collects information, and the flight response measures may govern a mode in which the information is collected, a mode about how information is pre-processed or processed, a resolution at which the information is collected, a frequency or sampling rate at which the information is collected, a range from which the information is collected, or a direction from which the information is collected. For example, the payload may be an image capturing device. The image capturing device may be capable of capturing static images (e.g., still images) or dynamic images (e.g., video). The flight response measures may govern a zoom of the image capturing device, a resolution of images captured by the image capturing device, a sampling rate of the image capturing device, a shutter speed of the image capturing device, an aperture of the image capturing device, whether a flash is used, a mode (e.g., lighting mode, color mode, still vs. video mode) of the image capturing device, or a focus of the image capturing device. In one example, a camera may not be permitted to capture images in over a flight restriction region. In another example, a camera may be permitted to capture images, but not capture sound over a flight restriction region. In another example, a camera may only be permitted to capture high-resolution photos within a flight restriction region and only be permitted to take low-resolution photos outside the flight restriction region. In another example, the payload may be an audio capturing device. The flight response measures may govern whether the audio capture device is permitted to be powered on, sensitivity of the audio capture device, decibel ranges the audio capture device is able to pick up, directionality of the audio capture device (e.g., for a parabolic microphone), or any other quality of the audio capture device. In one example, the audio capture device may or may not be permitted to capture sound within a flight restriction region. In another example, the audio capture device may only be permitted to capture sounds within a particular frequency range while within a flight restriction region. The operation of the payload may be governed with respect to a flight restriction region.

The flight response measures may govern whether a payload can transmit or store information. For instance, if the payload is an image capturing device, the flight response measures may govern whether images (still or dynamic) may be recorded. The flight response measures may govern whether the images can be recorded into an on-board memory of the image capture device or a memory on-board the UAV. For instance, an image capturing device may be permitted to be powered on and showing captured images on a local display, but may not be permitted to record any of the images. The flight response measures may govern whether images can be streamed off-board the image capture device or off-board the UAV. For instance, flight response measures may dictate that an image capture device on-board the UAV may be permitted to stream video down to a terminal off-board the UAV while the UAV is within a flight restriction region, and may not be able to stream video down when outside a flight restriction region. Similarly, if the payload is an audio capture device, the flight response measures may govern whether sounds may be recorded into an on-board memory of the audio capture device or a memory on-board the UAV. For instance, the audio capture device may be permitted to be powered on and play back captured sound on a local speaker, but may not be permitted to record any of the sounds. The flight response measures may govern whether the images can be streamed off-board the audio capture device, or any other payload. The storage and/or transmission of collected data may be governed with respect to a flight restriction region.

In some instances, the payload may be an item carried by the UAV, and the flight response measures may dictate the characteristics of the payload. Examples of characteristics of the payload may include dimensions of the payload (e.g., height, width, length, diameter, diagonal), weight of the payload, stability of the payload, materials of the payload, fragility of the payload, or type of payload. For instance, the flight response measures may dictate that the UAV may carry the package of no more than 3 lbs. while flying over a flight restriction region. In another example, the flight response measures may permit the UAV to carry a package having a dimension greater than 1 foot only within a flight restriction region. Another flight response measures may permit a UAV to only fly for 5 minutes when carrying a package of 1 lb. or greater within a flight restriction region, and may cause the UAV to automatically land if the UAV has not left the flight restriction region within the 5 minutes. Restrictions may be provided on the type of payloads themselves. For example, unstable or potentially explosive payloads may not be carried by the UAV. Flight restrictions may prevent the carrying of fragile objects by the UAV. The characteristics of the payload may be regulated with respect to a flight restriction region.

Flight response measures may also dictate activities that may be performed with respect to the item carried by the UAV. For instance, flight response measures may dictate whether an item may be dropped off within a flight restriction region. Similarly flight response measures may dictate whether an item may be picked up from a flight restriction region. A UAV may have a robotic arm or other mechanical structure that may aid in dropping off or picking up an item. The UAV may have a carrying compartment that may permit the UAV to carry the item. Activities relating to the payload may be regulated with respect to a flight restriction region.

Positioning of a payload relative to the UAV may be governed by flight response measures. The position of a payload relative to the UAV may be adjustable. Translational position of the payload relative to the UAV and/or orientation of the payload relative to the UAV may be adjustable. Translational position may be adjustable with respect to one, two, or three orthogonal axes. Orientation of the payload may be adjustable with respect to one, two, or three orthogonal axes (e.g., pitch axis, yaw axis, or roll axis). In some embodiments, the payload may be connected to the UAV with a carrier that may control positioning of the payload relative to the UAV. The carrier may support the weight of the payload on the UAV. The carrier may optionally be a gimbaled platform that may permit rotation of the payload with respect to one, two, or three axes relative to the UAV. One or more frame components and one or more actuators may be provided that may effect adjustment of the positioning of the payload. The flight response measures may control the carrier or any other mechanism that adjusts the position of the payload relative to the UAV. In one example, flight response measures may not permit a payload to be oriented facing downward while flying over a flight restriction region. For instance, the region may have sensitive data that it may not be desirable for the payload to capture. In another example, the flight response measures may cause the payload to move translationally downward relative to the UAV while within a flight restriction region, which may permit a wider field of view, such as panoramic image capture. The positioning of the payload may be governed with respect to a flight restriction region.

The flight response measures may govern the operation of one or more sensors of an unmanned aerial vehicle. For instance, the flight response measures may govern whether the sensors are turned on or off (or which sensors are turned on or off), a mode in which information is collected, a mode about how information is pre-processed or processed, a resolution at which the information is collected, a frequency or sampling rate at which the information is collected, a range from which the information is collected, or a direction from which the information is collected. The flight response measures may govern whether the sensors can store or transmit information. In one example, a GPS sensor may be turned off while a UAV is within a flight restriction region while vision sensors or inertial sensors are turned on for navigation purposes. In another example, audio sensors of the UAV may be turned off while flying over a flight restriction region. The operation of the one or more sensors may be governed with respect to a flight restriction region.

Communications of the UAV may be controlled in accordance with one or more flight response measures. For instance, the UAV may be capable of remote communication with one or more remote devices. Examples of remote devices may include a remote controller that may control operation of the UAV, payload, carrier, sensors, or any other component of the UAV, a display terminal that may show information received by the UAV, a database that may collect information from the UAV, or any other external device. The remote communications may be wireless communications. The communications may be direct communications between the UAV and the remote device. Examples of direct communications may include WiFi, WiMax, radiofrequency, infrared, visual, or other types of direct communications. The communications may be indirect communications between the UAV and the remote device which may include one or more intermediary device or network. Examples of indirect communications may include 3G, 4G, LTE, satellite, or other types of communications. The flight response measures may dictate whether remote communications are turned on or off. Flight response measures may comprise conditions under which the UAV is not permitted to communicate under one or more wireless conditions. For example, communications may not be permitted while the UAV is within a flight restriction region. The flight response measures may dictate a communication mode that may or may not be permitted. For instance, the flight response measures may dictate whether a direct communication mode is permitted, whether an indirect communication mode is permitted, or whether a preference is established between the direct communication mode and the indirect communication mode. In one example, only direct communications are permitted within a flight restriction. In another example, over a flight restriction region, a preference for direct communications may be established as long as it is available, otherwise indirect communications may be used, while outside a flight restriction region, no communications are permitted. The flight response measures may dictate characteristics of the communications, such as bandwidth used, frequencies used, protocols used, encryptions used, devices that aid in the communication that may be used. For example, the flight response measures may only permit existing networks to be utilized for communications when the UAV is within a predetermined volume. The flight response measures may govern communications of the UAV with respect to a flight restriction region.

Other functions of the UAV, such as navigation, power usage and monitoring, may be governed in accordance with flight response measures. Examples of power usage and monitoring may include the amount of flight time remaining based on the battery and power usage information, the state of charge of the battery, or the remaining amount of estimated distance based on the battery and power usage information. For instance, the flight response measures may require that a UAV in operation within a flight restriction region have a remaining battery life of at least 3 hours. In another example, the flight response measures may require that the UAV be at least at a 50% state of charge when outside a flight restriction region. Such additional functions may be governed by flight response measures with respect to a flight restriction region.

The temporarily released region may be substantially as described with respect to releasable regions. For example, the temporarily released region may be associated with a release time (e.g., time in which flight within the released region is granted). The release time may be temporary or indefinite. In some instances, the release time may be equal to or more than about 5 minutes, 10 minutes, 20 minutes, 30 minutes, 1 hour, 3 hours, 6 hours, 12 hours, 24 hours, 2 days, 3 days, 7 days, 2 weeks, 4 weeks, or 3 months. The release time may be equal to or less than about 5 minutes, 10 minutes, 20 minutes, 30 minutes, 1 hour, 3 hours, 6 hours, 12 hours, 24 hours, 2 days, 3 days, 7 days, 2 weeks, 4 weeks, or 3 months. In some instances, the release time may begin when the UAV enters the actual flight restricted region and may last for a certain length. Alternatively or in addition, the release time may be from a specified starting time to an ending time (e.g., unrelated to the time of UAV entry within the actual flight restricted region), substantially as described elsewhere. Outside of the release time the temporarily released region may be cancelled or be null. The UAV may again request for operation within the actual flight restricted region at the expiration of the release time and begin anew the process described here.

FIG. 18 illustrates the process 1800 of releasing a flight restricted region, in accordance with embodiments. The process of releasing a flight restricted region may involve the interaction between a flight controller 1801, a handheld device 1803, and server (e.g., cloud server) 1805. In some instances, when the UAV (e.g., controlled by a user) reaches a boundary of a flight restricted region, a flight controller may notify a handheld device (e.g., via an application used on the handheld device) that the UAV is reaching a boundary of a flight restricted region. In some instances, the handheld device may be further configured to prompt the user of any additional information regarding the flight restricted region. For example, the handheld device, through an application used on the handheld device, may prompt the user of related legal risks relevant in entering the flight restricted region. In some instances, the user may insist on continuing the flight of the UAV within the flight restricted region. If the user confirms and continues to operate the UAV inward to the flight restricted region, the user's account may be checked for authentication, substantially as described herein. If the user's account is authenticated, user authentication information may be requested from the server (e.g., cloud server). In some instances, the result of the authentication may be synchronized to the application on the handheld device. If the user's account is authenticated, the application may call an application program interface for requesting the temporary released region data from the server. In return for the request, the server may return a temporarily released region information to the handheld device. Information regarding the temporary released region may be calculated on the server. Information regarding the temporary released region may be calculated based on flight data, e.g., UAV current coordinates. In some instances, a license file may be generated from the temporarily released region information and transmitted to the flight controller via the handheld device. Afterwards, the UAV may switch to the new flight restriction rule if the license file is authenticated and the user may operate the aircraft within the temporarily released region.

In some instances, a third party may be involved in generation of temporary released regions. The third party may be a human being, a program, entity, or a device. For example, the third party may be a party involved with air traffic control systems such as an air traffic control tower. FIG. 19 illustrates generating temporary released regions 1908 with aid of a control Lower, in accordance with embodiments. The desired flight restricted region 1904 may comprise a complicated or irregular shape. The desired flight restricted region may require high processing and data storage capabilities, which may be absent or burdensome for a UAV. For example, grid maps may be used by some UAV air traffic control system in managing flight restricted regions having irregular shapes. The desired flight restricted regions may represent prescribed flight restricted region, e.g., as stipulated by laws and regulations. The desired flight restricted region may comprise a desired flight restricted region as prescribed by a third party, e.g., by the control tower 1910. In some instances, a flight restricted region having a simple or regular shape may be imposed (e.g., for the UAV to follow). The region 1902 may be a flight restricted region as determined by a flight controller of the UAV. The actual flight restricted region 1902 may be sufficient to encompass the desired flight restricted region 1904. The actual flight restricted region may not require high processing and data storage capabilities and may be appropriate for processing by a UAV. The actual flight restricted region may be a releasable region, substantially as described herein.

In some instances, a UAV 1906 may fly from a point A (e.g., outside the flight restricted region 1902) to a point B that neighbors the actual flight restricted region. Further inward flight of the UAV may be restricted. In approaching the actual flight restricted region, a user of the UAV may be prompted (e.g., on a handheld or mobile device) that the UAV is reaching a flight restricted region. In some instances, the user may further receive a message advising compliance with the law. In some instances, the user may be asked whether continued flight into the region is desired.

The user may request flight within the actual flight restricted region. In some instances, the UAV may broadcast an entry request for flight within the actual flight restricted region. The entry request may be directed to the control tower 1910. The entry request may be directed to the third party, e.g., a party associated with the desired flight restricted region. In some instances, the control tower may send a handshake request to the UAV and authenticate with the UAV. The communication between the UAV and the control tower may be in a bidirectional manner. In some instances, the communication between the UAV and the control tower may be in a unidirectional manner. In some instances, after the handshake, the UAV (e.g., flight controller of the UAV) may transmit its flight data to the control tower. In some instances, the UAV may transmit its account information to the control tower. The transmission may be in real time. In some instances, the flight or account data may comprise state information regarding a UAV. In some instances, state information of a flight of an aircraft (e.g., UAV) may be acquired in a real time manner. In some instances, the state information may comprise a coordinate, velocity, altitude, or time of the UAV. In some instances, the state information may comprise operating data of the controller or flight controlling system of the UAV. In some instances, the transmitted data may be further comprise or be associated with the UAV or UAV owner information (e.g., financial information, ID information) substantially as described herein.

In return, the control tower may poll or analyze the data. In some instances, the control tower may authentication state of the UAV after receiving the account information of the UAV. In some instances, if no information is found to indicate that it is not suitable to allow the UAV to enter the flight restricted region 1902, a temporarily released region information may be determined. In some instances, information must be found to indicate that it is suitable to allow the UAV to enter the flight restricted region 1902. For example, indication regarding the identity or employment of the user may be required. For example, the user may be required to be an employee at an airport. In some instances, the user may be required to be a government agent working at an agency such as the Federal Aviation Administration (FAA), Federal Trade Commission (FTC), Federal Communications Commission (FCC), National Telecommunications and Information Administration (NTIA), Department of Transportation (DoT), or Department of Defense (DoD).

The temporarily released region information may be determined based on the state information, e.g., UAV's coordinate. In some instances, the third party (e.g., the control tower) may determine the temporarily released region or any parameters associated with the temporarily released region (e.g., time). The temporarily released region information may be sent to the UAV. In some instances, a license file may be generated from the temporarily released region information. The license file may be generated on the handheld device (e.g., mobile device). The license file may be transmitted to the flight controller of the UAV. Afterwards, the UAV may switch to the new flight restriction rule if the license file is authenticated.

The UAV may be allowed flight within the temporary released region. The UAV may not be allowed flight within the actual flight restricted region outside of the temporary released region. In some instances, the temporary released region may comprise a regular or simple shape. The temporary released region may be determined by a third party. For example, the temporary released region may be determined by the control tower. Alternatively or in addition, the temporarily released region may be determined at least part by one or more resources off board the UAV, e.g., the server. Subsequently, the UAV may acquire updated flight restrictions (e.g., including the temporary released region) from the server via a link. In some instances, the temporary released region may be determined by resources on-board the UAV. The temporary released region may be determined based on at least some of the flight data described herein. For example, the temporary released region may depend at least part on the coordinate of the UAV or a velocity of the UAV. The temporarily released region may be a subset of the flight restriction region (e.g., smaller than the flight restriction region). The temporary released region may be determined such that it does not encroach upon the desired flight restriction region 1904. In some instances, the temporarily released region may be associated with a set of flight response measures, substantially as described herein.

The temporarily released region may be substantially as described with respect to releasable regions. For example, the temporarily released region may be associated with a release Lime (time in which flight within the released region is granted). In some instances, the third party (e.g., the control tower) may determine parameters associated with the temporarily released region. The release time may be temporary or indefinite. The release time may be equal to or more than about 5 minutes, 10 minutes, 20 minutes, 30 minutes, 1 hour, 3 hours, 6 hours, 12 hours, 24 hours, 2 days, 3 days, 7 days, 2 weeks, 4 weeks, or 3 months. The release time may be equal to or less than about 5 minutes, 10 minutes, 20 minutes, 30 minutes, 1 hour, 3 hours, 6 hours, 12 hours, 24 hours, 2 days, 3 days, 7 days, 2 weeks, 4 weeks, or 3 months. In some instances, the release time may begin when the UAV enters the actual flight restricted region and may last for a certain length. Alternatively or in addition, the release time may be from a specified starting time to an ending time (e.g., unrelated to the time of UAV entry within the actual flight restricted region), substantially as described elsewhere. Outside of the release time the temporarily released region may be cancelled or be null. The UAV may again request for operation within the actual flight restricted region at the expiration of the release time and begin anew the process described here.

FIG. 20 illustrates a method 2000 for regulating flight of an unmanned aerial vehicle (UAV), in accordance with embodiments. In some instances, the method comprises obtaining information about a first flight-restriction region that imposes a first flight response measure on the UAV when the UAV is within the first flight-restriction region; detecting that the UAV is within the first flight-restriction region; and obtaining, subsequent to detecting that the UAV is within the first flight-restriction region, information about a second flight-restriction region within the first flight-restriction region, wherein the second flight-restriction region imposes a second flight response measure on the UAV when the UAV is within the second flight-restriction region, wherein the second flight response measure is different from the first flight response measure.

In some instances, the information about the first flight-restriction region is obtained at a local memory on-board the UAV. In some instances, the information about the second flight-restriction region is obtained at a local memory on-board the UAV subsequent to detecting that the UAV is within the first flight-restriction region. In some instances, the information about the second flight-restriction region is not present at the local memory on-board the UAV prior to detecting that the UAV is within the first flight-restriction region. The information about the second flight-restriction region is provided to the UAV only when the UAV is within the surrounding first flight-restriction region. In some instances, the information about the second flight-restriction region is provided to the UAV only when the UAV within a particular distance of the second flight-restriction region, or when the UAV is within an estimated threshold period of Lime away from the second flight-restriction region. This may apply to any number of layers of flight-restriction regions. For instance, a third flight-restriction region may be within a second flight-restriction region. Information about the third flight-restriction region may be obtained at a local memory on-board the UAV subsequent to detecting that the UAV is within the second flight-restriction region. Thus, the UAV local memory may be updated on an as-needed basis, to minimize unnecessary processing and/or memory consumption.

In some instances, the first flight-restriction region has a more regular shape than the second flight-restriction region. In some instances, the first flight-restriction region has a circular shape. In some instances, the first flight-restriction region has a regular polygon shape. In some instances, the second flight-restriction region has a shape with a plurality of sides. In some instances, the second flight-restriction region has an irregular polygon shape. In some instances, the information about the first flight-restriction region takes up less memory space than the information about the second flight-restriction region. In some instances, the information about the first flight-restriction region is a location of the first flight-restriction region. In some instances, the information about the second flight-restriction region is a location of the second flight-restriction region. In some instances, the information about the first flight-restriction region is information about the first flight response measure. In some instances, the information about the second flight-restriction region is information about the second flight response measure. In some instances, the first flight response measure is a warning that is provided to the UAV or a user of the UAV. In some instances, the second flight response measure is permitting the UAV to enter the second flight-restriction region only when granted permission to enter. In some instances, permission is granted or denied in response to a request for the UAV to fly within the second flight-restriction region. In some instances, permission is granted or denied subsequent to authenticating an identity of the UAV or the user. In some instances, the first flight response measure is permitting the UAV to enter the first flight-restriction region only when granted permission to enter. In some instances, permission is granted or denied in response to a request for the UAV to fly within the first flight-restriction region. In some instances, permission is granted or denied subsequent to authenticating an identity of the UAV or the user. In some instances, the second flight response measure is not permitting the UAV to enter the second flight-restriction region. In some instances, the user of the UAV is an operator or owner of the UAV.

In some instances, a system for a system for regulating flight of an unmanned aerial vehicle (UAV) is provided. The system may be configured to perform the method 2000 of FIG. 20. The system may comprise one or more processors, individually or collectively configured to: obtain information about a first flight-restriction region that imposes a first flight response measure on the UAV when the UAV is within the first flight-restriction region; obtain information that the UAV is within the first flight-restriction region; and obtain, subsequent to obtaining information that the UAV is within the first flight-restriction region, information about a second flight-restriction region within the first flight-restriction region, wherein the second flight-restriction region imposes a second flight response measure on the UAV when the UAV is within the second flight-restriction region, wherein the second flight response measure is different from the first flight response measure.

In some instances, a non-transitory computer readable medium for regulating flight of an unmanned aerial vehicle (UAV) may be provided. The non-transitory computer readable medium may be configured to perform the method 2000 of FIG. 20. The non-transitory computer readable medium may comprise code, logic, or instructions to: obtain information about a first flight-restriction region that imposes a first flight response measure on the UAV when the UAV is within the first flight-restriction region; obtain information that the UAV is within the first flight-restriction region; and obtain, subsequent to obtaining information that the UAV is within the first flight-restriction region, information about a second flight-restriction region within the first flight-restriction region, wherein the second flight-restriction region imposes a second flight response measure on the UAV when the UAV is within the second flight-restriction region, wherein the second flight response measure is different from the first flight response measure.

In some instances, an unmanned aerial vehicle (UAV) may be provided. The UAV may be configured to perform the method 2000 of FIG. 20. The UAV may comprise: one or more propulsion units configured to effect flight of the UAV; and one or more processors that are, individually or collectively, configured to: obtain information about a first flight-restriction region that imposes a first flight response measure on the UAV when the UAV is within the first flight-restriction region; obtain information that the UAV is within the first flight-restriction region; and obtain, subsequent to obtaining information that the UAV is within the first flight-restriction region, information about a second flight-restriction region within the first flight-restriction region, wherein the second flight-restriction region imposes a second flight response measure on the UAV when the UAV is within the second flight-restriction region, wherein the second flight response measure is different from the first flight response measure.

The systems, devices, and methods described herein can be applied to a wide variety of movable objects. As previously mentioned, any description herein of a UAV may apply to and be used for any movable object. Any description herein of a UAV may apply to any aerial vehicle. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: $1 \text{ cm}^3$, $2 \text{ cm}^3$, $5 \text{ cm}^3$, $10 \text{ cm}^3$, $20 \text{ cm}^3$, $30 \text{ cm}^3$, $40 \text{ cm}^3$, $50 \text{ cm}^3$, $60 \text{ cm}^3$, $70 \text{ cm}^3$, $80 \text{ cm}^3$, $90 \text{ cm}^3$, $100 \text{ cm}^3$, $150 \text{ cm}^3$, $200 \text{ cm}^3$, $300 \text{ cm}^3$, $500 \text{ cm}^3$, $750 \text{ cm}^3$, $1000 \text{ cm}^3$, $5000 \text{ cm}^3$, $10,000 \text{ cm}^3$, $100,000 \text{ cm}^3$, $1 \text{ m}^3$, or $10 \text{ m}^3$. Conversely, the total volume of the movable object may be greater than or equal to about: $1 \text{ cm}^3$. $2 \text{ cm}^3$, $5 \text{ cm}^3$, $10 \text{ cm}^3$, $20 \text{ cm}^3$, $30 \text{ cm}^3$. $40 \text{ cm}^3$, $50 \text{ cm}^3$, $60 \text{ cm}^3$, $70 \text{ cm}^3$, $80 \text{ cm}^3$, $90 \text{ cm}^3$, $100 \text{ cm}^3$, $150 \text{ cm}^3$, $200 \text{ cm}^3$, $300 \text{ cm}^3$, $500 \text{ cm}^3$, $750 \text{ cm}^3$, $1000 \text{ cm}^3$, $5000 \text{ cm}^3$, $10,000 \text{ cm}^3$, $100,000 \text{ cm}^3$, $1 \text{ m}^3$, or $10 \text{ m}^3$.

In some embodiments, the movable object may have a footprint (which may refer to the lateral cross-sectional area encompassed by the movable object) less than or equal to about: $32,000 \text{ cm}^2$, $20,000 \text{ cm}^2$, $10,000 \text{ cm}^2$, $1,000 \text{ cm}^2$, $500 \text{ cm}^2$, $100 \text{ cm}^2$. $50 \text{ cm}^2$, $10 \text{ cm}^2$, or $5 \text{ cm}^2$. Conversely, the footprint may be greater than or equal to about: $32.000 \text{ cm}^2$, $20,000 \text{ cm}^2$, $10.000 \text{ cm}^2$, $1,000 \text{ cm}^2$, $500 \text{ cm}^2$, $100 \text{ cm}^2$, $50 \text{ cm}^2$, $10 \text{ cm}^2$, or $5 \text{ cm}^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

FIG. 21 illustrates an unmanned aerial vehicle (UAV) 2100, in accordance with embodiments of the present invention. The UAV may be an example of a movable object as described herein. The UAV 2100 can include a propulsion system having four rotors 2102, 2104, 2106, and 2108. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 2110. For example, the length 2110 can be less than or equal to 1 m, or less than equal to 5 m. In some embodiments, the length 2110 can be within a range from 1 cm to 7 m, from 70 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

FIG. 22 illustrates a movable object 2200 including a carrier 2202 and a payload 2204, in accordance with embodiments. Although the movable object 2200 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 2204 may be provided on the movable object 2200 without requiring the carrier 2202. The movable object 2200 may include propulsion mechanisms 2206, a sensing system 2208, and a communication system 2212.

The propulsion mechanisms 2206 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 2206 can be mounted on the movable object 2200 using any suitable means, such as a support element (e.g., a drive shaft) as described elsewhere herein. The propulsion mechanisms 2206 can be mounted on any suitable portion of the movable object 2200, such on the top, bottom, front, back, sides, or suitable combinations thereof.

In some embodiments, the propulsion mechanisms 2206 can enable the movable object 2200 to take off vertically from a surface or land vertically on a surface without requiring any horizontal movement of the movable object 2200 (e.g., without traveling down a runway). Optionally, the propulsion mechanisms 2206 can be operable to permit the movable object 2200 to hover in the air at a specified position and/or orientation. One or more of the propulsion mechanisms 2200 may be controlled independently of the other propulsion mechanisms. Alternatively, the propulsion mechanisms 2200 can be configured to be controlled simultaneously. For example, the movable object 2200 can have multiple horizontally oriented rotors that can provide lift and/or thrust to the movable object. The multiple horizontally oriented rotors can be actuated to provide vertical takeoff, vertical landing, and hovering capabilities to the movable object 2200. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1200 (e.g., with respect to up to three degrees of translation and up to three degrees of rotation).

The sensing system 2208 can include one or more sensors that may sense the spatial disposition, velocity, and/or acceleration of the movable object 2200 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 2208 can be used to control the spatial disposition, velocity, and/or orientation of the movable object 2200 (e.g., using a suitable processing unit and/or control module, as described below). Alternatively, the sensing system 2208 can be used to provide data regarding the environment surrounding the movable object, such as weather conditions, proximity to potential obstacles, location of geographical features, location of manmade structures, and the like.

The communication system 2210 enables communication with terminal 2212 having a communication system 2214 via wireless signals 2216. The communication systems 2210, 2214 may include any number of transmitters, receivers, and/or transceivers suitable for wireless communication. The communication may be one-way communication, such that data can be transmitted in only one direction. For example, one-way communication may involve only the movable object 2200 transmitting data to the terminal 2212, or vice-versa. The data may be transmitted from one or more transmitters of the communication system 2210 to one or more receivers of the communication system 2212, or vice-versa. Alternatively, the communication may be two-way communication, such that data can be transmitted in both directions between the movable object 2200 and the terminal 2212. The two-way communication can involve transmitting data from one or more transmitters of the communication system 2210 to one or more receivers of the communication system 2214, and vice-versa.

In some embodiments, the terminal 2212 can provide control data to one or more of the movable object 2200, carrier 2202, and payload 2204 and receive information from one or more of the movable object 2200, carrier 2202, and payload 2204 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 2206), or a movement of the payload with respect to the movable object (e.g., via control of the carrier 2202). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 2208 or of the payload 2204). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 2212 can be configured to control a state of one or more of the movable object 2200, carrier 2202, or payload 2204. Alternatively or in combination, the carrier 2202 and payload 2204 can also each include a communication module configured to communicate with terminal 2212, such that the terminal can communicate with and control each of the movable object 2200, carrier 2202, and payload 2204 independently.

In some embodiments, the movable object 2200 can be configured to communicate with another remote device in addition to the terminal 2212, or instead of the terminal 2212. The terminal 2212 may also be configured to communicate with another remote device as well as the movable object 2200. For example, the movable object 2200 and/or terminal 2212 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 2200, receive data from the movable object 2200, transmit data to the terminal 2212, and/or receive data from the terminal 2212. Optionally, the remote device can be connected to the Internet or other telecommunications network, such that data received from the movable object 2200 and/or terminal 2212 can be uploaded to a website or server.

FIG. 23 is a schematic illustration by way of block diagram of a system 2300 for controlling a movable object, in accordance with embodiments. The system 2300 can be used in combination with any suitable embodiment of the systems, devices, and methods disclosed herein. The system 2300 can include a sensing module 2302, processing unit 2304, non-transitory computer readable medium 2306, control module 2308, and communication module 2310.

The sensing module 2302 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/ image sensors (e.g., a camera). The sensing module 2302 can be operatively coupled to a processing unit 2304 having a plurality of processors. In some embodiments, the sensing module can be operatively coupled to a transmission module 2312 (e.g., a Wi-Fi image transmission module) configured to directly transmit sensing data to a suitable external device or system. For example, the transmission module 2312 can be used to transmit images captured by a camera of the sensing module 2302 to a remote terminal.

The processing unit 2304 can have one or more processors, such as a programmable processor (e.g., a central processing unit (CPU)). The processing unit 2304 can be operatively coupled to a non-transitory computer readable medium 2306. The non-transitory computer readable medium 2306 can store logic, code, and/or program instructions executable by the processing unit 2304 for performing one or more steps. The non-transitory computer readable medium can include one or more memory units (e.g., removable media or external storage such as an SD card or random access memory (RAM)). In some embodiments, data from the sensing module 2302 can be directly conveyed to and stored within the memory units of the non-transitory computer readable medium 2306. The memory units of the non-transitory computer readable medium 2306 can store logic, code and/or program instructions executable by the processing unit 2304 to perform any suitable embodiment of the methods described herein. For example, the processing unit 2304 can be configured to execute instructions causing one or more processors of the processing unit 2304 to analyze sensing data produced by the sensing module. The memory units can store sensing data from the sensing module to be processed by the processing unit 2304. In some embodiments, the memory units of the non-transitory computer readable medium 2306 can be used to store the processing results produced by the processing unit 2304.

In some embodiments, the processing unit 2304 can be operatively coupled to a control module 2308 configured to control a state of the movable object. For example, the control module 2308 can be configured to control the propulsion mechanisms of the movable object to adjust the spatial disposition, velocity, and/or acceleration of the movable object with respect to six degrees of freedom. Alternatively or in combination, the control module 2308 can control one or more of a state of a carrier, payload, or sensing module.

The processing unit 2304 can be operatively coupled to a communication module 2310 configured to transmit and/or receive data from one or more external devices (e.g., a terminal, display device, or other remote controller). Any suitable means of communication can be used, such as wired communication or wireless communication. For example, the communication module 2310 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 2310 can transmit and/or receive one or more of sensing data from the sensing module 2302, processing results produced by the processing unit 2304, predetermined control data, user commands from a terminal or remote controller, and the like.

The components of the system 2300 can be arranged in any suitable configuration. For example, one or more of the components of the system 2300 can be located on the movable object, carrier, payload, terminal, sensing system, or an additional external device in communication with one or more of the above. Additionally, although FIG. 23 depicts a single processing unit 2304 and a single non-transitory computer readable medium 2306, one of skill in the art would appreciate that this is not intended to be limiting, and that the system 2300 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 2300 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A method for regulating flight of an unmanned aerial vehicle (UAV), comprising:
   in response to determining that the UAV is flying approaching or within a flight-restriction region:
   obtaining UAV identification information for the UAV or user identification information for a user of the UAV;
   obtaining characteristic information of a payload carried by the UAV;
   obtaining a permission level for the UAV to fly within the flight-restriction region, automatically with aid of one or more processors, based on both the characteristic information of the payload and the UAV identification information or the user identification information;

determining, by a flight controller on board the UAV, a flight response measure associated with the flight-restriction region based on the permission level, the flight response measure including one or more rules governing an operation of the UAV; and controlling, by the flight controller on board the UAV, the operation of the UAV based on the flight response measure.

2. The method of claim 1, wherein the user of the UAV is an operator or owner of the UAV.

3. The method of claim 1, wherein the UAV identification information includes at least one of:
a UAV identifier that uniquely identifies the UAV from other UAVs;
information about a model, manufacturer, or performance characteristics of the UAV; or
a serial number of the UAV.

4. The method of claim 1, wherein the user identification information includes at least one of:
a user identifier that uniquely identifies the user from other users;
information about a user's name, address, phone number; or
information about a level of training for UAV flight of the user, or certifications or licenses for UAV flight held by the user.

5. The method of claim 1, wherein the user information includes financial information for the user.

6. The method of claim 5, wherein the financial information for the user includes a payment card for the user.

7. The method of claim 6, wherein the payment card is a credit card, debit card, or gift card of the user, or corresponding record thereof.

8. The method of claim 5, wherein the financial information for the user includes bank account information of the user.

9. The method of claim 5, wherein the financial information for the user includes a pre-paid flight pass of the user.

10. The method of claim 1, wherein the user information is provided by or registered with a governmental agency.

11. The method of claim 1, further comprising:
assessing whether a location of the UAV falls within the flight-restriction region.

12. The method of claim 1, further comprising:
obtaining a request for the UAV to fly within the flight-restriction region prior to obtaining the permission level for the UAV to fly within the flight-restriction region.

13. The method of claim 1, wherein obtaining the permission level for the UAV to fly within the flight-restriction region occurs subsequent to authenticating an identity of the UAV or the user.

14. The method of claim 1, wherein the UAV is prevented from flying within the flight-restriction region without granted permission to fly within the flight-restriction region.

15. The method of claim 1, wherein obtaining the permission level for the UAV to fly within the flight-restriction region depends on air traffic within the flight-restriction region.

16. The method of claim 1, further comprising:
monitoring activity of the UAV within the flight-restriction region when the UAV is granted permission to fly within the flight-restriction region.

17. The method of claim 1, further comprising:
detecting that the flight-restriction region is designated in error; and
reporting an update that the flight-restriction region is designated in error.

18. The method of claim 1, wherein the flight response measure includes a set of rules governing at least one of a flight of the UAV, an operation of a payload carried by the UAV, data collection of the UAV, transmission of the data collected by the UAV, or communication of the UAV.

19. A system for regulating flight of an unmanned aerial vehicle (UAV), comprising one or more processors on board the UAV, individually or collectively configured to:
in response to determining that the UAV is flying approaching or within a flight-restriction region:
obtain UAV identification information for the UAV or user identification information for a user of the UAV;
obtain characteristic information of a payload carried by the UAV;
automatically obtain a permission level for the UAV to fly within the flight-restriction region based on both the characteristic information of the payload and the UAV identification information or the user identification information;
determine a flight response measure associated with the flight-restriction region based on the permission level, the flight response measure including one or more rules governing an operation of the UAV; and
control the operation of the UAV based on the flight response measure.

20. A non-transitory computer readable medium for regulating flight of an unmanned aerial vehicle (UAV), comprising code, logic, or instructions to:
in response to determining that the UAV is flying approaching or within a flight-restriction region:
obtain UAV identification information for the UAV or user identification information for a user of the UAV;
obtain characteristic information of a payload carried by the UAV;
automatically obtain a permission level for the UAV to fly within the flight-restriction region based on both the characteristic information of the payload and the UAV identification information or the user identification information;
determine, by a flight controller on board the UAV, a flight response measure associated with the flight-restriction region based on the permission level, the flight response measure including one or more rules governing an operation of the UAV; and
control, by the flight controller on board the UAV, the operation of the UAV based on the flight response measure.

* * * * *